US009116513B2

(12) United States Patent
Ambrefe, Jr. et al.

(10) Patent No.: US 9,116,513 B2
(45) Date of Patent: Aug. 25, 2015

(54) METHODS AND SYSTEMS FOR EFFICIENT SECURITY SCREENING

(71) Applicant: SECURITYPOINT HOLDINGS, INC., St. Petersburg, FL (US)

(72) Inventors: Joseph T Ambrefe, Jr., Indian Rocks Beach, FL (US); Douglas J Linehan, Beverly, MA (US)

(73) Assignee: SecurityPoint Holdings, Inc., St. Petersburg, FL (US)

( * ) Notice: Subject to any disclaimer, the term of this patent is extended or adjusted under 35 U.S.C. 154(b) by 13 days.

(21) Appl. No.: 14/052,474

(22) Filed: Oct. 11, 2013

(65) Prior Publication Data
US 2014/0104034 A1 Apr. 17, 2014

Related U.S. Application Data

(63) Continuation-in-part of application No. 12/411,991, filed on Mar. 26, 2009, now abandoned.

(60) Provisional application No. 61/040,425, filed on Mar. 28, 2008.

(51) Int. Cl.
*G08B 13/00* (2006.01)
*H04B 1/20* (2006.01)
(Continued)

(52) U.S. Cl.
CPC .............. *G05B 1/01* (2013.01); *G06Q 30/0244* (2013.01); *G07C 9/00071* (2013.01); *G07C 9/00087* (2013.01); *G07C 9/00111* (2013.01); *G07C 9/00309* (2013.01); *G07C 11/00* (2013.01)

(58) Field of Classification Search
CPC .. G11B 17/22; G08B 13/122; G01C 21/3626; G01C 21/3629; G07C 9/00111; G07C 9/00309; G06Q 20/382

USPC .............. 340/5.2, 5.8, 573.1, 541, 5.21–5.28, 340/4.4, 5.53; 705/52
See application file for complete search history.

(56) References Cited

U.S. PATENT DOCUMENTS 1,089,518 A 3/1914 Woodruff
2,047,835 A 7/1936 Prew
(Continued)

FOREIGN PATENT DOCUMENTS

DE 3116679 1/1982
DE 3317087 11/1984
(Continued)

OTHER PUBLICATIONS

Office Action dated Apr. 2, 2013 for Mexican Patent Application No. MX/a/2010/010692.
(Continued)

*Primary Examiner* — Hoi Lau
(74) *Attorney, Agent, or Firm* — Sheppard, Mullin, Richter & Hampton LLP

(57) ABSTRACT

A path of a security checkpoint may lead from an entrance to an identification checkpoint, and from the identification checkpoint to at least one recomposure station. A display may display an expected wait time for at least one person to pass from the entrance to the exit, the person using at least the first portion of the path. A first audio system may provide a type of music to a first area covering at least a second portion of the path, a location of the first area and the type of music determined based on proximity of the second portion of the path to the identification checking station. A second audio system may provide instructions to a second area covering at least a third portion of the path, a location of the second area determined based on proximity of the third portion to the identification checking station.

20 Claims, 32 Drawing Sheets

(51) Int. Cl.
*G05B 19/00* (2006.01)
*G05B 1/01* (2006.01)
*G07C 9/00* (2006.01)
*G06Q 30/02* (2012.01)
*G07C 11/00* (2006.01)

(56) References Cited

U.S. PATENT DOCUMENTS

| | | |
|---|---|---|
| 2,069,957 A | 2/1937 | Klein |
| 2,123,257 A | 7/1938 | Provost |
| 2,206,775 A | 7/1940 | Hoofer |
| 2,573,164 A | 10/1951 | Scheinker |
| 2,699,235 A | 1/1955 | Chestnut |
| 2,830,825 A | 4/1958 | Berger et al. |
| 2,895,148 A | 7/1959 | Hildmann |
| 2,898,985 A | 8/1959 | Starr |
| 2,908,985 A | 10/1959 | Hartman |
| 2,924,900 A | 2/1960 | Hoofer |
| 2,937,947 A | 5/1960 | Hamilton et al. |
| 3,021,959 A | 2/1962 | KatterJohn |
| 3,190,386 A | 6/1965 | Swinny |
| 3,223,255 A | 12/1965 | Graybeal et al. |
| 3,330,576 A | 7/1967 | Willis |
| 3,341,219 A | 9/1967 | Marini et al. |
| 3,404,804 A | 10/1968 | Frater et al. |
| 3,418,947 A | 12/1968 | Harrison |
| 3,420,392 A | 1/1969 | Flint |
| 3,424,078 A | 1/1969 | Boyd et al. |
| RE26,587 E | 5/1969 | Thompson |
| 3,503,489 A | 3/1970 | Selis |
| 3,605,767 A | 9/1971 | Ettlinger et al. |
| 3,642,158 A | 2/1972 | Koennecke et al. |
| 3,666,073 A | 5/1972 | Hellermann et al. |
| 3,695,462 A | 10/1972 | Sullivan |
| 3,719,408 A | 3/1973 | Fullington et al. |
| 3,722,700 A | 3/1973 | Cummings |
| 3,729,037 A | 4/1973 | Dare et al. |
| 3,762,738 A | 10/1973 | Christina |
| 3,776,395 A | 12/1973 | Lingg et al. |
| 3,782,747 A | 1/1974 | Hamilton |
| 3,826,351 A | 7/1974 | Fromme |
| 3,976,208 A | 8/1976 | Buix et al. |
| 3,976,369 A | 8/1976 | McCardell et al. |
| 3,980,204 A | 9/1976 | DuBroff et al. |
| 3,995,164 A | 11/1976 | Ramsay et al. |
| 3,995,385 A | 12/1976 | Clipson et al. |
| 3,997,182 A | 12/1976 | Mortenson |
| 4,020,346 A | 4/1977 | Dennis |
| 4,021,266 A | 5/1977 | Kitterman et al. |
| 4,023,678 A | 5/1977 | Fiedler |
| 4,024,660 A | 5/1977 | Goto |
| 4,137,567 A | 1/1979 | Grube |
| 4,170,303 A | 10/1979 | Nolan |
| 4,239,969 A | 12/1980 | Haas et al. |
| 4,248,442 A | 2/1981 | Barrett |
| 4,324,915 A | 4/1982 | Roman |
| 4,354,600 A | 10/1982 | Treiber |
| 4,362,244 A | 12/1982 | Cornou |
| 4,411,829 A | 10/1983 | Schulte-Elte et al. |
| 4,434,306 A | 2/1984 | Kobayashi et al. |
| 4,468,165 A | 8/1984 | Kawasaki |
| 4,549,729 A | 10/1985 | Hoffstetter et al. |
| 4,579,489 A | 4/1986 | Sarantitis |
| 4,586,441 A | 5/1986 | Zekich |
| 4,629,383 A | 12/1986 | Buss |
| 4,679,691 A | 7/1987 | Halloran |
| 4,720,228 A | 1/1988 | Horiguchi et al. |
| 4,739,607 A | 4/1988 | Annas et al. |
| 4,741,657 A | 5/1988 | Cassel |
| 4,790,610 A | 12/1988 | Welch et al. |
| 4,823,955 A | 4/1989 | Apps |
| 4,844,264 A | 7/1989 | Deskiewicz, Jr. |
| 4,928,411 A | 5/1990 | Danis et al. |
| 4,976,369 A | 12/1990 | Shindo et al. |
| 4,979,870 A | 12/1990 | Mojden et al. |
| 5,010,668 A | 4/1991 | Zeligson |
| 5,060,249 A | 10/1991 | Eisen et al. |
| 5,080,217 A | 1/1992 | Garlichs et al. |
| 5,092,452 A | 3/1992 | Nakayama |
| 5,097,959 A | 3/1992 | Tilles et al. |
| 5,151,684 A | 9/1992 | Johnsen |
| 5,163,806 A | 11/1992 | Robertson et al. |
| 5,180,069 A | 1/1993 | Krummell et al. |
| 5,190,156 A | 3/1993 | Conaway |
| 5,190,428 A | 3/1993 | Bryant et al. |
| 5,192,092 A | 3/1993 | DiBenedetto |
| 5,214,574 A | 5/1993 | Chang |
| 5,301,790 A | 4/1994 | Prydtz et al. |
| 5,313,393 A | 5/1994 | Varley et al. |
| 5,329,102 A | 7/1994 | Sansone |
| 5,337,947 A | 8/1994 | Eskandry |
| 5,348,169 A | 9/1994 | Allen |
| 5,372,471 A | 12/1994 | Wu |
| 5,381,901 A | 1/1995 | Hundley |
| 5,388,049 A | 2/1995 | Sansone et al. |
| 5,390,785 A | 2/1995 | Garric et al. |
| 5,394,456 A | 2/1995 | Livingston |
| 5,413,205 A | 5/1995 | Taylor et al. |
| 5,445,397 A | 8/1995 | Evans |
| 5,462,299 A | 10/1995 | Maddux |
| 5,470,427 A | 11/1995 | Mikel et al. |
| 5,479,023 A | 12/1995 | Bartle |
| 5,484,160 A | 1/1996 | Ek |
| 5,487,010 A | 1/1996 | Drake et al. |
| 5,566,961 A | 10/1996 | Snell et al. |
| 5,575,375 A | 11/1996 | Sandusky et al. |
| 5,577,367 A | 11/1996 | Abrams et al. |
| 5,586,493 A | 12/1996 | McEntee |
| 5,588,659 A | 12/1996 | Boes et al. |
| 5,678,568 A | 10/1997 | Uchikubo et al. |
| 5,724,225 A | 3/1998 | Hrusoff et al. |
| 5,749,305 A | 5/1998 | Jacovelli |
| 5,805,660 A | 9/1998 | Perion et al. |
| 5,820,143 A | 10/1998 | Rigo |
| 5,841,346 A | 11/1998 | Park |
| 5,845,692 A | 12/1998 | Kellem et al. |
| 5,882,174 A | 3/1999 | Woerner et al. |
| 5,934,444 A | 8/1999 | Kierpaul et al. |
| 5,950,816 A | 9/1999 | Reid |
| 5,988,858 A | 11/1999 | Yuyama et al. |
| 5,993,936 A | 11/1999 | Gardner |
| 6,058,159 A | 5/2000 | Conway et al. |
| 6,069,936 A | 5/2000 | Bjorkholm |
| 6,079,719 A | 6/2000 | Tisbo et al. |
| 6,109,492 A | 8/2000 | Eastwood |
| 6,131,927 A | 10/2000 | Krawczyk |
| 6,240,667 B1 | 6/2001 | Harney et al. |
| 6,253,948 B1 | 7/2001 | Ficker |
| 6,263,688 B1 | 7/2001 | Bedard |
| 6,264,219 B1 | 7/2001 | Smith |
| 6,276,515 B1 | 8/2001 | Wayer |
| 6,279,721 B1 | 8/2001 | Lyngso et al. |
| 6,286,522 B1 | 9/2001 | Host-Madsen et al. |
| 6,304,629 B1 | 10/2001 | Conway et al. |
| 6,311,822 B1 | 11/2001 | LeCroy |
| 6,356,802 B1 | 3/2002 | Tekehara et al. |
| 6,366,203 B1 | 4/2002 | Burns |
| 6,366,206 B1 | 4/2002 | Ishikawa et al. |
| 6,382,642 B1 | 5/2002 | Rainey |
| 6,431,344 B1 | 8/2002 | Emmermann et al. |
| 6,501,041 B1 | 12/2002 | Burns et al. |
| 6,507,278 B1 * | 1/2003 | Brunetti et al. ............... 340/541 |
| 6,520,544 B1 | 2/2003 | Mitchell et al. |
| 6,546,071 B2 | 4/2003 | Graves |
| 6,580,778 B2 | 6/2003 | Meder |
| 6,597,760 B2 | 7/2003 | Beneke et al. |
| 6,648,284 B2 | 11/2003 | Caporali et al. |
| 6,676,141 B1 | 1/2004 | Hadley |
| 6,720,874 B2 | 4/2004 | Fufido et al. |
| 6,745,520 B2 | 6/2004 | Puskaric et al. |
| 6,753,830 B2 | 6/2004 | Gelbman |
| 6,763,083 B2 | 7/2004 | Fernandez |
| 6,789,660 B1 | 9/2004 | Bruun et al. |
| 6,877,828 B2 | 4/2005 | Strong |

(56) References Cited

U.S. PATENT DOCUMENTS

| | | | |
|---|---|---|---|
| 6,888,460 B2 | 5/2005 | Ambrefe | |
| 6,907,982 B2 | 6/2005 | Olson et al. | |
| 6,909,921 B1* | 6/2005 | Bilger | 700/19 |
| 6,953,906 B2 | 10/2005 | Burns et al. | |
| 7,012,256 B1 | 3/2006 | Roos et al. | |
| 7,012,525 B1 | 3/2006 | Ghioto | |
| 7,106,192 B2 | 9/2006 | Johnson et al. | |
| 7,156,220 B2 | 1/2007 | Olson et al. | |
| 7,210,545 B1 | 5/2007 | Waid | |
| 7,270,227 B2 | 9/2007 | Bender et al. | |
| 7,286,634 B2* | 10/2007 | Sommer et al. | 378/57 |
| 2003/0062373 A1 | 4/2003 | Holland | |
| 2003/0085808 A1* | 5/2003 | Goldberg | 340/531 |
| 2003/0221931 A1 | 12/2003 | Marsh | |
| 2004/0016271 A1 | 1/2004 | Shah et al. | |
| 2004/0066012 A1 | 4/2004 | Choi et al. | |
| 2004/0098237 A1* | 5/2004 | Pendergraft et al. | 703/7 |
| 2004/0174263 A1 | 9/2004 | Sata | |
| 2005/0065834 A1* | 3/2005 | Hale et al. | 705/8 |
| 2005/0074086 A1* | 4/2005 | Pendergraft | 378/6 |
| 2005/0168574 A1* | 8/2005 | Lipton et al. | 348/143 |
| 2005/0173284 A1 | 8/2005 | Ambrefe | |
| 2005/0190061 A1* | 9/2005 | Trela | 340/573.1 |
| 2005/0193648 A1 | 9/2005 | Klein et al. | |
| 2006/0109129 A1* | 5/2006 | Carrender | 340/572.7 |
| 2006/0149640 A1 | 7/2006 | Gordon et al. | |
| 2006/0243632 A1 | 11/2006 | Trahan | |
| 2006/0258385 A1* | 11/2006 | Hovestadt | 455/520 |
| 2006/0259580 A1* | 11/2006 | Laberteaux et al. | 709/217 |
| 2006/0265508 A1* | 11/2006 | Angel et al. | 709/230 |
| 2007/0046426 A1 | 3/2007 | Ishibashi | |
| 2007/0069921 A1* | 3/2007 | Sefton | 340/932.2 |
| 2007/0122011 A1* | 5/2007 | Takizawa | 382/118 |
| 2007/0126575 A1 | 6/2007 | Ambrefe | |
| 2007/0132580 A1 | 6/2007 | Ambrefe | |
| 2007/0133844 A1* | 6/2007 | Waehner et al. | 382/118 |
| 2007/0265064 A1* | 11/2007 | Kessman et al. | 463/25 |
| 2007/0290843 A1 | 12/2007 | Manneschi | |
| 2008/0217475 A1* | 9/2008 | Allison | 244/114 R |
| 2008/0235138 A1 | 9/2008 | Yokota et al. | |
| 2008/0260096 A1* | 10/2008 | Sommer et al. | 378/57 |
| 2009/0006286 A1* | 1/2009 | Angell et al. | 706/12 |
| 2009/0008439 A1* | 1/2009 | Kubler et al. | 235/375 |
| 2009/0113116 A1* | 4/2009 | Thompson et al. | 711/103 |
| 2009/0270693 A1 | 10/2009 | Hyde et al. | |
| 2009/0284343 A1* | 11/2009 | Ambrefe et al. | 340/5.2 |
| 2009/0287701 A1* | 11/2009 | Breaker et al. | 707/7 |
| 2010/0039259 A1* | 2/2010 | Hazzani | 340/541 |
| 2010/0078475 A1* | 4/2010 | Lin et al. | 235/380 |
| 2010/0203833 A1* | 8/2010 | Dorsey | 455/41.2 |
| 2010/0228577 A1* | 9/2010 | Cunningham et al. | 705/5 |
| 2011/0001827 A1* | 1/2011 | Ortiz et al. | 348/156 |
| 2011/0155515 A1* | 6/2011 | Suzuki et al. | 187/382 |
| 2012/0109695 A1* | 5/2012 | Forkhamer et al. | 705/5 |
| 2012/0209745 A1* | 8/2012 | Spencer, II | 705/26.41 |
| 2013/0034268 A1* | 2/2013 | Perron | 382/103 |
| 2013/0070974 A1* | 3/2013 | Stefani | 382/118 |
| 2013/0211862 A1* | 8/2013 | Musial et al. | 705/5 |
| 2013/0223678 A1* | 8/2013 | Brunetti | 382/103 |
| 2013/0252591 A1* | 9/2013 | Sasaki et al. | 455/414.1 |
| 2013/0297551 A1* | 11/2013 | Smith et al. | 706/48 |
| 2013/0325451 A1* | 12/2013 | Levien et al. | 704/201 |
| 2014/0018112 A1* | 1/2014 | Cohen-Zur | 455/457 |
| 2014/0032723 A1* | 1/2014 | Nema | 709/220 |
| 2014/0070946 A1* | 3/2014 | Ambrefe, Jr. | 340/541 |
| 2014/0104034 A1* | 4/2014 | Ambrefe et al. | 340/4.4 |
| 2014/0184386 A1* | 7/2014 | Regler et al. | 340/7.61 |
| 2014/0189016 A1* | 7/2014 | Goldsmith et al. | 709/205 |
| 2015/0007302 A1* | 1/2015 | Kato | 726/10 |

FOREIGN PATENT DOCUMENTS

| | | |
|---|---|---|
| DE | 3840816 | 6/1990 |
| DE | 4012084 | 10/1991 |
| EP | 0227254 | 7/1987 |
| EP | 0275521 | 1/1990 |
| EP | 0556037 | 4/1996 |
| EP | 0787668 | 8/1998 |
| EP | 1151919 | 11/2001 |
| EP | 1232879 | 8/2005 |
| FR | 914076 | 9/1946 |
| GB | 682669 | 11/1952 |
| GB | 2147569 | 5/1985 |
| GB | 2362710 | 11/2001 |
| GB | 2362711 | 11/2001 |
| NL | 8005534 | 10/1980 |
| WO | 90/03723 | 4/1990 |
| WO | 9003140 | 4/1990 |
| WO | 9314008 | 7/1993 |
| WO | 9933723 | 7/1999 |
| WO | 0151369 | 7/2001 |
| WO | 0229744 | 4/2002 |

OTHER PUBLICATIONS

Office Action dated Aug. 26, 2013 for Mexican Patent Application No. MX/a/2010/010692.

Office Action dated Feb. 14, 2014 for Mexican Patent Application No. MX/a/2010/010692.

US Court of Federal Claims, "Complaint against United States of America," *SecurityPoint Holdings, Inc v. U.S.*, Case No. 1:11-cv-00268-EGB, Docket No. 1, May 2, 2011, with Civil Cover sheet.

US Court of Federal Claims, "Amended Complaint against United States of America," *SecurityPoint Holdings, Inc v. U.S.*, Case No. 1:11-cv-00268-EGB, Docket No. 10, Aug. 30, 2011, with Exhibits A-C.

US Court of Federal Claims, "Answer to Amended Complaint against United States of America," *SecurityPoint Holdings, Inc v. U.S.*, Case No. 1:11-cv-00268-EGB, Docket No. 11, Aug. 30, 2011.

US Court of Federal Claims, "Joint Status Report, filed by SecurityPoint Holdings, Inc," *SecurityPoint Holdings, Inc v. U.S.*, Case No. 1:11-cv-00268-EGB, Docket No. 12, Oct. 6, 2011.

US Court of Federal Claims, "Joint Proposed Schedule for Initial Liability Phase of Case, filed by SecurityPoint Holdings, Inc," *SecurityPoint Holdings, Inc v. U.S.*, Case No. 1:11-cv-00268-EGB, Docket No. 13, Oct. 31, 2011.

US Court of Federal Claims, "Scheduling Order with respect to claim construction statements, expert reports, joinder of parties, motions for summary judgment, and fact discovery on liability," *SecurityPoint Holdings, Inc v. U.S.*, Case No. 1:11-cv-00268-EGB, Docket No. 14, Nov. 3, 2011.

US Court of Federal Claims, "Joint Claim Construction Statement filed by all parties," *SecurityPoint Holdings, Inc v. U.S.*, Case No. 1:11-cv-00268-EGB, Docket No. 19, Feb. 6, 2012.

US Court of Federal Claims, "Status Conference Order," *SecurityPoint Holdings, Inc v. U.S.*, Case No. 1:11-cv-00268-EGB, Docket No. 21, Mar. 5, 2012.

US Court of Federal Claims, "Scheduling Order with respect to fact discovery," *SecurityPoint Holdings, Inc v. U.S.*, Case No. 1:11-cv-00268-EGB, Docket No. 24, Mar. 27, 2012.

US Court of Federal Claims, "Transcript of Proceedings held on Mar. 8, 2012 before Senior Judge Eric G. Bruggink," *SecurityPoint Holdings, Inc v. U.S.*, Case No. 1:11-cv-00268-EGB, Docket No. 27, Mar. 29, 2012.

US Court of Federal Claims, "Joint Motion to Amend/Correct Scheduling Order (Docket No. 24), filed by SecurityPoint Holdings, Inc," *SecurityPoint Holdings, Inc v. U.S.*, Case No. 1:11-cv-00268-EGB, Docket No. 30, Jun. 1, 2012.

US Court of Federal Claims, "Order granting Motion to Amend/Correct Scheduling Order (Docket No. 30)," *SecurityPoint Holdings, Inc v. U.S.*, Case No. 1:11-cv-00268-EGB, Docket No. 33, Jun. 7, 2012.

US Court of Federal Claims, "Securitypoint's Opening Markman Claim Construction Brief, filed by SecurityPoint Holdings, Inc," *SecurityPoint Holdings, Inc v. U.S.*, Case No. 1:11-cv-00268-EGB, Docket No. 34, Jun. 18, 2012, with Exhibits 1-13.

US Court of Federal Claims, "Securitypoint's Supplemental Index of Supplemental Exhibits in support of Plaintiff's opening Markman

(56) References Cited

OTHER PUBLICATIONS

Claim Construction, filed by SecurityPoint Holdings, Inc," *SecurityPoint Holdings, Inc v. U.S.*, Case No. 1:11-cv-00268-EGB, Docket No. 35, Jun. 22, 2012, with Supplemental Exhibits 10 and 13.

US Court of Federal Claims, "United States of America's Markman Claim Construction Brief, filed by United States of America," *SecurityPoint Holdings, Inc v. U.S.*, Case No. 1:11-cv-00268-EGB, Docket No. 37, Aug. 5, 2012, with Exhibits 14-17, 18, and 19-22.

US Court of Federal Claims, "Securitypoint's Reply Markman Claim Construction Brief, filed by SecurityPoint Holdings, Inc," *SecurityPoint Holdings, Inc v. U.S.*, Case No. 1:11-cv-00268-EGB, Docket No. 39, Sep. 17, 2012.

US Court of Federal Claims, "Joint Pre-Markman Claim Construction Hearing Statement, filed by SecurityPoint Holdings, Inc," *SecurityPoint Holdings, Inc v. U.S.*, Case No. 1:11-cv-00268-EGB, Docket No. 40, Oct. 1, 2012, with Exhibits 7-10, 11-13, 14-17, 18, and 19-22.

US Court of Federal Claims, "Scheduling Order with respect to exchanging of demonstrative exhibits for Claim Construction Hearing," *SecurityPoint Holdings, Inc v. U.S.*, Case No. 1:11-cv-00268-EGB, Docket No. 41, Oct. 10, 2012.

US Court of Federal Claims, "Securitypoint's objections to the United States of America's Markman Claim Construction Hearing demonstrative exhibit, filed by SecurityPoint Holdings, Inc," *SecurityPoint Holdings, Inc v. U.S.*, Case No. 1:11-cv-00268-EGB, Docket No. 42, Nov. 9, 2012, with Exhibits C, C part 2 and D.

US Court of Federal Claims, "United States of America's objections to Securitypoint's Markman Hearing demonstrative exhibits, filed by All Defendants" *SecurityPoint Holdings, Inc v. U.S.*, Case No. 1:11-cv-00268-EGB, Docket No. 43, Nov. 9, 2012, with Appendixes 1 and 2.

US Court of Federal Claims, "Securitypoint's responses to United States of America's objections to Securitypoint's Markman Hearing demonstrative exhibits, filed by SecurityPoint Holdings, Inc," *SecurityPoint Holdings, Inc v. U.S.*, Case No. 1:11-cv-00268-EGB, Docket No. 44, Nov. 13, 2012.

US Court of Federal Claims, "Stipulation Regarding Proof of Liability Under 28 U.S.C. § 1498(a), filed by SecurityPoint Holdings, Inc," *SecurityPoint Holdings, Inc v. U.S.*, Case No. 1:11-cv-00268-EGB, Docket No. 45, Nov. 16, 2012.

US Court of Federal Claims, "Order accepting Joint Stipulation (Docket No. 45)," *SecurityPoint Holdings, Inc v. U.S.*, Case No. 1:11-cv-00268-EGB, Docket No. 46, Nov. 28, 2012.

US Court of Federal Claims, "Notice of Filing of Certified Transcript for proceedings held on Nov. 14, 2012 in Washington, DC," *SecurityPoint Holdings, Inc v. U.S.*, Case No. 1:11-cv-00268-EGB, Docket No. 47, Dec. 4, 2012.

US Court of Federal Claims, "Transcript of Proceedings held on Nov. 14, 2012 before Judge Eric G. Bruggink," *SecurityPoint Holdings, Inc v. U.S.*, Case No. 1:11-cv-00268-EGB, Docket No. 48, Dec. 4, 2012.

US Court of Federal Claims, "Securitypoint's motion for substitution of parties based on conversion of corporate entity, filed by SecurityPoint Holdings, Inc," *SecurityPoint Holdings, Inc v. U.S.*, Case No. 1:11-cv-00268-EGB, Docket No. 52, Dec. 19, 2012.

US Court of Federal Claims, "Order granting Securitypoint's motion for substitution of parties (Docket No. 52)," *SecurityPoint Holdings, Inc v. U.S.*, Case No. 1:11-cv-00268-EGB, Docket No. 56, Jan. 4, 2013.

US Court of Federal Claims, "Published Claim Construction Opinion," *SecurityPoint Holdings, Inc v. U.S.*, Case No. 1:11-cv-00268-EGB, Docket No. 63, Feb. 20, 2013, with Attachment 1.

US Court of Federal Claims, "Scheduling Order with respect to Motions for Summary Judgment," *SecurityPoint Holdings, Inc v. U.S.*, Case No. 1:11-cv-00268-EGB, Docket No. 64, Mar. 7, 2013.

US Court of Federal Claims, "Transcript of Proceedings held on Feb. 27, 2013 before Senior Judge Eric G. Bruggink," *SecurityPoint Holdings, Inc v. U.S.*, Case No. 1:11-cv-00268-EGB, Docket No. 66, Mar. 7, 2013.

US Court of Federal Claims, "Stipulation and [Proposed] Order Regarding Patent use Under 28 U.S.C. 1498 (a), filed by SecurityPoint Holdings, Inc," *SecurityPoint Holdings, Inc v. U.S.*, Case No. 1:11-cv-00268-EGB, Docket No. 71, Jun. 6, 2013.

US Court of Federal Claims, "Order granting Stipulation (Docket No. 71)," *SecurityPoint Holdings, Inc v. U.S.*, Case No. 1:11-cv-00268-EGB, Docket No. 72, Jul. 3, 2013.

US Court of Federal Claims, "Motion for Summary Judgment of Patent Invalidity, filed by United States of America," *SecurityPoint Holdings, Inc v. U.S.*, Case No. 1:11-cv-00268-EGB, Docket No. 73, Jul. 12, 2013, with Exhibits 1, 2, 3-6, and 7-10.

US Court of Federal Claims, Motion to Strike Motion for Summary Judgment of Patent Invalidity, filed by SecurityPoint Holdings, Inc, *SecurityPoint Holdings, Inc v. U.S.*, Case No. 1:11-cv-00268-EGB, Docket No. 74, Jul. 16, 2013, with Exhibits 1-6.

US Court of Federal Claims, "Scheduling Order with respect to Securitypoint's filing of opposition to Motion for Summary Judgments," *SecurityPoint Holdings, Inc v. U.S.*, Case No. 1:11-cv-00268-EGB, Docket No. 75, Jul. 18, 2013.

US Court of Federal Claims, "Response to Motion to Strike Motion for Summary Judgment of Patent Invalidity, filed by United States of America," *SecurityPoint Holdings, Inc v. U.S.*, Case No. 1:11-cv-00268-EGB, Docket No. 76, Aug. 2, 2012, with Appendix of Exhibits 1-3.

US Court of Federal Claims, "Reply to Response to Motion to Strike Motion for Summary Judgment of Patent Invalidity, filed by SecurityPoint Holdings, Inc," *SecurityPoint Holdings, Inc v. U.S.*, Case No. 1:11-cv-00268-EGB, Docket No. 77, Aug. 12, 2013, with Exhibit 7.

US Court of Federal Claims, "Order denying SecurityPoint's Motion to Strike," *SecurityPoint Holdings, Inc v. U.S.*, Case No. 1:11-cv-00268-EGB, Docket No. 78, Aug. 28, 2013.

US Court of Federal Claims, "Notice of Filing of Certified Transcript for proceedings held on Aug. 16, 2013," *SecurityPoint Holdings, Inc v. U.S.*, Case No. 1:11-cv-00268-EGB, Docket No. 79, Sep. 4, 2013.

US Court of Federal Claims, "Transcript of Proceedings held on Aug. 16, 2013 before Judge Eric G. Bruggink," *SecurityPoint Holdings, Inc v. U.S.*, Case No. 1:11-cv-00268-EGB, Docket No. 80, Sep. 4, 2013.

US Court of Federal Claims, "Joint Status Report Regarding Summary Judgment Briefing and Related Supplemental Discovery, filed by SecurityPoint Holdings, Inc," *SecurityPoint Holdings, Inc v. U.S.*, Case No. 1:11-cv-00268-EGB, Docket No. 81, Sep. 6, 2013.

US Court of Federal Claims, "Scheduling Order with respect to Expert Declarations and Motion for Summary Judgement," *SecurityPoint Holdings, Inc v. U.S.*, Case No. 1:11-cv-00268-EGB, Docket No. 82, Sep. 9, 2013.

US Court of Federal Claims, "SecurityPoint's opposition to United States of America's Motion for Summary Judgment of Patent Invalidity for Anticipation and Obviousness, and Cross-Motion for Summary Judgment of Lack of Invalidity for Anticipation and Obviousness, filed by SecurityPoint Holdings, Inc," *SecurityPoint Holdings, Inc v. U.S.*, Case No. 1:11-cv-00268-EGB, Docket No. 84, Oct. 1, 2013, with Exhibits A, 1-3, 4-7, 8-11, 15-18, 19-21, 23-24, 25-27, B-D, and 12-14 (added on Oct. 2, 2013).

US Court of Federal Claims, "Reply to Response to Motion re Motion for Summary Judgment of Patent Invalidity and Response to Cross-Motion for Lack of Invalidity, filed by United States," *SecurityPoint Holdings, Inc v. U.S.*, Case No. 1:11-cv-00268-EGB, Docket No. 89, Nov. 22, 2013, with Exhibits 11-12.

US Court of Federal Claims, "SecurityPoint's Reply in support of its Cross-Motion for Summary Judgment of Lack of Invalidity, filed by SecurityPoint Holdings, Inc," *SecurityPoint Holdings, Inc v. U.S.*, Case No. 1:11-cv-00268-EGB, Docket No. 90, Dec. 9, 2013, with Exhibits E, F, G, H, I, J-M, N.

US Court of Federal Claims, "United States' Motion to Strike SecurityPoint's Reply Summary Judgement Exhibits, filed by United States," *SecurityPoint Holdings, Inc v. U.S.*, Case No. 1:11-cv-00268-EGB, Docket No. 91, Dec. 20, 2013.

US Court of Federal Claims, SecurityPoint's Opposition to United States' Motion to Strike SecurityPoint's Reply Summary Judgment

(56) References Cited

OTHER PUBLICATIONS

Exhibits, filed by SecurityPoint Holdings, Inc, *SecurityPoint Holdings, Inc* v. *U.S.*, Case No. 1:11-cv-00268-EGB, Docket No. 92, Jan. 6, 2014.
US Court of Federal Claims, "Order denying United States' Motion to Strike," *SecurityPoint Holdings, Inc* v. *U.S.*, Case No. 1:11-cv-00268-EGB, Docket No. 93, Jan. 8, 2014.
US Court of Federal Claims, "Sur-Reply re Motion for Summary Judgment of Patent Invalidity, filed by United States," *SecurityPoint Holdings, Inc* v. *U.S.*, Case No. 1:11-cv-00268-EGB, Docket No. 94, Jan. 23, 2014.
US Court of Federal Claims, "Notice of Directly Related Case(s), filed by United States," *SecurityPoint Holdings, Inc* v. *U.S.*, Case No. 1:11-cv-00268-EGB, Docket No. 95, Feb. 6, 2014.
US Court of Federal Claims, "Response to Notice of Directly Related Case(s), filed by SecurityPoint Holdings, Inc," *SecurityPoint Holdings, Inc* v. *U.S.*, Case No. 1:11-cv-00268-EGB, Docket No. 96, Feb. 11, 2014.
US Court of Federal Claims, "Order denying United States' Motion for Summary Judgment; denying SecurityPoint's Cross Motion for Summary Judgment," *SecurityPoint Holdings, Inc* v. *U.S.*, Case No. 1:11-cv-00268-EGB, Docket No. 97, Feb. 24, 2014.
US Court of Federal Claims, "Notice of Filing of Certified Transcript for proceedings held on Feb. 21, 2014 in Washington, DC," *SecurityPoint Holdings, Inc* v. *U.S.*, Case No. 1:11-cv-00268-EGB, Docket No. 98, Mar. 5, 2014.
US Court of Federal Claims, "Transcript of Proceedings held on Feb. 21, 2014 before Senior Judge Eric G. Bruggink," *SecurityPoint Holdings, Inc* v. *U.S.*, Case No. 1:11-cv-00268-EGB, Docket No. 99, Mar. 5, 2014.
US Court of Federal Claims, "Motion to Stay the case pending Patent Office action in the initiated reexamination, filed by the United States," *SecurityPoint Holdings, Inc* v. *U.S.*, Case No. 1:11-cv-00268-EGB, Docket No. 100, Mar. 24, 2014.
US Court of Federal Claims, "Joint Status Report Proposing Pretrial and Trial Schedule of Events, filed by SecurityPoint Holdings, Inc," *SecurityPoint Holdings, Inc* v. *U.S.*, Case No. 1:11-cv-00268-EGB, Docket No. 101, Mar. 25, 2014.
US Court of Federal Claims, "Response to Motion to Stay the case pending Patent Office action in the initiated reexamination, filed by SecurityPoint Holdings, Inc," *SecurityPoint Holdings, Inc* v. *U.S.*, Case No. 1:11-cv-00268-EGB, Docket No. 102, Mar. 28, 2014, with Exhibits 1, A, B, 2.
US Court of Federal Claims, "Reply to Response to Motion re Motion to Stay the case pending Patent Office action in the initiated reexamination, filed by United States," *SecurityPoint Holdings, Inc* v. *U.S.*, Case No. 1:11-cv-00268-EGB, Docket No. 103, Apr. 7, 2014, with Appendix.
US Court of Federal Claims, "Order denying United States' Motion to Stay," *SecurityPoint Holdings, Inc* v. *U.S.*, Case No. 1:11-cv-00268-EGB, Docket No. 104, Apr. 9, 2014.
US Court of Federal Claims, "Joint Status Report Proposing Pretrial Schedule of Events, filed by SecurityPoint Holdings, Inc," *SecurityPoint Holdings, Inc* v. *U.S.*, Case No. 1:11-cv-00268-EGB, Docket No. 105, Apr. 18, 2014.
US Court of Federal Claims, "Notice of Filing of Certified Transcript for proceedings held on Apr. 9, 2014 in Washington, DC," *SecurityPoint Holdings, Inc* v. *U.S.*, Case No. 1:11-cv-00268-EGB, Docket No. 106, Apr. 29, 2014.
US Court of Federal Claims, "Transcript of Proceedings held on Apr. 9, 2014 before Senior Judge Eric G. Bruggink," *SecurityPoint Holdings, Inc* v. *U.S.*, Case No. 1:11-cv-00268-EGB, Docket No. 107, Apr. 29, 2014.
US Court of Federal Claims, "Scheduling Order with respect to Expert Discovery, Contentions of Fact and Law, and Joint Pretrial Report," *SecurityPoint Holdings, Inc* v. *U.S.*, Case No. 1:11-cv-00268-EGB, Docket No. 108, May 12, 2014.
US Court of Federal Claims, "Motion for Extension of Time to Serve Opening Expert Reports until after SecurityPoint Responds to the Patent Office Patentability Rejections, filed by United States," *SecurityPoint Holdings, Inc* v. *U.S.*, Case No. 1:11-cv-00268-EGB, Docket No. 109, May 23, 2014.
US Court of Federal Claims, "Response to Motion for Extension of Time to Serve Opening Expert Reports, filed by SecurityPoint Holdings, Inc," *SecurityPoint Holdings, Inc* v. *U.S.*, Case No. 1:11-cv-00268-EGB, Docket No. 110, Jun. 4, 2014.
US Court of Federal Claims, "United States' Objections and Responses to SecurityPoint's First Requests for production of documents," *SecurityPoint Holdings, Inc* v. *U.S.*, Case No. 1:11-cv-00268-EGB, Submitted Mar. 5, 2012.
US Court of Federal Claims, "SecurityPoint's Response to United States' Document request," *SecurityPoint Holdings, Inc* v. *U.S.*, Case No. 1:11-cv-00268-EGB.
US Court of Federal Claims, "Defendant's Response to Plaintiffs Document Request 38" *SecurityPoint Holdings, Inc* v. *U.S.*, Case No. 1:11-cv-00268-EGB.
US Court of Federal Claims, "Defendant's Invalidity Contentions," *SecurityPoint Holdings, Inc* v. *U.S.*, Case No. 1:11-cv-00268-EGB, Submitted May 14, 2012.
Federal Aviation Administration, Recommended Security Guidelines for Airport Planning, Design and Construction, DOT/FAA/AR-00/52, Jun. 2001.
Transportation Security Administration, Strategic Airport Security Rollout: Security Checkpoint Layout Design DTSA59-02-D-00403, Sep. 5, 2003.
Transportation Security Administration, Aviation Security: Security Checkpoint Layout Design/Reconfiguration Guide, Nov. 7, 2006.
Transportation Security Administration, Checkpoint Design Guide (CDG) Revision 1, Feb. 11, 2009.
Expert Report of John H. Huey and Appendices A-G, with Plaintiff's Disclosure, *SecurityPoint Holdings, Inc* v. *United States*, Case No. 1:11-cv-00268-EGB, U.S. Court of Federal Claims, (Mar. 22, 2013).
Initial Expert Report of Sant R. Arora, *SecurityPoint Holdings, Inc* v. *United States*, Case No. 1:11-cv-00268-EGB, U.S. Court of Federal Claims (Mar. 22, 2013).
Reply Expert Report of Sant R. Arora, *SecurityPoint Holdings, Inc* v. *United States*, Case No. 1:11-cv-00268-EGB, U.S. Court of Federal Claims (May 15, 2013).
Curriculum Vitae of Sant R. Arora, *SecurityPoint Holdings, Inc* v. *United States*, Case No. 1:11-cv-00268-EGB, U.S. Court of Federal Claims (May 15, 2013).
Deposition Transcript of Sant R. Arora, *SecurityPoint Holdings, Inc* v. *United States*, Case No. 1:11-cv-00268-EGB, U.S. Court of Federal Claims (Jun. 4, 2013).
Deposition Transcript of Dr. Layek Abdel-Malek, *SecurityPoint Holdings, Inc* v. *United States*, Case No. 1:11-cv-00268-EGB, U.S. Court of Federal Claims (Jun. 6, 2013).
Deposition Transcript of Dr. Layek Abdel-Malek, *SecurityPoint Holdings, Inc* v. *United States*, Case No. 1:11-cv-00268-EGB, U.S. Court of Federal Claims (Nov. 15, 2013).
Deposition Transcript of Joe Ambrefe, *SecurityPoint Holdings, Inc* v. *United States*, Case No. 1:11-cv-00268-EGB, U.S. Court of Federal Claims (Nov. 28, 2012).
Complaint by SecurityPoint, *SecurityPoint Media, LLC* v. *The Adason Group, LLC et al.*, Case No. 8:07-cv-00444-SCB-TGW, Dkt. No. 1 (U.S. Dist. Ct. Middle District of Fla. Filed Mar. 12, 2007).
Answer and affirmative defenses and counterclaim by The Conner Group, Stephen Conner, *SecurityPoint Media, LLC* v. *The Adason Group, LLC et al.*, Case No. 8:07-cv-00444-SCB-TGW, Dkt. No. 15 (U.S. Dist. Ct. Middle District of Fla. Filed Apr. 2, 2007).
Answer and affirmative defenses and counterclaim by The Adason Group, *SecurityPoint Media, LLC* v. *The Adason Group, LLC et al.*, Case No. 8:07-cv-00444-SCB-TGW, Dkt. No. 16 (U.S. Dist. Ct. Middle District of Fla. Filed Apr. 4, 2007).
Motion to dismiss Third Counterclaim of Defendants the Conner Group and Stephen Conner by SecurityPoint, *SecurityPoint Media, LLC* v. *The Adason Group, LLC et al.*, Case No. 8:07-cv-00444-SCB-TGW, Dkt. No. 19 (U.S. Dist. Ct. Middle District of Fla. Filed Apr. 23, 2007).
Motion to dismiss Third Counterclaim of Defendants the Adason Group by SecurityPoint, *SecurityPoint Media, LLC* v. *The Adason*

(56) References Cited

OTHER PUBLICATIONS

Group, LLC et al., Case No. 8:07-cv-00444-SCB-TGW, Dkt. No. 20 (U.S. Dist. Ct. Middle District of Fla. Filed Apr. 24, 2007).

Response to Motion to dismiss Third Counterclaim of Defendants the Conner Group and Stephen Conner by SecurityPoint, *SecurityPoint Media, LLC* v. *The Adason Group, LLC et al.*, Case No. 8:07-cv-00444-SCB-TGW, Dkt. No. 24 (U.S. Dist. Ct. Middle District of Fla. Filed May 7, 2007).

Response to Motion to dismiss Third Counterclaim of Defendants the Adason Group by SecurityPoint, *SecurityPoint Media, LLC* v. *The Adason Group, LLC et al.*, Case No. 8:07-cv-00444-SCB-TGW, Dkt. No. 25 (U.S. Dist. Ct. Middle District of Fla. Filed May 8, 2007).

Order directing defendants to file amended counterclaims, *SecurityPoint Media, LLC* v. *The Adason Group, LLC et al.*, Case No. 8:07-cv-00444-SCB-TGW, Dkt. No. 26 (U.S. Dist. Ct. Middle District of Fla. Filed May 8, 2007).

First Amended Counterclaim by The Conner Group, Stephen Conner, *SecurityPoint Media, LLC* v. *The Adason Group, LLC et al.*, Case No. 8:07-cv-00444-SCB-TGW, Dkt. No. 32 (U.S. Dist. Ct. Middle District of Fla. Filed May 21, 2007).

First Amended Counterclaim by The Adason Group, *SecurityPoint Media, LLC* v. *The Adason Group, LLC et al.*, Case No. 8:07-cv-00444-SCB-TGW, Dkt. No. 33 (U.S. Dist. Ct. Middle District of Fla. Filed May 21, 2007).

Order denying motion to dismiss as moot, *SecurityPoint Media, LLC* v. *The Adason Group, LLC et al.*, Case No. 8:07-cv-00444-SCB-TGW, Dkt. No. 35 (U.S. Dist. Ct. Middle District of Fla. Filed May 22, 2007).

Motion to dismiss Third and Fourth Counterclaims, *SecurityPoint Media, LLC* v. *The Adason Group, LLC et al.*, Case No. 8:07-cv-00444-SCB-TGW, Dkt. No. 47 (U.S. Dist. Ct. Middle District of Fla. Filed Jun. 11, 2007).

Response to Motion to dismiss Third and Fourth Counterclaims, *SecurityPoint Media, LLC* v. *The Adason Group, LLC et al.*, Case No. 8:07-cv-00444-SCB-TGW, Dkt. No. 49 (U.S. Dist. Ct. Middle District of Fla. Filed Jun. 28, 2007).

Reply to Motion to dismiss Third and Fourth Counterclaims, *SecurityPoint Media, LLC* v. *The Adason Group, LLC et al.*, Case No. 8:07-cv-00444-SCB-TGW, Dkt. No. 52 (U.S. Dist. Ct. Middle District of Fla. Filed Jul. 23, 2007).

Order denying motion to dismiss, *SecurityPoint Media, LLC* v. *The Adason Group, LLC et al.*, Case No. 8:07-cv-00444-SCB-TGW, Dkt. No. 56 (U.S. Dist. Ct. Middle District of Fla. Filed Aug. 7, 2007).

Order for patent infringement case, *SecurityPoint Media, LLC* v. *The Adason Group, LLC et al.*, Case No. 8:07-cv-00444-SCB-TGW, Dkt. No. 58 (U.S. Dist. Ct. Middle District of Fla. Filed Aug. 9, 2007).

Reply to counterclaim, *SecurityPoint Media, LLC* v. *The Adason Group, LLC et al.*, Case No. 8:07-cv-00444-SCB-TGW, Dkt. No. 61 (U.S. Dist. Ct. Middle District of Fla. Filed Aug. 21, 2007).

Reply to counterclaim, *SecurityPoint Media, LLC* v. *The Adason Group, LLC et al.*, Case No. 8:07-cv-00444-SCB-TGW, Dkt. No. 62 (U.S. Dist. Ct. Middle District of Fla. Filed Aug. 21, 2007).

Joint Motion for Protective Order, *SecurityPoint Media, LLC* v. *The Adason Group, LLC et al.*, Case No. 8:07-cv-00444-SCB-TGW, Dkt. No. 64 (U.S. Dist. Ct. Middle District of Fla. Filed Aug. 28, 2007).

Order granting motion protective order, *SecurityPoint Media, LLC* v. *The Adason Group, LLC et al.*, Case No. 8:07-cv-00444-SCB-TGW, Dkt. No. 66 (U.S. Dist. Ct. Middle District of Fla. Filed Sep. 5, 2007).

Motion to compel by SecurityPoint and Exhibits A-Q, *SecurityPoint Media, LLC* v. *The Adason Group, LLC et al.*, Case No. 8:07-cv-00444-SCB-TGW, Dkt. No. 70 (U.S. Dist. Ct. Middle District of Fla. Filed Oct. 11, 2007).

Motion to compel by Defendants and Exhibits A-G, *SecurityPoint Media, LLC* v. *The Adason Group, LLC et al.*, Case No. 8:07-cv-00444-SCB-TGW, Dkt. No. 71 (U.S. Dist. Ct. Middle District of Fla. Filed Oct. 16, 2007).

Response to motion to compel by SecurityPoint and Exhibits A-C, *SecurityPoint Media, LLC* v. *The Adason Group, LLC et al.*, Case No. 8:07-cv-00444-SCB-TGW, Dkt. No. 77 (U.S. Dist. Ct. Middle District of Fla. Filed Oct. 29, 2007).

Notice of Compliance by SecurityPoint, *SecurityPoint Media, LLC* v. *The Adason Group, LLC et al.*, Case No. 8:07-cv-00444-SCB-TGW, Dkt. No. 82 (U.S. Dist. Ct. Middle District of Fla. Filed Nov. 9, 2007).

Supplemental motion to compel by SecurityPoint and Exhibits 1-9, *SecurityPoint Media, LLC* v. *The Adason Group, LLC et al.*, Case No. 8:07-cv-00444-SCB-TGW, Dkt. No. 83 (U.S. Dist. Ct. Middle District of Fla. Filed Nov. 13, 2007).

Order granting motion to compel by SecurityPoint, *SecurityPoint Media, LLC* v. *The Adason Group, LLC et al.*, Case No. 8:07-cv-00444-SCB-TGW, Dkt. No. 88 (U.S. Dist. Ct. Middle District of Fla. Filed Nov. 16, 2007).

Order that cause dismissed without prejudice based upon telephonic notice of settlement, *SecurityPoint Media, LLC* v. *The Adason Group, LLC et al.*, Case No. 8:07-cv-00444-SCB-TGW, Dkt. No. 89 (U.S. Dist. Ct. Middle District of Fla. Filed Nov. 20, 2007).

Motion to reopen case and enforce interim settlement agreement by SecurityPoint and Exhibits 1-3, *SecurityPoint Media, LLC* v. *The Adason Group, LLC et al.*, Case No. 8:07-cv-00444-SCB-TGW, Dkt. No. 90 (U.S. Dist. Ct. Middle District of Fla. Filed Jan. 18, 2008).

Proposed consent judgment, *SecurityPoint Media, LLC* v. *The Adason Group, LLC et al.*, Case No. 8:07-cv-00444-SCB-TGW, Dkt. No. 93 (U.S. Dist. Ct. Middle District of Fla. Filed Jan. 23, 2008).

Order of Permanent Injunction and Final Judgment, *SecurityPoint Media, LLC* v. *The Adason Group, LLC et al.*, Case No. 8:07-cv-00444-SCB-TGW, Dkt. No. 95 (U.S. Dist. Ct. Middle District of Fla. Filed Jan. 24, 2008).

Motion Enforcement of Settlement Agreement by SecurityPoint, *SecurityPoint Media, LLC* v. *The Adason Group, LLC et al.*, Case No. 8:07-cv-00444-SCB-TGW, Dkt. No. 97 (U.S. Dist. Ct. Middle District of Fla. Filed Feb. 5, 2008).

Response to Motion Enforcement of Settlement Agreement by SecurityPoint, *SecurityPoint Media, LLC* v. *The Adason Group, LLC et al.*, Case No. 8:07-cv-00444-SCB-TGW, Dkt. No. 98 (U.S. Dist. Ct. Middle District of Fla. Filed Feb. 25, 2008).

Order granting Motion Enforcement of Settlement Agreement by SecurityPoint, *SecurityPoint Media, LLC* v. *The Adason Group, LLC et al.*, Case No. 8:07-cv-00444-SCB-TGW, Dkt. No. 103 (U.S. Dist. Ct. Middle District of Fla. Filed Apr. 11, 2008).

Judgment in favor of SecurityPoint, *SecurityPoint Media, LLC* v. *The Adason Group, LLC et al.*, Case No. 8:07-cv-00444-SCB-TGW, Dkt. No. 104 (U.S. Dist. Ct. Middle District of Fla. Filed Apr. 11, 2008).

Complaint by SecurityPoint and Exhibit A, *SecurityPoint Media, LLC* v. *The Adason Group, LLC*, Case No. 8:07-cv-00100-SCB-EAJ, Dkt. No. 1 (U.S Dist. Ct. Middle District of Fla. Filed Jan. 16, 2007).

Motion to dismiss Complaint by The Adason Group and Attachment, *SecurityPoint Media, LLC* v. *The Adason Group, LLC*, Case No. 8:07-cv-00100-SCB-EAJ, Dkt. No. 7 (U.S Dist. Ct. Middle District of Fla. Filed Feb. 22, 2007).

Notice of Voluntary Dismissal by SecurityPoint, *SecurityPoint Media, LLC* v. *The Adason Group, LLC*, Case No. 8:07-cv-00100-SCB-EAJ, Dkt. No. 8 (U.S Dist. Ct. Middle District of Fla. Filed Mar. 12, 2007).

Order, *SecurityPoint Media, LLC* v. *The Adason Group, LLC*, Case No. 8:07-cv-00100-SCB-EAJ, Dkt. No. 9 (U.S Dist. Ct. Middle District of Fla. Filed Mar. 14, 2007).

Defendant's Initial Disclosure of Prior Art and Production, *SecurityPoint Media, LLC* v. *The Adason Group LLC et al.* Case No. 8:07-cv-00444-SCB-TGW (U.S. Dist. Ct. Middle District of Fla. Served Sep. 13, 2007).

Plaintiff's Claim Chart, *SecurityPoint Media, LLC* v. *The Adason Group LLC et al.* Case No. 8:07-cv-00444-SCB-TGW (U.S. Dist. Ct. Middle District of Fla. Served Oct. 18, 2007).

Expert Witness Report of Robert Cammaroto in support of Defendant, *SecurityPoint Holdings, Inc* v. *United States*, Case No. 1:11-cv-00268-EGB, U.S. Court of Federal Claims (Jul. 24, 2014).

Ex. 1 (Resume) to Expert Witness Report of Robert Cammaroto in support of Defendant, *SecurityPoint Holdings, Inc* v. *United States*, Case No. 1:11-cv-00268-EGB, U.S. Court of Federal Claims (Jul. 24, 2014).

Expert Witness Report of Gloria Bender in support of Defendant, *SecurityPoint Holdings, Inc* v. *United States*, Case No. 1:11-cv-00268-EGB, U.S. Court of Federal Claims (Jul. 24, 2014).

(56) References Cited

OTHER PUBLICATIONS

Ex. 1 (Resume) to Expert Witness Report of Gloria Bender in support of Defendant, *SecurityPoint Holdings, Inc* v. *United States*, Case No. 1:11-cv-00268-EGB, U.S. Court of Federal Claims (Jul. 24, 2014).
Ex. 3 (Excerpts from Handbook of Industrial Engineering) to Expert Witness Report of Gloria Bender in support of Defendant, *SecurityPoint Holdings, Inc* v. *United States*, Case No. 1:11-cv-00268-EGB, U.S. Court of Federal Claims (Jul. 24, 2014).
Ex. 12 (TSA's Passenger Security Field Guide) to Expert Witness Report of Gloria Bender in support of Defendant, *SecurityPoint Holdings, Inc* v. *United States*, Case No. 1:11-cv-00268-EGB, U.S. Court of Federal Claims (Jul. 24, 2014).
Ex. 14 (The Apron and Terminal Building Planning Manual) to Expert Witness Report of Gloria Bender in support of Defendant, *SecurityPoint Holdings, Inc* v. *United States*, Case No. 1:11-cv-00268-EGB, U.S. Court of Federal Claims (Jul. 24, 2014).
Ex. 15 (Airport Development Reference Manual by Int'l Air Transport Ass'n) to Expert Witness Report of Gloria Bender in support of Defendant, *SecurityPoint Holdings, Inc* v. *United States*, Case No. 1:11-cv-00268-EGB, U.S. Court of Federal Claims (Jul. 24, 2014).
Expert testimony in accordance with Rule of the Court of Federal Claims 26(a)(2)(C) of Robert Gentry, *SecurityPoint Holdings, Inc* v. *United States*, Case No. 1:11-cv-00268-EGB, U.S. Court of Federal Claims (Jul. 24, 2014).
Ex. 12 (Photos of Herman Miller carts) to Expert testimony in accordance with Rule of the Court of Federal Claims 26(a)(2)(C) of Robert Gentry, *SecurityPoint Holdings, Inc* v. *United States*, Case No. 1:11-cv-00268-EGB, U.S. Court of Federal Claims (Jul. 24, 2014).
Ex. 13 (Emails discussing TSA engineering duties) to Expert testimony in accordance with Rule of the Court of Federal Claims 26(a)(2)(C) of Robert Gentry, *SecurityPoint Holdings, Inc* v. *United States*, Case No. 1:11-cv-00268-EGB, U.S. Court of Federal Claims (Jul. 24, 2014).
Ex. 14 (Diagram of three-cart rotation at DFW and explanation) to Expert testimony in accordance with Rule of the Court of Federal Claims 26(a)(2)(C) of Robert Gentry, *SecurityPoint Holdings, Inc* v. *United States*, Case No. 1:11-cv-00268-EGB, U.S. Court of Federal Claims (Jul. 24, 2014).
Expert testimony in accordance with Rule of the Court of Federal Claims 26(a)(2)(C) of James Spriggs, *SecurityPoint Holdings, Inc* v. *United States*, Case No. 1:11-cv-00268-EGB, U.S. Court of Federal Claims (Jul. 24, 2014).
Ex. 12 (Article "Passengers Get Double the Room at New Metro Airport Security Screening Checkpoint") to Expert testimony in accordance with Rule of the Court of Federal Claims 26(a)(2)(C) of Robert Gentry, *SecurityPoint Holdings, Inc* v. *United States*, Case No. 1:11-cv-00268-EGB, U.S. Court of Federal Claims (Jul. 24, 2014).
Complaint, *SecurityPoint Holdings, L.L.C.* v. *U.S.A.*, No. 11-cv-268 (U.S. Ct. Fed. Cl. filed May 2, 2011).

\* cited by examiner

METHODS AND SYSTEMS FOR EFFICIENT SECURITY SCREENING

CROSS REFERENCE

This application is a continuation-in-part of nonprovisional U.S. patent application Ser. No. 12/411,991, filed Mar. 26, 2009, which in turn claims the benefit, under 35 U.S.C. §119, of provisional U.S. Application Ser. No. 61/040,425, filed Mar. 28, 2008, the entire contents and substance of which is hereby incorporated by reference.

FIELD

The present invention relates to a security checkpoint. More particularly, the present invention relates to systems and methods for efficient and optimized security screening of people and personal belongings at a security checkpoint.

BACKGROUND

As various threats to safety have developed and evolved, the importance of security has increased. An unfortunate side-effect of increased security has been, at least so far, increased inconvenience. The inconvenience manifests itself in various ways, including lost time, confusion, anxiety, increased stress, intimidation, and/or general lack of comfort. Security checks often occur at a security checkpoint. Such security checkpoints are now present at various private and government-owned buildings, travel facilities, and other places. One way of reducing the downside of increased security may be improving, enhancing and/or optimizing various environmental or atmospheric conditions and other aspects of security checkpoints. At present security checkpoints are often thrown together in a utilitarian manner utilizing only readily available materials and technologies, primarily focused only on technology and function and other factors are partially or wholly discounted and/or ignored.

SUMMARY

In some embodiments, the systems and methods will provide an enhanced customer experience at security checkpoints by improving atmospheric conditions. In other embodiments, the systems and methods will provide enhanced security at security checkpoints. In further embodiments the systems and methods will provide enhanced security while providing an enhanced customer experience at the security checkpoint. In some embodiments the security checkpoint is a checkpoint for persons about to travel. In some instances a person is passing from a non-secure area into a secure area.

In some embodiments the present invention is a system or method of managing the set-up and/or maintenance of a security checkpoint or a set of security checkpoints. In some embodiments such management would facilitate the selection and integration of optimal atmospheric conditions, environment, technology, materials and/or advertising. In some embodiments the security checkpoint may be designed with the goal of establishing a seamless combination of form and function to deliver high security in an inviting atmosphere designed, deployed, maintained and updated with form equal to function to maximize available technology and the unique space or footprint associated with each environment. Doing so may enhance the customer experience, available technologies and the security process. In some embodiments the management may also generate revenue for the entity that runs the checkpoint or security area. In some such embodiments the security checkpoint may become a self-funded security enhancement focused on customer service.

In some embodiments the present invention is a system. In some such embodiments the present invention is a security checkpoint system that includes a line management system or queuing process; an identification checking station, a security station(s); and a recomposure station; wherein the security checkpoint is optimized with respect to one more aspects selected from the group consisting of design and décor, audio characteristics, information presentation, and efficiency in passing customers through the security checkpoint. In certain embodiments the line management or queuing system is configured to perform one or more functions selected from the group consisting of minimizing customers' time on line, providing appointments for customers' security checkpoint appearance, tracking one or more customers' progress, calculating and communicating wait times, increasing throughput at the security checkpoint, providing information (such as passenger wait time information), and diverting one or more customers to other security checkpoints and/or screening stations having lesser wait times. In certain embodiments, the system also makes accommodations for special security process lanes including but not limited to Registered Travelers, frequent or preferred or premium customers, employees, and/or customers having an appointment. In other embodiments the identification checking station is configured to perform one or more functions selected from the group consisting of verification of the authenticity of an ID identifier and determining whether a customer is a person of interest. In further embodiments the security station comprises one or more elements selected from the group consisting of a screening device and a remote security station. In certain embodiments the remote security station includes remote personnel with high or special skill in interpreting images. In some embodiments such remote personnel interpret results of technology images such as x-rays. In some embodiments the recomposure station comprises one or more elements selected from the group consisting of a specifically designed shelf, a table, a bench, and a leaning post or rail to facilitate a customer's replacement of his/her shoes or articles of clothing with minimal time and maximum efficiency to recompose so the customer promptly moves on and away from the checkpoint relieving a common chokepoint. In various embodiments, the systems herein may allow for passenger segmentation based on potential passenger risk. For instance, the systems herein may allow for lesser screening, scrutiny (and perhaps lesser wait times) for passengers who have been preapproved based on past security check-ins, past security screening, background checks, biometric information, or other preapproval methods. The system herein may also allow for greater screening, scrutiny (and perhaps greater wait times) for passengers that are deemed higher risk passengers.

In certain embodiments the security checkpoint is optimized with respect to design and décor taking into account architectural design and local preferences as well as federal, state and local security requirements and wherein the optimization comprises one or more elements selected from the group consisting of integrating the design of the security checkpoint with other areas of the facility, creating a décor and design of a security checkpoint that is substantially similar to a security checkpoint at another location, utilizing a color scheme and atmospheric conditions that has a positive effect on customer behavior in and around the security checkpoint, ensuring that various security checkpoints—that may have a different theme or color combination than one another—have a recognizable commonality such that they may each have a certain familiarity to a customer, and utilizing design materials with the objective that they have a positive effect on customer behavior and/or emotion in and around the security checkpoint. In other embodiments the security checkpoint is optimized with respect to audio characteristics and wherein the optimization comprises one or more elements selected from the group consisting of reduction of extraneous noise in and around the security checkpoint, communicating audio instructions at optimal sound levels and using a voice that has a positive and/or calming effect on customer behavior in and around the security checkpoint and playing music or sounds that have a positive effect on customer behavior in and around a security checkpoint. For instance, in some embodiments, the positive effect may include laughter, such as children's laughter (e.g., at inaudible or undetectable levels). In some embodiments the positive effect is calming and causes a heightened awareness and/or increased receptivity to stimuli. As an example, in some embodiments, there may be added natural or artificial sounds (including, e.g., white noise or pink noise) into the security checkpoint to cover up unwanted sounds by using auditory masking techniques. Such auditory masking techniques may reduce or eliminate passengers' awareness of pre-existing sounds in the security checkpoint. As another example, in various embodiments, specific sounds may be chosen to trigger calming, soothing, anxiety-reducing, or other neurological response of passengers. In various embodiments, audio may comprise directional audio with particular sounds directed to particular passengers or locations where passengers may be depending, for example, on the location of the particular passengers at a particular point within the security checkpoint. By directing audio to passengers at various locations throughout the security checkpoint, various embodiments may provide an efficient way to provide highly granular triggers that affect the behavior and experience of passengers throughout the security checkpoint. In some embodiments the security checkpoint is optimized with respect to communication or transfer of information and wherein the optimization comprises one or more elements selected from the group consisting of reducing provision of extraneous information, modifying the type or category of advertising presented, segmenting the content of advertising presented to align with the customer demographics at various times throughout the day, modifying the frequency or volume of advertising presented, modifying the placement of advertising and use of integrated signage using standards of environmental graphics and environmental engineers as well as interior and architectural design. In other embodiments the security checkpoint is optimized with respect to efficiency in passing customers through the security checkpoint and wherein the optimization comprises one or more elements from the group consisting of optimization of décor and design, optimization of audio characteristics, optimization of customer service, and optimization of information presentation.

In yet other embodiments the present invention includes a security checkpoint system including: integrated signage configured to provide one or more of the group consisting of advertising, travel information, checkpoint information, instructions for the security process, creating an identity for the facility; an identification checking station, wherein the identification checking station is configured to perform one or more functions selected from the group consisting of verification of the authenticity of an ID identifier or biometric verification and determining whether a customer is a person of interest; security station(s), wherein a customer or an item in customer's possession is inspected; and a remote security station, wherein said remote security station inspects the customer or an item in customer's possession and may be redundant to an on site officer; wherein the security checkpoint system is optimized with respect to one more aspects selected from the group consisting of design and décor, audio characteristics, information presentation, and efficiency in passing customers through the security checkpoint.

In some embodiments the present invention is a method. In some such embodiments the present invention is a method including: optimizing a security checkpoint with respect to one more atmospheric conditions or aspects selected from the group consisting of design and décor, architectural design, environmental graphics, local preferences, federal, state, and local security requirements, audio characteristics, olfactory characteristics, information display, and efficiency in passing customers through the security checkpoint, and wait times, wherein said optimizing may occur at one or more of the group selected from a line management system, an identification checking station, screening technology; and a recomposure station of the security checkpoint.

In other embodiments the present invention is a method including: optimizing the presentation of signage including advertising at a security checkpoint, wherein the optimizing includes one or more elements selected from the group consisting of modifying the category of advertising presented, segmenting the category of advertising presented, modifying the content of advertising presented, modifying the amount of advertising presented, modifying the placement of advertising and use of integrated signage to provide advertising, and analyzing usage of a security checkpoint with respect to one or more aspects selected from the group consisting of date, time, volume, checkpoint staffing level, security threat level, customer flow, and customer demographics. Various embodiments may use indoor positioning technologies, such as micro-fencing, Bluetooth low energy (BTLE), wireless network triangulation, Global Positioning System (GPS) technology, and/or other positioning technologies to receive information regarding passengers, direct information to passengers, and/or advertising to passengers throughout the security checkpoint.

A path of a security checkpoint may lead from an entrance to an identification checkpoint, and from the identification checkpoint to at least one recomposure station. The path may continue from the recomposure station to an exit. Those skilled in the art will appreciate that the path may branch to multiple paths (e.g., from the identification checkpoint to multiple lines for passing through or by a scanner at the checkpoint. A display may display an expected wait time for at least one person to pass from the entrance to the exit of the security checkpoint, the person using at least a first portion of the path. A first audio system may provide a type of music to a first area covering at least a second portion of the path, a location of the first area and the type of music determined based on proximity of the second portion of the path to the identification checking station. A second audio system may provide instructions to a second area covering at least a third portion of the path, a location of the second area determined based on proximity of the third portion to the identification checking station.

Those skilled in the art will appreciate that proximity may be measured based on the length of the path to a point (e.g., identification station or scanner). For example, the path may provide for many turns around connected stanchions. Proximity may be measured along the path around the turns defined by the stanchions.

In some embodiments, the expected wait time displayed on the display may be calculated based on a crowdsourced wait time taken from a plurality of people who have passed through the entrance of the security checkpoint. The expected time may be calculated based historical wait time data related to the security checkpoint. The expected wait time may be calculated based on motion information from one or more motion sensors configured to monitor motion of people passing through the security checkpoint.

In various embodiments, the first portion of the path substantially overlaps either the second portion of the path or the third portion of the path. In some embodiments, the security checkpoint may further comprise an architecturally optimized system adapted to provide design, décor, and other visually appealing attributes to passengers through the security checkpoint. The security checkpoint may also further comprise an optimized tray system having one or more trays, the one or more trays comprising one or more radio opaque tether identifiers for identification through a scanner of the security checkpoint.

In some embodiments, one or more of the first audio system and the second audio system may be configured to provide directional audio. The type of music may be further determined on proximity of the second portion of the path to a scanner of the security checkpoint. The first type of music may comprise uptempo music. The type of music may comprise soothing music. The system may further comprise a third audio system configured to provide instructions over a fourth portion of the path, the instructions being based on proximity to the identification checkpoint and/or the scanner. The system may also further comprise a fourth audio system configured to provide advertising over a fifth portion of the path. The location of the fifth portion of the path may be based on proximity of the fifth portion of the path to the identification checkpoint and/or the scanner.

In a method, an expected wait time may be displayed, for at least one person to pass from an entrance of a security checkpoint to exit of the security checkpoint, the person using at least a first portion of a path leading from an entrance of the security checkpoint to at least one identification checkpoint, and leading from the at least one identification checkpoint to at least one recomposure station of the security checkpoint. A type of music may be provided to a first area covering at least a second portion of the path, a location of the first area and the type of music determined based on proximity of the second portion of the path to the identification checking station. Instructions may be provided to a second area covering at least a third portion of the path, a location of the second area determined based on proximity of the third portion to the identification checking station.

A security checkpoint may include: means for displaying an expected wait time for at least one person to pass from an entrance of a security checkpoint to exit of the security checkpoint, the person using at least a first portion of a path leading from an entrance of the security checkpoint to at least one identification checkpoint, and leading from the at least one identification checkpoint to at least one recomposure station of the security checkpoint; means for providing a type of music to a first area covering at least a second portion of the path, a location of the first area and the type of music determined based on proximity of the second portion of the path to the identification checking station; and means for providing instructions to a second area covering at least a third portion of the path, a location of the second area determined based on proximity of the third portion to the identification checking station.

DETAILED DESCRIPTION OF THE DRAWINGS

Figure 1:
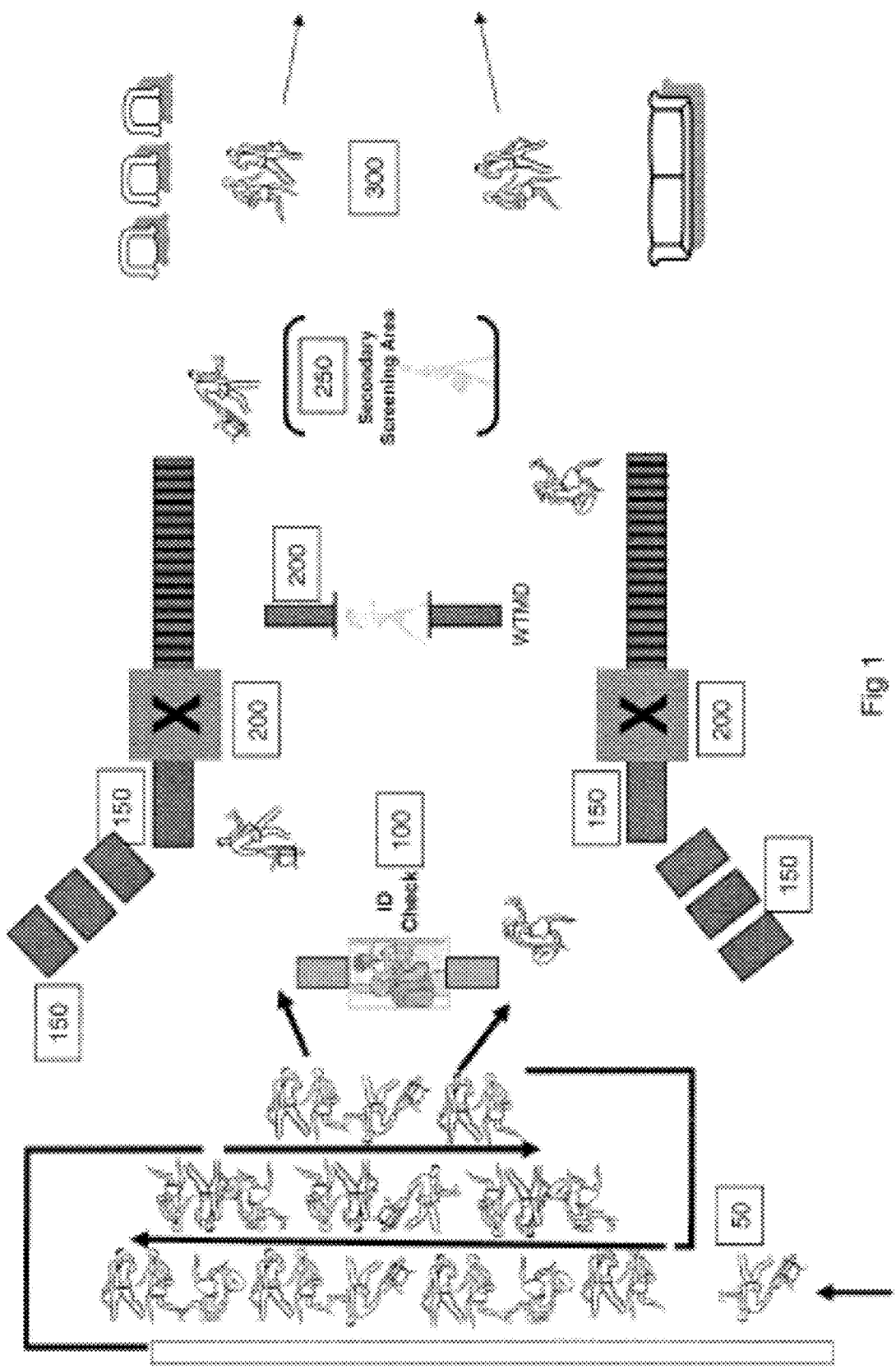
FIG. 1 is an illustration of an embodiment of an exemplary security checkpoint.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Definitions

A "customer" is a person who is proceeding through a security checkpoint and/or a person who is about to proceed through a checkpoint from a non-secure area to a secure area.

An "ID identifier" is a document or biometric measure that provides a picture and/or other personal information of the holder sufficient to identify the holder. Examples include but are not limited to a driver's license, a state issued identification card, and a foreign or United States passport and other federal, international or privately issued documents recognized and accepted for positive identification. Biometric measure may include finger prints, facial recognition, evaluation of passenger Deoxyribonucleic acid (DNA), and/or retinal scanning An "RFID" tag is an object that can be applied to or incorporated into a person or thing for the purpose of identification or monitoring of that person or thing using radiowaves. An RFID tag may be associated with a radio opaque holder or sleeve to preserve the security of the RFID tag when the RFID tag is not actively being used for identification/monitoring, or under other circumstances. An RFID tag may be associated with a wearable device that identifies a location of a particular passenger. Such a wearable RFID tag may be associated with radio opaque identifiers placed on trays that allow the trays to be visually identified when the trays are passing through a scanner of a security checkpoint. Such radio opaque identifiers may uniquely identify particular trays. Such radio opaque identifiers may be used to tether users to trays for identification purposes, as disclosed in U.S. Pat. No. 6,888,460. As a result, in various embodiments, radio opaque identifiers on trays may be tethered to wearable devise on passengers so that the passengers' locations may be monitored as the passengers travel through the security checkpoint.

A "security checkpoint" may be any place designed to enhance security by interactions with people and or technology. For example a security checkpoint may be a place where a person is questioned, observed, inspected, scanned and/or otherwise checked and/or a person's items and/or belongings are inspected, scanned and/or otherwise checked. The security checkpoint includes the non-secure areas where customers line up or begin preparing to enter or enter the queue to enter the security area, the area where customers exit the checkpoint in a secure area, and all areas in between. The non-secure areas of the security checkpoint may also include areas around places where customers are questioned, observed, inspected, scanned and/or otherwise checked etc., where items and/or belongings are inspected, scanned and/or otherwise checked etc. For instance, non-secure areas of the security checkpoint may include areas that cover customer and item screening areas (e.g., the area within the screening facility up to the roof of the screening facility). The non-secure areas may also include restaurants, bars, stores, etc. Such security checkpoints may be found at privately-owned buildings, government-owned buildings, travel facilities, sporting events, museums or galleries, concerts, or the like. Design and layout may vary based on type of facility, age of the technology and limits of the environment and federal, state and local policy.

A "travel facility" is any place where persons go to travel from one place to another. Examples include airports, train stations, bus stations, subway stations, cruise terminals and tram or trolley stations.

A "master plan" refers to a plan or guidelines outlines the principals that guide all atmospheric conditions including environmental graphics, security objectives, federal, state and/or local regulations, local objectives, vision and advertising. The master plan also provides for oversight of the program and a single point of contact for coordination of all stakeholders including the TSA, airport management, security checkpoint management, and customers.

The "TSA" is the United States Transportation Security Administration.

The words "satellite receiver" when used in the context of the present invention, include any device capable of receiving data from a satellite and capable of sending the received data to another device.

The words "satellite uplink station" when used in the context of the present invention, include an apparatus capable of transmitting data to a satellite. A satellite uplink station may be implemented using one or more localized beacons.

The words "indoor positioning system," as used herein, may refer to a system of transmitters, receivers, and processors that are configured to provide a location of a particular individual or a particular mobile device within a secure facility. An indoor positioning system may be implemented in many ways without departing from the scope and substance of the inventive concepts discussed herein. For instance, in some embodiments, an indoor positioning system may include Global Positioning System (GPS) technologies, Near Field Communications (NFC) technologies, wireless triangulation technologies, and/or Bluetooth Low Energy (BTLE) technologies, etc. It is noted that the techniques relating to BTLE herein, while discussed by way of example, may apply equally to non "low-energy" Bluetooth technologies and/or to wireless technologies in general. Indoor positioning systems may further include facial recognition systems to identify particular passengers based on their facial characteristics. The indoor positioning systems discussed herein may or may not be related or otherwise associated with the satellite receivers, or other systems disclosed herein.

The word "controller" when used in the context of the present invention, includes any device capable of controlling the individual devices of the present invention, including receiving data from a satellite receiver, and/or sending data to a storage device, and/or receiving data from a storage device, and/or sending data to at least one video display. Additionally the controller may communicate with a GPS system and perform programming instructions.

The words "storage device" when used in the context of the present invention, include any device capable of storing analog or digital data received from the satellite receiver and storing any controller programming instructions. The storage device may also include a device that communicates with a controller by receiving controller requests for data and sending the appropriate data to the controller. The storage device may be any known storage media known in the art.

The words "video signal processor" when used in the context of the present invention, include any device capable of processing a single video signal for presentation across a video display matrix, by receiving, from wireless or non-wireless means, a single video signal, processing the signal for, and sending a video signal to each video display unit in a video display matrix, each signal representing a portion of the video to display on a single video display unit.

The words "programming instructions" when used in the context of the present invention, include computer executable code that when operated or followed by a controller instruct the controller to display, receive, and/or organize video data including, among others, display durations, start times, stop times, real time overrides, and/or location-specific start and stops.

"Information" when used in the context of the present invention includes any information that may be beneficial to a customer and/or the facility operating the security checkpoint and/or the person or entity overseeing operation of the security checkpoint. Examples of information include, but are not limited to, advertising, travel, directions, instructions, news, information, information relating to the security checkpoint, information relating to security checkpoint wait times, information relating facility and national matters of interest, and/or information relating to entertainment.

"Advertising" when used in the context of the present invention includes sponsorship and any communication or display of information, and specifically third party information, which may, in one aspect, relate the sale of goods and/or services. In one aspect, "Advertising" may be in exchange for a fee, remuneration and/or compensation of any kind, including money and/or services.

"Atmospheric conditions" when used in the context of the present invention include the cleanliness, layout, design, auditory stimuli, environmental graphics, olfactory stimuli, textures and colors at and around the checkpoint.

The words "video data" when used in the context of the present invention, include any combination of electronically or magnetically recorded information that may be converted or presented on a screen, monitor or projected onto a surface and may be analog or digital.

The words "communicating", "coupled", "association" and any derivation thereof relate to the interaction between two devices and include both wireless and non-wireless means.

The words "sending", "receiving", and any derivation thereof include both wireless and non-wireless means.

Embodiments of the Present Invention
General

Certain embodiments of the present invention may provide cost savings, in particular to those hosting the security checkpoint and to the government agencies (e.g., the TSA) or private companies that may be responsible for staffing or supervising the security checkpoint. For example, by providing accurate information about activity, wait times, particular screening needs, particular scanning needs, and other information about security checkpoints, various embodiments may be used to inform security checkpoint staffing models. As a result, various embodiments may allow for security checkpoints to be adaptively staffed based on their present or anticipated needs. Adaptively staffing security checkpoints based on accurate information about the needs of those security checkpoints may provide numerous advantages over conventional previously existing staffing models, which tend to rely on less accurate measures of security checkpoint activity. Adaptively staffing security checkpoints based on accurate information about the needs of those security checkpoints may directly translate into cost savings. Such cost savings may come in the form of increased efficiency of personnel, reduction of on the job injuries, reduction of insurance claims for injured workers, reduction of personnel, increased automation, and/or enhanced retention of personnel.

Certain embodiments of the present invention may provide increased efficiency at security checkpoints. Such increased efficiency may include enhancing the experience of customers proceeding through the security checkpoint, passing customers through the security checkpoint in a more efficient and faster manner, decreasing the amount of time customers spend in line, and/or decreased mistakes (e.g., false positive or false negative screening results), heightened alertness of personnel, customers more attune to and open to stimuli including directions and improved moral and mood of customers and personnel. Such increased efficiency may allow for more efficient staffing. For instance, in some embodiments, security checkpoint staff may be configured to be directed to security checkpoints with more traffic.

In some embodiments security checkpoints may be said to have certain areas or aspects including one or more of (1) the general set-up, architectural design, layout and décor of the checkpoint; (2) the line and queue area where customers prepare to proceed through the security checkpoint; (3) identification checking/verification where the customer's identification is checked and/or verified; (4) divesting, where customers divest themselves of personal belongings and/or luggage for screening by available technology; (5) the security, the actual checking/inspection of customers and/or their belongings; (6) recomposure or exit, where customers collect any personal belongings/luggage and other materials and vacate the security checkpoint; and (7) secondary screening where customers are subjected to additional or redundant questioning/inspection. See, e.g., FIGS. 1-3.

For example FIG. 1 shows an exemplary security checkpoint. The exemplary checkpoint may have line or queuing area 50, ID checking station 100, divesting areas 150, security stations 200, secondary screening area 250, and recomposure area 300. Of course, various embodiments may not have each element present in FIG. 1 and various elements will have a configuration of elements that differs from that depicted in FIG. 1, for example as available technology changes certain areas may evolve or become extraneous.

Figure 2:
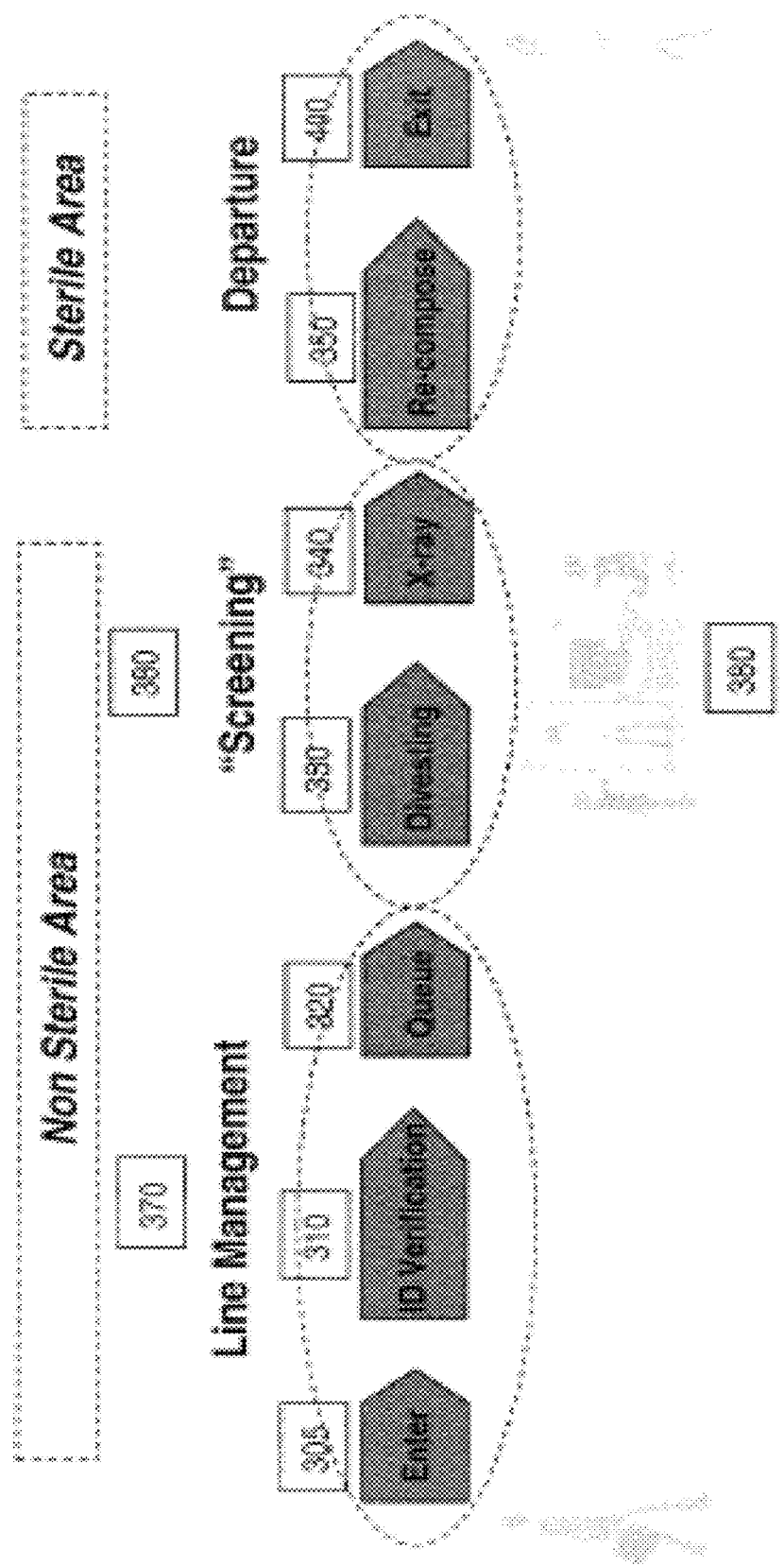
FIG. 2 is a block diagram showing an exemplary security checkpoint, according to some embodiments.

FIG. 2 illustrates an exemplary security checkpoint. FIG. 2 depicts line management and queuing system 370 which encompasses entry 305, ID verification 310, and queue (or line) 320. FIG. 2 also depicts security screening 380, which includes divesting area 330 and screening devices and technology 340. FIG. 2 further illustrates recomposure area 350 and exit 400.

Figure 3:
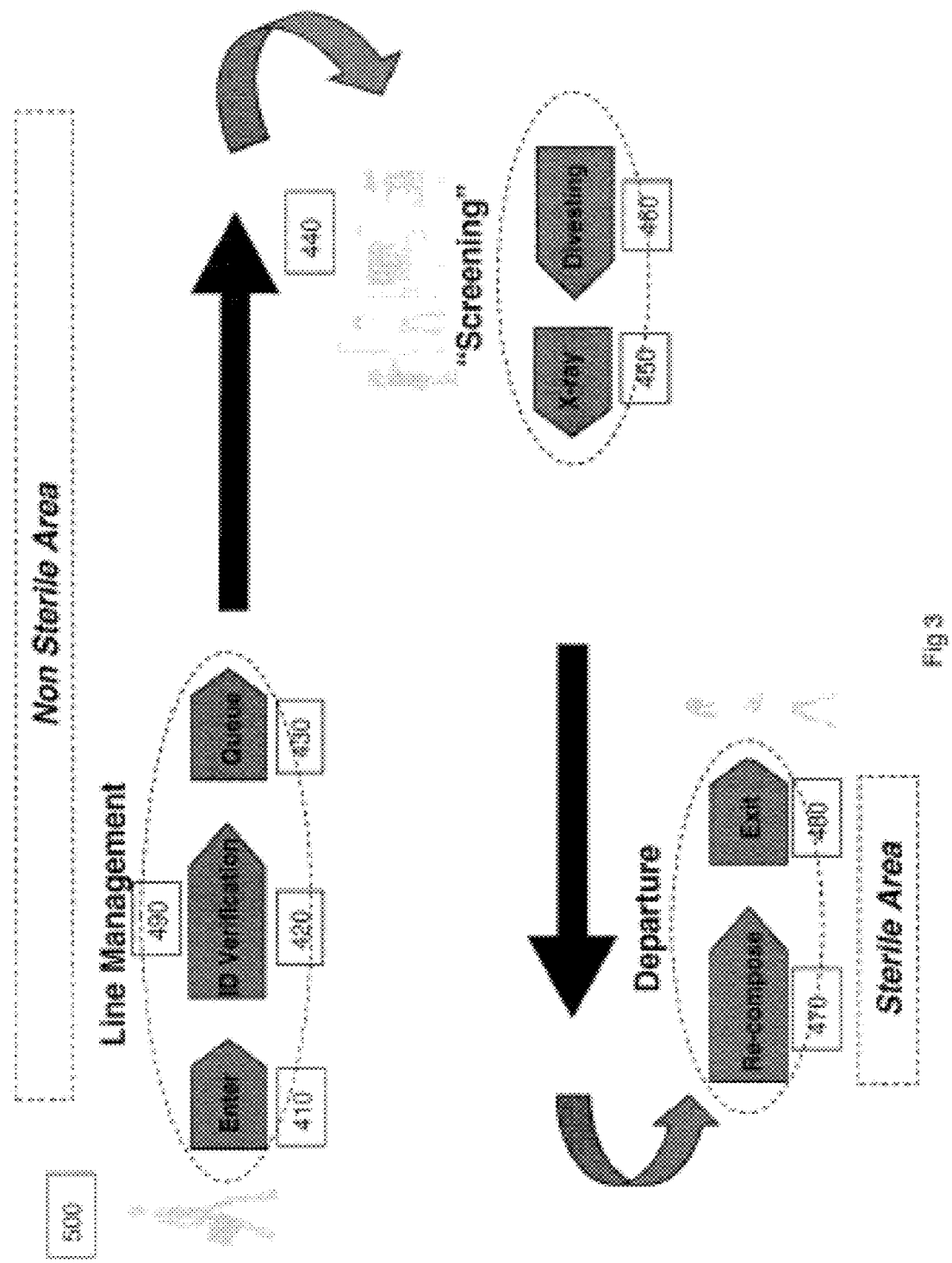
FIG. 3 is a flow chart showing an exemplary progression through a security checkpoint, according to some embodiments.

FIG. 3 illustrates a security checkpoint showing an exemplary paths or steps that a customer may take through a security checkpoint. Customer 500 first enters 410 the line management and queuing system 490 of the security checkpoint. Customer 500 next has his/her ID checked, verified, and/or authenticated 420 and proceeds through queue 430 toward security station 440. At or around security station 440, customer 500 divests 450 him or herself of any personal items and those items and customer 500 are scanned or screened with available technology 460. After proceeding through the security station 440, customer 500 recomposes 470 by collecting his/her items and preparing to move to their primary destination including repacking and placing articles of clothing or jewelry back on. After recomposing 470, customer 500 exits 480 the security checkpoint on the secure side.

In some embodiments the present invention includes or utilizes a security checkpoint that is optimized in various characteristics. In some embodiment the design and/or décor are optimized to enhance the customers' experience at the security checkpoint. In certain embodiments the audio characteristics of the security checkpoint may be optimized to enhance the customers' experience in moving through the security checkpoint. In other embodiments the organization of the security checkpoint, including signage, communication of information and directions and the like are optimized to enhance the customers' experience at the security checkpoint. In yet other embodiments olfactory, auditory, emotive and/or tactile aspects of the security checkpoint are optimized. In some embodiments, the wait time experiences of passengers accessing the security checkpoint are optimized. In various embodiments, passengers are provided a mobile application on their mobile devices; the mobile application may be configured to optimize passengers' experience when the passengers are passing through the security checkpoint.

In further embodiments the security checkpoint may be ergonomically optimized to reduce injuries to customers and/or personnel at the security checkpoint. In some such embodiments include materials to enhance the comfort and/or safety of the security checkpoint personnel. In some such embodiments antifatigue mats are used. In some such embodiments the antifatigue mats are improved or enhanced, for example, by having padding and/or non-slip or non-skid surfaces that are more durable and designed specifically for the checkpoint environment. In various embodiments, one or more mats may comprise antimicrobial or antibacterial mats that provide protection from microbes/bacteria of others. It is noted that antimicrobial/antibacterial mats may further have a psychological effect of providing many passengers with a cleaner, and hence calmer, experience through the security checkpoint. Further, as antimicrobial/antibacterial mats may limit the number of illnesses transmitted as a result of travelling, the antimicrobial/antibacterial mats may provide passengers with better memories of traveling and of particular security checkpoints that use the antimicrobial/antibacterial mats. In further embodiments, ergonomically optimized trays, carts, and other items used to facilitate scanning of passengers' items may be employed.

In some embodiments the security checkpoints of the present invention may use tracking technology. In some embodiments the tracking technology will track a customer and/or one or more of the customer's personal items and/or components of the security system such as divesting trays through the security checkpoint. In some such embodiments the tracking technology will match a particular customer to one or more of that customer's personal items. In some embodiments the tracking technology may be used to monitor approximate wait times for customers in a particular security checkpoint. In some such embodiments that information may be communicated to other customers via various means including public signage, email, mobile text messaging, notification within a mobile application on a mobile device of the passenger's, notifications to the passengers' social networking or social media accounts, voicemails to the passenger's mobile phone, or other means. In some embodiments the tracking technology may be an RFID tag, a visual tag, or other similar tag. The RFID tag may be protected by a radio opaque cover. In some embodiments, the RFID tag may be tethered to the passenger's mobile phone and/or used to track the passenger's luggage as the luggage moves throughout the security checkpoint. Tracking technology may employ indoor positioning systems, including GPS systems, Bluetooth low energy systems, wireless triangulation systems, and other positioning systems. In various embodiments, the tracking technology may employ facial recognition systems to recognize particular passengers based on their facial characteristics.

Optimization of Sensory Aspects

Various studies have shown that individuals, crowds, and crowd flow are affected by their environment. For example, the visual, audio, olfactory and/or tactile aspects of an individual's or a crowd's environment affect the manner in which that individual and/or that crowd behave and receptivity individual and/or crowd to external stimuli such as signage. In some embodiments the present invention includes a security checkpoint optimized in its sensory presentation to a customer such that a customer's behavior, mood and/or attitude are positively affected. In some embodiments the positive effect is one or more of a relatively calm demeanor, being more receptive to instruction and guidance, a decrease in anxiety, a decrease in stress, level of alertness, awareness of threat levels, increased efficiency and/or speed in progressing through the security checkpoint. In some embodiments one or more of the security checkpoint's visual, audio, olfactory and tactile aspects are optimized.

Olfactory Optimization

In some embodiments the security checkpoint's olfactory aspects are optimized. In certain embodiments the security checkpoint is sanitized to remove offensive or disruptive scents. In some such embodiments a fragrance and/or air freshener is dispensed in all or a portion of the security checkpoint. In some such embodiments, the fragrance or air freshener is a fragrance comprising one or more volatile organic compounds which are available from perfumery suppliers such as Firmenich Inc, Takasago Inc, Noville Inc., Quest Co., International Flavors & Fragrances, and Givaudan-Roure Corp. Most conventional fragrance materials are volatile essential oils. The fragrance can be a synthetically formed material, or a naturally derived oil such as oil of Bergamot, Bitter Orange, Lemon, Mandarin, Caraway, Cedar Leaf, Clove Leaf, Cedar Wood, Geranium, Lavender, Orange, Origanum, Petitgrain, White Cedar, Patchouli, Lavandin, Neroli, Rose absolute, and the like.

A wide variety of chemicals are known for perfumery, such as aldehydes, ketones, esters, alcohols, terpenes, and the like. A fragrance can be relatively simple in composition, or can be a complex mixture of natural and synthetic chemical components. Synthetic types of fragrance compositions either alone or in combination with natural oils are described in U.S. Pat. Nos. 4,324,915, 4,411,829; and 4,434,306, which are incorporated herein by reference. Other artificial liquid fragrances include geraniol, geranyl acetate, eugenol, isoeugenol, linalool, linalyl acetate, phenethyl alcohol, methyl ethyl ketone, methylionone, isobomyl acetate, and the like.

A liquid fragrance may also be formed into a thixotropic gel by the addition of a thickening agent, such as a cellulosic material, a polymeric thickener, or a fumed silica of the type marketed under the Cabosil trademark by Cabot Corporation. A fragrance ingredient can also be in the form of a crystalline solid, which has the ability to sublime into the vapor phase at ambient temperatures A crystalline fragrance starting material can be selected from organic compounds which include vanillin, ethyl vanillin, coumarin, tonalid, calone, heliotropene, musk xylol, cedrol, musk ketone benzophenone, raspberry ketone, methyl naphthyl ketone beta, phenyl ethyl salicylare, veltol, maltol, maple lactone, proeugenol acetate, evemyl, and the like. This type of fragrance can contribute a long term air-treatment capability to an air freshener dispenser device for use with the devices disclosed herein.

In some embodiments, olfactory optimization of the security checkpoint involves making the security checkpoint smell fresher and more invigorating for passengers. Such olfactory selections may be based on olfactory effects of passengers' nervous systems in order to leave passengers with a lasting positive experience of a particular security checkpoint.

Tactile Optimization

In some embodiments the tactile feel of the security checkpoint is optimized. In some embodiments materials are used that encourage customers to proceed through the security checkpoint in an efficient manner. In some embodiments one or more components of the security checkpoint are integrated with laminates or coverings to establish a deliberate design and décor to the checkpoint and serve to soften the harsh or cold components of a security checkpoint and have a positive effect on customer's mood. Components that may be so integrated include the walls and wall coverings, the floor and floor coverings, various current and future technologies including but not limited to x-ray machines, walk through metal detectors, trace element sensors or "puffer" machines, millimeter wave booths, tables, chairs, kiosks, permanent and temporary partitions, and/or private and semi private secondary screening areas including any area a customer sees or has contact with.

Audio Optimization

Sound can also impact moods. Likeable and familiar music can induce good moods, whereas discordant sounds can create bad moods and elevate tension. Slow tempo sounds sooth while a quicker tempo increases urgency. In some embodiments a security checkpoint's audio aspects are optimized and sounds may be segmented based on the position in the checkpoint; calming at the start of a long wait and a quicker tempo as the customer is preparing to be screened and when recomposing. In some embodiments the security checkpoints of the present invention utilize noise reduction technology and/or an audio communications system that provides a calming influence. In some embodiments the noise reduction technology is the use of materials that reduce or prevent hard plastic to plastic or metal to metal or metal to plastic contact. In some embodiments the noise reduction technology is used in floors, ceilings and/or walls such that sounds are minimized and/or softened or deadened. In other embodiments the noise reduction technology includes wrapping or covering certain elements of the security checkpoint to temper the sounds of various elements contacting each other.

In some embodiments the audio aspects are optimized by broadcasting sounds. In some such embodiments the broadcasted sounds are optimized. White noise can be generated with a digital sound synthesizing device. Sound designers, with some processing and filtering, can create a multitude of effects such as wind, rain, waterfall or surf. Some such embodiments use a high-quality speaker system that provides substantially clear sound at decibel levels that are appropriate for the particular checkpoint. In some embodiments the voice used to provide information is one that is generally soft and generally pleasant. In some embodiments music is played. In particular, music can influence physical behavior. Fast music may energize consumers. In some such embodiments the music is soothing and/or calming to the average person. Slow music can be soothing. The type of music you play can have dramatic and direct effects. For example, a fast tempo is more desirable in restaurants because customers will eat faster, thus allowing greater table turnover and higher sales. In some embodiments the sounds are transmitted over head while in other embodiments the sounds are delivered in close proximity to the traveler such as within the line management stanchions and may be interactive allowing for customer selection of instructions or sound type.

Visual Optimization

In some embodiments the security checkpoint is optimized in its visual appearance. Such optimization may include one or more of the use of certain materials, the physical design and organization of the security checkpoint (including providing a design that reduces clutter and gives the security checkpoint a more open/airy feel to the customer), the advertising and/or information presented at the security checkpoint, the colors presented at the checkpoint, and the uniforms/clothing worn by personnel at the checkpoint.

In certain embodiments the present invention includes development of a master plan or guidelines designed specifically for a security checkpoint to integrate all visual elements. In some embodiments the signage is governed by guidelines to maximize customer comprehension and observation of key information. In some embodiments such guidelines include reduction of information, as too much information and too many graphics at key points may serve only to confuse and frustrate the customer such that they are ultimately blocked-out by the customer. In some embodiments the security checkpoint components will have a specific design style such as the use or faux marble, wood, leather and such to convey a sense of style and purpose. The use of visual optimization elevates the necessary process of security screening while recognizing the customers importance and supporting customer service efforts and engendering goodwill.

In some embodiments the security checkpoint has a décor and design that is consistent with federal, state and local laws, rules and/or requirements, the architectural design, local preferences and décor of other parts of the facility such that the security checkpoint appears to be integrated with the facility's other parts. In other embodiments the security checkpoint has a décor and design that utilizes colors, materials and/or sounds that promote a calm demeanor among customers. In some such embodiments portions or all of various metal/concrete devices or structures are covered or wrapped such that their appearance is softened. In some such embodiments color is used and changed to encourage certain behaviors or emotions in customers. Preferably, a security checkpoint of the present invention will utilize colors and/or décor that present an authoritative, yet not intimidating or cold, atmosphere at the security checkpoint. In some embodiments, the décor include faux marble, leather, wood grains and the like.

In certain embodiments the visual and environmental optimization also enhances the security function of the security checkpoint. For example, establishing a calming environment may have an enhanced calming effect on otherwise nervous, anxious, or stressed but innocent customer, and less of a calming effect on a nervous customer who is not innocent. For example, a person intending to commit a crime or intending to present a false ID identifier at the ID check may not be calmed by an otherwise calming environment. Such differential effect may permit enhanced identification of persons of interest and/or enhanced use of selective secondary or additional screening. In addition, a nervous person in a calming environment may be easier to spot with behavioral observation techniques. The visual and environmental optimization may further integrate with RFID systems to enhance the security function of the security checkpoint. The visual and environmental optimization may be customized to particular passengers. For instance, the visual and environmental optimization for a particular passenger may be based the passenger's location within the security checkpoint, as derived from indoor positioning systems, facial recognition systems, and other systems.

In certain embodiments the security checkpoint has an overall décor and design that is similar to checkpoints in other locations. For example, an airport security checkpoint in San Diego, California may have certain characteristics and elements that are similar to those at an airport security checkpoint in Boston, Massachusetts. In other embodiments the overall décor and design is particular to one facility and may incorporate colors or other designs characteristic of area in which the facility is located. In some embodiments there is a familiarity established with the overall process while putting customers at ease there is sufficient unpredictability to keep bad elements from learning too much of the details of the system and using familiarity as predictability to plan for bad intent.

In some embodiments the security checkpoints of the present invention include one or more transparent glass panels. In some such embodiments the glass panels are used as partitions between parts of the security checkpoint (e.g., between the security station and the secondary screening area), between the security checkpoint and other parts of the facility (e.g., a pathway for customers leaving the facility), between security lanes within a security checkpoint and/or to define one more lines leading to the security station or to define the area between a common area or terminal area and the checkpoint. In some embodiments the glass panels are configured to display one or more of signage providing information, advertising and designs. In some such embodiments a projection film is applied to the glass. In some embodiments the projection film is 3M™ Vikuiti™ Rear Projection Film (a relatively flexible self-adhesive film that can be cut to various shapes and placed on transparent materials). In some embodiments the glass is substantially transparent at some times and at other times is displaying one or more of signage providing information, advertising and designs. In some embodiments the glass may be substantially transparent at some times and at other times is made to be substantially opaque for purposed of private screening or interviews. The glass may comprise "smart glass" that is in effect a computer screen. In various embodiments, the glass may incorporate touchscreen user interface and other user interface or other elements. The use of such materials may also permit designated areas to be used for multiple purposes (e.g., for either recomposure or secondary screening). This provides for multiple uses of designated areas and is particularly beneficial where space is limited.

Colors

It is thought that certain colors have certain affects on persons and/or crowds. Thus, in some embodiment the décor and design of the security checkpoint, including any advertising or information displays, may be optimized in the colors presented. Color is thought to influence a person's moods and physical responses. When considering and evaluating color schemes for use in design, it may be useful to focus on color hues (e.g., warm and cool), degrees of color saturation (e.g., richness), and levels of depth (e.g., light or dark) as ways to influence customer perceptions. Color psychologists have found that warm colors (e.g., red, orange, and yellow) generally encourage activity and excitement, whereas cool colors (e.g., green, blue, violet) are more soothing and relaxing. Some have suggested that different social classes may have different perceptions and/or reactions to colors. For example, hot, bright colors are thought to have more appeal to lower-end markets, while deep, rich colors have historically appealed to higher-end markets.

Red may be associated with danger, passion, energy, warmth, adventure and/or optimism and may increase blood pressure, increase respiratory rate, aid digestion, and/or increase strength. Red may also inspire a sense of protection from anxiety and or fear. Red is generally thought to be a stimulant that increases energy. Use of red to accent certain features or aspects may cause persons to focus on that particular aspect or feature.

Blue may be associated with serenity, peace, sadness, loyalty, sincerity, trust, dependability, and/or justice and may lower blood pressure, slow respiratory rate, and be cooling, restful and/or relaxing. Some of the brighter blues may have a different, more exciting and dynamic effect on persons. In addition, too much blue may convey a lack of feeling and/or coldness.

Purple may be considered a mix of blue's generally calming influences and red's generally stimulating influences. Purple may be an uplifting or calming influence or may cause uneasiness.

Green may be associated with growth, nature, envy, inexperience, refreshment, birth, jealousy, wealth, and/or compassion and may cause rejuvenation, reduction of anxiety and nervousness, self-control, expansiveness, and/or enhanced balance. To some, green may symbolize nature and it is generally easiest on the eye and may be a calming, refreshing color. The natural greens, such as forest green, may be seen as tranquil and refreshing. Some greens, however, may convey negative thoughts of institutional power or illness.

Yellow may be associated with optimism, happiness, irritability, wisdom, cheer, annoyance, and/or warmth and may increase irritability, increase hostility, sharpen memory and/or concentration, aid digestion, stimulate circulation, and/or encourage communication. Yellow may be considered an optimistic color, but some believe people lose their tempers more often in yellow rooms, and babies will cry more. It is the most difficult color for the eye to take in, so it can be overpowering if overused.

Orange may be associated with activity, boldness, exuberance, cheer, and/or vigor and may decrease irritability, decrease hostility, and/or improve social behavior. It may also connect one to one's senses and help to remove inhibitions and make one independent and social. Orange generally causes a strong reaction, whether it is positive or negative.

Black may be associated with mourning, mystery, fright, elegance, dignity, sophistication, uncertainty, and/or intimidation and may cause fatigue. Black is generally thought to be the color of authority and power. Black's ability to cause strong emotions may make its overuse overwhelming for most.

White may be associated with joy, hope, purity, neutrality and/or cleanliness. White may aid mental clarity, cause purification of actions and thoughts, and/or encourage persons to clear clutter and obstacles.

Brown may be associated with earthiness, nature, tranquility, approachability, stability, reliability and/or safety. Brown may cause a sense of orderliness and wholesomeness.

Some put various colors and shades into groups and describe possible effects by group. Some identify four color groups as follows. The First group is clear, delicate warm colors containing no black, including scarlet, coral, peach, daffodil yellow, emerald green, sky blue, cobalt and lilac. These colors may be associated with light, warm, friendliness, new, youth, lively, fresh, clean and/or optimism. Some may associate these colors with negativity, and perceive them as insubstantial, frivolous and immature. The second group contains colors that are cool, contain more grey and, are delicate, but are not necessarily light. Examples include maroon, rose pink, grapefruit, sage, viridian, dove grey, some blues, delphinium and lavender. These colors may be associated with elegance, cool, calm, poise, graceful, upmarket, timeless, expensive, soothing, and aspirational. Some may interpret these colors to negatively convey draining, unfriendly, aloof and/or elitist feelings. The third group contains warm, but intense and fiery tones that generally have black mixed in. Examples include red, burnt orange, rust, butter yellow, leaf green, olive, teal blue, peacock and aubergine. The characteristics may be warm and friendly, traditional, solid, substantial, reliable, earthy, environmentally aware. The fourth group contains colors and tones that are strong and clear. Examples include black, white, crimson, magenta, lemon, jade green, ice blue, indigo and violet. Such colors may convey uncompromising excellence, material aspiration, efficiency, drama, sophistication, and a modern or high-technology feel. Some may perceive such colors as cold, uncaring, unfriendly, materialist, and expensive.

Advertising Optimization

In some embodiments the security checkpoints of the present invention optimize the display of advertising. In this context, optimization of advertising may involve one or more of displaying different advertising or segmenting directed to different demographics at different times, displaying different amounts in volume or frequency of advertising depending on the volume and/or flow of the traffic through the security checkpoint (e.g., replacing informational signage with advertising during key periods, such as periods of heavy travel such as Holidays or commuter travel periods), optimizing the audio and visual characteristics of the advertising presented (including integration of the audio and visual characteristics of the advertising with the audio and visual characteristics of the security checkpoint and/or facility as a whole) and/or coordinating the advertising presented in one part of the security checkpoint with advertising presented at other parts of the checkpoint (for example, coordinating advertising on the screens, display monitors, display devices, and/or other display technologies in one part of the security checkpoint with advertising on screens in other parts of the security checkpoint and/or coordinating the advertising on the screens with the advertising on the security trays, security carts, line stanchions, belt straps, and/or other items in the security checkpoint and/or facility). The display of advertising may comprise mobile advertisements displayed on a passenger's mobile device. Such mobile advertisements may create custom monetization programs and custom advertising experiences for passengers. Revenue generated can be shared with the facility or agency to offset the rising cost of security. Programs such as the SecureTray® by SecurityPoint Media LLC have successfully demonstrated that such novel forms of advertising can expand the available market for advertisers, increase available revenue and provide a service that enhances the checkpoint experience.

In some embodiments the optimization of advertising provides a method of maximizing the amount of revenue that may be derived from any particular security checkpoint and/or facility. In some embodiments the advertising amount and content may be controlled through a facility remote to the security checkpoint and/or facility. In some embodiments the advertising content is controlled based upon real-time observations of conditions, and/or monitored conditions at a particular security checkpoint and/or facility. In some embodiments advertising is controlled via a satellite or wireless system. In some embodiments the advertising is altered or segmented to appeal to certain demographics. In this context a demographic may be a particular age group, a group traveling to a particular region or location, a group on a particular flight, a group that speaks a particular language, a group that practices a particular religion, a group having a particular income, leisure travelers, business travelers, or any similar grouping or persons or combinations thereof. In some embodiments, the optimization may include facial recognition technologies to identify passengers and/or designate passengers as "pre-cleared" for more efficient or faster security screening processes. For example, one or more cameras may be directed in a security checkpoint. A system (e.g., computer system) may be configured to perform facial recognition based on pictures captured by the camera. The system, or a second system, may identify "pre-cleared" or, alternately, potentially dangerous individuals.

In some embodiments advertising is controlled via a satellite or wireless system. In one embodiment such a system comprises a satellite receiver in communication with a satellite uplink station, a controller couple with the satellite receiver, a storage device in association with the controller configured to store video data received from the controller via the satellite receiver, and at least one video display coupled with a controller. The video display may comprise one or more transparent glass panels, as described above. In another embodiment, the system further comprises at least one video signal processor coupled with a video display. In another embodiment, the system isolates one channel of a multi-channel video signal for presentation on at least one video display. The invention may also isolate at least one channel of a multi-channel video signal for storage in the storage device. In alternative embodiments, the system may further comprise a speaker system and/or directional audio system associated with the video display for broadcasting audio.

In a further aspect of the invention, the system may display live satellite broadcasts obtained from the satellite uplink station via the satellite. The video display may be remotely interrupted via satellite. The interruption may comprise flight alerts such as arrival or departure times and delays, news, weather reports, terrorism threats, traffic reports, or security warnings. The interruption may be video data that is live video data, recorded video data, or video data stored in the storage device. The interruption may provide other content or assist in monitoring a line to the security checkpoint. The interruption may also be provided on a screen of a mobile application of passengers.

In another embodiment, the controller may receive programming instructions from the uplink station via the satellite. The programming instructions may include start time of a video signal, end time of a video signal, geographic location in which to display video data, received channels of which to store in the storage device, program override, display a live signal, or commands to display sequence of a series of video files.

In yet another embodiment, the controller sends video data to the video display via wireless networking, Bluetooth technology, coaxial cable, WiFi, WiMAX, DSL, ISDN, RCA cables, the internet, or an intranet. In a further embodiment, the controller and storage device may send data to and store data for a plurality of video signal processors and a plurality of video displays.

Another embodiment of the present invention provides methods for selecting advertising or programming to display on the video displays at or around the security checkpoints. The method may include communicating the geographic location of the video display to the controller. The system may also include a plurality of video display units in one video display. The programming may be commercial advertising or programming and may be associated with a fee. A further embodiment provides a fee for commercial advertising or programming that may be determined by a number of variables such as the number of impressions or viewings, opportunity to see by customers, geographic location of the system, duration of the commercial advertising or programming, size of the video display used in the system, day of the week, time of day, and the number of other video displays in the system. Such a method may involve one or more of the demographics discussed herein. In various embodiments, the program may provide demographic information about passengers. In various embodiments, the program may provide passenger segment information, such as information relating to a particular segment of the security screening process. For instance, the program may provide information about whether passengers are "low risk" passengers, belong to particular segments of passengers such as frequent flyers, or are higher risk passengers that are on terrorist or other dangerous person watch-lists.

Another embodiment of the present invention allows for corporate sponsorship of the checkpoint including but not limited to naming rights to generate revenue. For instance, corporations may be provided naming rights, furnishings, and the like.

Another embodiment of the present invention allows for advertising on the surfaces within the checkpoint such as tables or floors or ceilings or components or technology or equipment and such. For instance, advertising may be presented on walls, architectural furnishings, and other surfaces. Advertising may also be presented to passengers on the passengers' mobile devices. Such advertising may include location-based advertising that provides specific advertisements to passengers based on the passengers' specific locations within the security checkpoint.

Line Management

Security checkpoints frequently have a line of customers waiting to proceed through the checkpoint. In some embodiments the systems and methods of the present invention use one or more line management systems, physical and virtual queuing elements and/or methods as described herein.

In some embodiments the line management methods and/or systems include a physical arrangement that conveys the illusion that lines appear smaller or shorter than they actually are, which may, for example, reduce a customer's anxiety, fear, and/or stress. In some embodiments physical partitions are used that may obstruct the customer's view of the full line.

In some embodiments the systems and methods of the present invention utilize one or more customer service personnel. In some embodiments the customer service personnel perform only customer service functions. In some embodiments customer service personnel may have less training than other personnel at the security checkpoint. In some embodiments the customer service personnel are also trained to perform other functions at the security checkpoint. In other embodiments the customer service personnel may be conversant in two or more languages. The customer service personnel may include sponsored customer service personnel that act as "brand ambassadors" to one or more brands related to passage through the security checkpoint.

In some embodiments customer service functions include one or more of providing information, restocking various items that are provided to customers (e.g., plastic bags, booties, travel accessories, luggage, RFID tags used to track passengers' luggage, RFID tags used to track passenger's personal trays, etc.), helping customers properly use such items, optimizing wait times, directing customers to different checkpoints within a particular facility, and directing customers to different lanes of a given security checkpoint. In some embodiments the provided information is one or more of travel information (e.g., flight times, gate information), approximate wait time, and information on how to proceed through the checkpoint (e.g., removal of shoes, removal of computers from bags). In some embodiments optimizing wait time includes restructuring of lines by moving elements that define the line (e.g., one or more stanchions connected by an element, to bypass controls, to segment passengers, etc.), directing customers to different security checkpoints, particular lanes within a security checkpoint, and providing instructions on how to proceed through the checkpoint. In some embodiments the customer service functions include maintenance, provision and/or supervision of security checkpoint resources. In some such embodiments the customer service function includes ensuring security trays are properly loaded (e.g., in a manner that provides an improved or optimal image to the security screening personnel) into the screening technology or device, ensuring a sufficient number of security trays are available to customers and are accessible to customers, ensuring that any security tray carts are properly used to ensure a supply of security trays for customers, aiding customers through and during the queuing and/or divesting processes and/or ensuring that sufficient resources are available to customers at the security checkpoint.

The customer service functions may assist in segmenting passengers and performing behavior detection.

In some embodiments the customer service personnel have a uniform that differs from TSA personnel and/or other personnel at the security checkpoint. In some embodiments the uniforms are of a color that is thought to promote calmness or authority among others.

In some embodiments the present invention utilizes various forms of signage. In such embodiments the signage may convey any suitable information. In some embodiments the information may be one or more of flight or other travel information (e.g., gate information, departure times), information on how to proceed through the security checkpoint, and information advising customers to approach customer service personnel to ask questions or for other help. In preferred embodiments the signage is displayed on otherwise clear material, such as glass or certain plastics. Some such embodiments utilize a projection film such as 3M™ Vikuiti™ Rear Projection Film. In some such embodiments the signage may provide different information at different parts of the line. For example, there may be signage at the end of the line that provides customers with information regarding approximate wait times at different security checkpoints within the same facility. In some embodiments the signage may show real-time video of other security checkpoints within the same facility in sufficient detail to show how busy they may be. And in some embodiments the signage includes advertising. The signage may further help educate, inform, instruct, entertain, and/or perform other actions with respect to passengers. The signage may be incorporated into a mobile platform, e.g., the mobile application carried by passengers. The signage may also be incorporated into wearable devices carried by passengers. The signage may include a head's up display (HUD) and/or simulator.

In some embodiments the present invention utilizes an audio communication system. In some embodiments the audio communication system may provide sound throughout the security checkpoint. In other embodiments the audio communication system provides sound to only portions of the security checkpoint. The audio communication system may be incorporated into the directional audio system, discussed herein. Such a directional audio system may be provided on or directed to a passenger's mobile device, on an application on the passenger's mobile device, or on a personal listening device of the passenger. In various embodiments, the audio communication system may provide auditory masking that masks other noises within the security checkpoint. For instance, the audio communication system may mask unpleasant sounds in the security checkpoint.

The audio communication system may provide any suitable content. In some embodiments the audio communication system may broadcast one or more of flight or other travel information (e.g., delays, change of gate information), information on how to proceed through the security checkpoint, and information advising customers to approach customer service personnel to ask questions or for other help. In some embodiments the audio is provided using high-quality speaker system, or a wearable smart device for the passenger. It may provide substantially clear sound at decibel levels that are appropriate for the particular checkpoint. In some embodiments the voice used to provide information is one that is generally soft and generally pleasant. In some embodiments the audio communication system may play music. In some such embodiments the music is soothing and/or calming to the average person. In some embodiments the sound system may broadcast different information to different parts of a line or security checkpoint. For example portions of a line that are ten minutes or more away from the security station may hear calming music, while those closer to the security station may hear instructions on how to proceed through the security checkpoint. In some embodiments the audio may include advertising messages.

In some embodiments other sources of information are available. In some embodiments a computer having a touch screen user interface (e.g., a kiosk) is used. Such a computer may provide any suitable information to a customer. In some such embodiments the computer could provide information in various different languages (e.g., instructions on how to proceed through the security checkpoint, prohibited items, etc.), flight information, and/or security checkpoint information and directions to vendors, vendor locations, vendor specials for vendors located in the retail concession area of the facility in the secure side where applicable. The computer may also provide advertising to passengers and others.

In some embodiments an appointment system is used. In some embodiments customers may contact a person or an automated system and set up an appointment at the security checkpoint. In some embodiments the appointment is free and in other embodiments customers may pay a fee for an appointment. In some embodiments the appointment is for a specific time. In other embodiments the appointment is for a time range. For example, the time range may be 5, 10, 15, 20, 25, 30, 35, 40, 45, 50, 55, 60, or 60 or more minutes. In some embodiments the appointments are for a particular security checkpoint and/or a particular security lane within a security checkpoint. In some embodiments there is a separate line at each security checkpoint for customers having such appointments. In some embodiments, fees paid for an appointment would be used to offset the cost of operating the checkpoint. In various embodiments, the appointment system may be integrated into a passenger's mobile application.

ID Checking

In some embodiments the ID checking station is merely a person or persons visually inspecting a person's ID identifier prior at a security checkpoint. Other embodiments utilize methods, technology and other elements to verify the identity and/or further investigate a customer passing through a security checkpoint. In some embodiments such methods/technology work in conjunction with technology associated with ID identifiers and/or ID verifiers/authenticators. For example, many ID identifiers have scannable bar codes, visual watermark or similar technology, an RFID tag, electronics, chips, or anything that aids one in verifying the authenticity of the ID identifier. In some embodiments a light source is applied to the ID identifier which makes visible an otherwise invisible visual watermark or similar visual cue. In some such embodiments a blue light is applied. In other embodiments a bar code reader is used to read a bar code on an ID identifier. In yet other embodiments magnification is applied to the ID identifier which makes visible an otherwise invisible visual watermark or similar visual cue. In other embodiments an RFID is detected and associated with a particular person. In some embodiments information from a person's ID identifier is entered into a computer. The ID checking station may be automated, that is may check IDs without human intervention. Such an ID checking station may further be used for verification or authentication of a passenger's identity. As discussed, verification or authentication may occur many ways including with usernames and passwords, facial recognition, using biometric information, and/or the use of mobile devices for identification verification and access.

In some embodiments the ID checking station may aid the identification of persons of interest, which includes but is not limited to persons having criminal records (including subsets thereof, for example identification of persons having records of violent crimes), persons on "no-fly" lists, or persons wanted by domestic, foreign or international law enforcement agencies. In some embodiments biometric technology is utilized to, for example, scan a customer's fingerprints, retina, facial characteristics, the passenger's DNA, or the like. In some embodiments a database is accessed and the personal information on an ID identifier is compared to database entries. In some embodiments the database contains information relating to identification of a person of interest. In some such embodiments the database contains information relating to the suitability of the person for travel, including criminal records, no-fly lists, health issues, and/or a history of disruptive behavior while traveling. In certain embodiments, technology including use of passport/ID verification by accessing databases, including remote databases. For instance, federal government databases, private databases, and/or international databases may be accessed.

In some embodiments information is collected from a customer's ID identifier. In some such embodiments the information may be used to enhance the customer's experience through the security checkpoint. By way of nonlimiting example, the information may indicate that a customer is traveling with family. In such a case, the customer and the customer's family would be kept together through the security checkpoint and/or may be configured to be directed to a different security lane or given other special attention. In other embodiments, the information may indicate that the customer is disabled or otherwise requires additional attention through the checkpoint. In various embodiments, the data may be used to target advertising to passengers.

In some embodiments the information collected at the ID checking station is communicated to other personnel. For example, the information may be communicated to a gate agent at a travel facility or any other personnel. In some such embodiments the information may be communicated to other personnel at a travel facility. In some such embodiments the information may indicate that a customer is proceeding through the security checkpoint which may prevent the gate agent from filling the customer's seat or may delay take-off until the customer arrives at the gate. In some embodiments such information is communicated to other personnel at the security checkpoint. In some embodiments the information may result in additional screening of the customer at the security checkpoint. In some embodiments such communication may provide additional awareness of who is in the travel facility even if that customer has not otherwise checked-in at the travel facility. For example, a customer having only carry-on baggage would not generally check in until he/she gets to the departure gate. Such information could serve both a security and a customer service function. Such information could also help identify whether the passenger is a pre-cleared passenger, a disabled passenger, or a vetted passenger with less security screening required. In various embodiments, the information may assist reducing screening for pre-cleared passengers.

Divesting

In some embodiments the security checkpoint methods and systems have a divesting station. In some such embodiments the divesting station is where customers remove personal items, luggage, and the like from their person in anticipation of security screening. In various embodiments, the divesting stations may be integrated with indoor positioning systems (e.g., systems using NFC, BTLE) and/or interactive systems.

In some embodiments the divesting station includes items to be provided to customers at the security checkpoint. In some such embodiments plastic bags (for example, bags suitable for holding liquids in accordance with TSA regulations) and/or booties/slippers are provided. In some such embodiments the items are items that enhance and/or improve a customers experience at the security checkpoint and during travel (e.g., providing coupons for shops or restaurants on the secure side of a security checkpoint). In other embodiments such items are provided at other parts of the security checkpoint. In some embodiments, the materials provided at the divesting stations may carry advertising.

In some embodiments, divesting areas are oriented prior to the physical screening areas and are of various modular sizes to best fit the layout and available space of each unique checkpoint footprint. In some embodiments divesting areas include tables, shelves, conveyors and/or other structures or devices that may assist customers in divesting. Such structures or devices may be of any suitable orientation, size and position and may be ergonomically designed.

In some embodiments personal items may be placed in trays. In some such embodiments, the trays include advertising. In some embodiments the advertising is on an interior surface and in some embodiments the advertising is on an exterior surface. In some embodiments the advertising on the tray may be readily changed and/or altered. In some embodiments the tray advertising may be on electronic display panels, may be either three dimensional or two dimensional and may display digital media content. In such embodiments the advertising on the tray may be remotely controlled and/or coordinated with any other advertising at or around the security checkpoint. In some embodiments advertising may be attached to the trays via vinyl adhesive materials or within a sliding lexan or clear panel. In various embodiments, the trays may be integrated into indoor positioning systems or interactive systems. The trays may provide information with which passengers or mobile applications of passengers may interact with.

In some embodiments the trays include information that permits identification of a particular tray. In some such embodiments the trays include identification numbers and/or letters and/or symbols. In some such embodiments the trays include an RFID tag or electronics or a chip. The trays may include radio-opaque ink or material so that information is visible thereon while passing through a scanner. In certain embodiments the trays are made of a lightweight material. In some such embodiments the trays are easily moved and manipulated by customers at the security checkpoint. In some embodiments the bottom surface of the tray is slid able along tables and other surfaces but does not permit substantial movement of the tray once it is placed on a conveyor belt or similar instrumentality as it passes through the screening device. In some such embodiments the tray is able to pass through the lead curtains of an x-ray machine regardless of the overall weight of the tray and its contents.

Security Check

In some embodiments the security checking procedure utilizes the methods and instrumentalities, including security trays having advertising and tray carts, as disclosed in U.S. Pat. No. 6,888,460 and U.S. Patent Application Publication Nos. 2005/0173284, 2007/0126575 and 2007/0132580, the contents of which are expressly incorporated herein by reference. In some embodiments the security checking procedure utilizes SecurityPoint Media, LLC's SecureTray™ system. Other embodiments do not use such instrumentalities or methods.

In some embodiments the security station utilizes one or more screening devices. In some such embodiments the screening device is an x-ray machine (e.g. a multi view advanced technology x-ray machine), a chemical sniffer or trace element detection devise, millimeter wave, a CT scanner, and/or any other suitable device that facilitates inspection of a customer and/or a customer's belongings. The screening devices may be chosen to detect threats to passengers' safety.

In some embodiments a remote security screening station is also involved in the security checking procedure. In some embodiments the remote security station is located away from the site of the checkpoint. For example, if the checkpoint is at a travel facility, the remote security station may be located at a different location. In other embodiments the remote security station is at the site of the checkpoint. In some embodiments the remote security station oversees and/or reviews customer service personnel and other personnel at the security checkpoint.

In some embodiments the remote security station is configured to receive real-time information from one or more security checkpoints. In some embodiments the remote security station performs a supervisory or review function. For example, the remote security station could review a random sampling of items passing through a security checkpoint or review a particular item when a customer at the security checkpoint so requests. In such an example an employee at the security checkpoint could press a button or the like instead of calling for a supervisor to physically come to the security checkpoint to review the item. In some such embodiments the personnel at the security checkpoint can send specific images to the remote security station for review. In some such embodiments personnel at the security checkpoint may verbally communicate with persons at the remote security station.

In some embodiments the remote security checkpoint may utilize highly-skilled personnel. In some embodiments the highly-skilled personnel are persons having a certain level of experience reviewing items at a security checkpoint, persons who perform higher on certain relevant tests, persons who have otherwise demonstrated relatively high achievement and/or intelligence.

Recomposure

In some embodiments the systems and methods of the present invention include a recomposure area. In some embodiments the recomposure area is the area where customer's collect their personal items post screening and/or put their shoes back on. In some embodiments the recomposure area has a décor and design that is integrated and similar to the design of other parts of the security checkpoint and may comprise benches, chairs, chairs integrated with tables, and couches or sofas. In some embodiments, the recomposure area need not be similar to other parts of the security checkpoint. More specifically, the recomposure area may be configured to provide an upscale environment where passengers can recompose their belongings with sophistication. Décor, environmental optimization, and other factors may be chosen so that the recomposure area has a sophisticated look, feel, smell, and/or sound. In various embodiments, the recomposure area may be incorporated into indoor positioning systems and/or interactive systems disclosed herein.

In some embodiments the recomposure area includes signage as described with respect to other parts of the security checkpoint. In certain embodiments the recomposure area includes an element configured to permit one or more customers to place their foot upon the element to facilitate replacement and retying of the customer's shoes. In some embodiments the shoe element is from about 24" to about 48" tall. In some embodiments the recomposure area includes one or more tables or shelves configured such that customers may place personal items upon them without bending over. In some embodiments the tables or shelves are from 48" to 60" tall. The items in the recomposure area may comprise modular units. Such modular units may reduce the environmental footprint of the security checkpoint and may provide greater function at lesser cost.

In some embodiments, the recomposure area may provide advertising. Advertising may be provided through the indoor positioning system, through NFC technologies, through RFID technologies, and other ways. The recomposure area may further provide sponsorship, naming rights, digital displays, and other systems and methods disclosed herein.

Secondary Screening

In some embodiments the security checkpoint includes a secondary screening station. In some embodiments the secondary screening checkpoint is used to conduct additional screening of a customer. In some embodiments secondary screening occurs because of random selection, an initial positive indication at the security station and/or because a customer has been identified as a person of interest. In some embodiments the secondary screening station is enclosed by glass walls that may be transparent in one configuration or opaque in a second configuration, for example a transition from clear to opaque on demand for creating a multi use area.

Computerized Systems for Monetizing Passage Through the Security Checkpoint

In some embodiments the present invention includes a method of earning revenue within a security checkpoint. In some embodiments the security checkpoints of the present invention optimize the display of advertising and collecting and distributing revenue from the advertising to offset the operational costs associated with the checkpoint. In this context, optimization of advertising may involve one or more of displaying different advertising directed or segmented to different demographics at different times, displaying different amounts of advertising depending on the volume of the traffic through the security checkpoint (e.g., interchanging or rotating informational signage with advertising during key periods, such as periods of high or low traffic, and/or periods of specific customer demographics, such as during holidays and/or commuter travel times), optimizing the audio and visual characteristics of the advertising presented (including integration of the audio and visual characteristics of the advertising with the audio and visual characteristics of the security checkpoint and/or facility as a whole) and/or coordinating the advertising presented in one part of the security checkpoint with advertising presented at other parts of the checkpoint (for example, coordinating advertising on the screens in one part of the security checkpoint with advertising on screens in other parts of the security checkpoint and/or coordinating the advertising on the screens with the advertising on the security trays, security carts, line stanchions, and/or other items in the security checkpoint and/or facility). The methods herein may be incorporated into passengers' mobile applications and/or mobile devices In some embodiments the optimization of advertising provides a method of maximizing the amount of revenue that may be derived from any particular security checkpoint and/or facility. In some embodiments the advertising amount and content may be controlled through a facility remote to the security checkpoint and/or facility. In some embodiments the advertising content is controlled based upon real-time observations and/or monitoring of conditions at a particular security checkpoint and/or facility. In some embodiments advertising is controlled via a satellite or wireless system. In some embodiments the advertising is altered to appeal to certain demographics. In this context a demographic may be a particular age group, a group traveling to a particular region or location, a group on a particular flight, a group that speaks a particular language, a group that practices a particular religion, a group having a particular income, leisure travelers, business travelers, or any similar grouping or persons.

In some embodiments a master plan or guidelines are developed with respect to the security checkpoint. In some such embodiments advertising is done in a manner consistent with to the master plan to optimize security and customer service. In some embodiments the master plan or guidelines (or the consulting services described below) place priority on security, customer service second and then advertising revenue. Over emphasis on advertising and revenue generation without regard to operational needs and aligned with a master plan for the security checkpoint may impair or limit the security process. The master plan may be incorporated into passenger's mobile applications and/or mobile devices.

In some embodiments consulting services are provided. In some such embodiments the consulting services include one or more of creation of a security checkpoint master plan or guidelines, training of customer service personnel, additional training for TSA or similar personnel, design of the security checkpoint (including all aspects as described herein), maximizing advertising revenue, and creation of a security checkpoint that requires no additional funding for maintenance or personnel or upkeep as a result of the advertising revenue it generates.

In some embodiments the facility has the option to elect any amount including no advertising at all, in which cases it may directly pay for the services and/or components that may be provided as contemplated herein. In other embodiments the facility may engage in an arrangement that shares the revenue generated by the advertising at the checkpoint in return for the components and/or services contemplated herein. The facility may be part of a revenue sharing program with other entities, such as the TSA, the government, private agencies, corporations, individuals, or other entities.

In some embodiments all or a portion of the advertising revenue generated by the security checkpoint is used to pay for personnel, upkeep and/or maintenance of the security checkpoint. Such is often the purvey of retail concession or property managers.

In some embodiments the facility is presented with a menu or list of available options to improve passengers' experiences, and to determine and select to best combination of available options and proceed with recommendations from the master plan based on level of ad revenue, available budget, needs at the checkpoint, facility vision, federal state and local requirements and the amount of space and layout design. This menu may be different for different facilities, depending on any of a number of factors, including facility size, budget, type (i.e., airport, cruise line, train) and/or existing components and advertising type and quantity.

In some embodiments the revenues collected from an initial improvement or enhancement of a security checkpoint are used to further optimize, enhance and/or integrate a security checkpoint. In some embodiments such revenues are derived from a system such as SecurityPoint Media, LLC's Secure-Tray® system.

Thus, it is seen that methods and systems are provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example configuration for the invention, which is done to aid in understanding the features and functionality that may be included in the invention. The invention is not restricted to the illustrated example configurations, but the desired features may be implemented using a variety of alternative configurations. Indeed, it will be apparent to one of skill in the art how alternative functional, logical or physical configurations may be implemented to implement the desired features of the present invention. Also, a multitude of different names other than those depicted herein may be applied to the various parts or areas of a security checkpoint.

Additionally, with regard to method claims or block diagrams depicting an exemplary method, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

Figure 4:
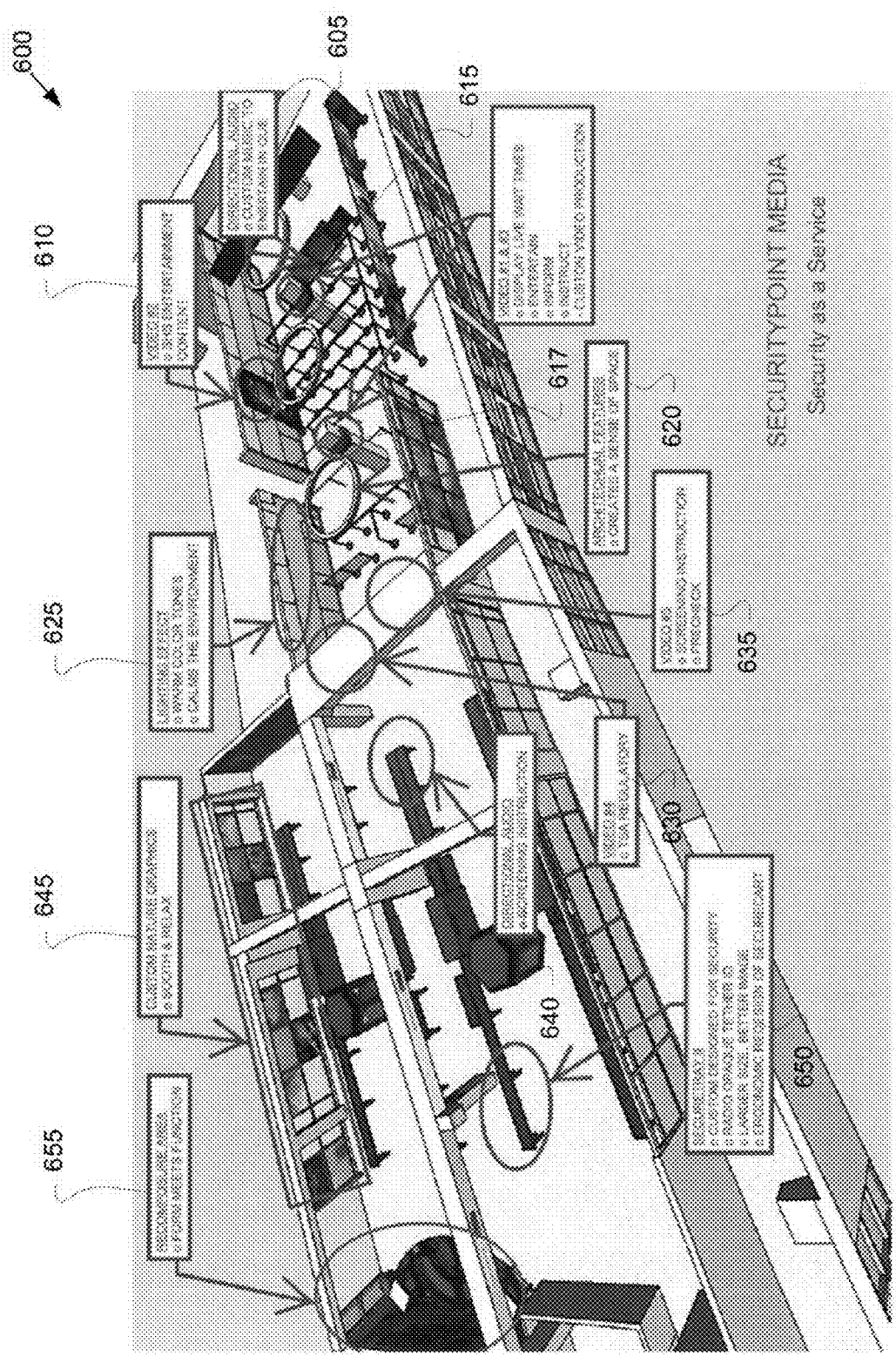
FIG. 4 is an illustration of a security checkpoint, according to some embodiments.

FIG. 4 is an illustration of a security checkpoint 600, according to some embodiments. In various embodiments, the security checkpoint 600 achieves security screening functions while providing passengers with a soothing and welcoming experience. The security checkpoint 600 allows passengers to avoid the dreaded and high-anxiety ordeal previously experienced by those who have to travel in our modern, high-security reality. More specifically, in various embodiments, the security checkpoint 600 provides architectural, design, and other elements, that create a warm and inviting, yet secure, environment. The security checkpoint 600 may include sleek furniture, calming music, monitors displaying security wait times, videos with travel tips and entertainment, and sponsored content, such as content from hotels, vacation providers, restaurants, and others.

In some embodiments, the security checkpoint 600 may be incorporated into a service-based business model. More specifically, in various embodiments, the security checkpoint 600 may be linked to monetization sources, such as sponsored content, paid services, subscription services, and mobile applications on mobile devices associated with passengers. The monetization sources may provide an entity that manages the security checkpoint 600 with revenue. Such a service-based business model may provide tangible and measurable wins for many entities, including owners of the entity that manages security checkpoint 600, advertisers, providers of information, government agencies, private companies, and others. The service-based business model may also allow airport operators to deliver better service while increasing advertising revenue, such as non-aeronautical advertising revenue. The service-based business model may allow government agencies and security personnel to focus more time and energy on actually screening passengers passing through the security checkpoint 600. The service-based business model may also allow advertisers and providers of sponsored content to target messages to specific individual who are relevant to specific products, services, and brands.

The security checkpoint 600 may include a first directional audio system 605, a second video system 610, a first video system 615, a third video system 617, an architecturally optimized system 620, an optimized lighting system 625, a fourth video system 630, a fifth video system 635, a second directional audio system 640, an optimized nature graphics system 645, an optimized tray system 650, and an optimized recomposure area 655.

The first directional audio system 605 may comprise audio directed to passengers at particular areas in the security checkpoint 600. The first directional audio system 605 may comprise speakers coupled to a digital device configured to provide information to the speakers. The first directional audio system 605 may direct sounds to various locations within the security checkpoint 600. The first directional audio system 605 may provide custom music to passengers to entertain the passengers while the passengers are in line for the security checkpoint 600.

In a specific implementation, the first directional audio system 605 may direct particular sound sequences to particular passengers depending on information predicted or known about the passengers. For instance, the directional audio system 605 may include speakers that direct particular sound sequences to passengers at particular locations. As another example, the directional audio system 605 may be coupled to an indoor positioning system to direct particular sound sequences to mobile applications of particular passengers based on the location of the mobile devices of the particular passengers, as derived from the indoor positioning system. By providing particular sound sequences to passengers' mobile devices, the directional audio system 605 may provide for a unique sound experience that is customized for passengers based on passengers' preferences and history. In various embodiments, the first directional audio system 605 may receive a position of a passenger at a particular location in the secure facility. The location may be taken in several ways, including using a mobile application of the passenger and/or determining the position using an indoor positioning system (e.g., a BTLE device for the passenger, wireless triangulation for the passenger, GPS coordinates of the passenger, or the like). The first directional audio system 605 may also determine a particular sound sequence for the passenger, the particular sound sequence based on the position of the passenger in the queue.

The particular sound sequence may also be based on information about the passenger, such as: preferences of the passenger, including information taken from the passenger's present behavior, the passenger's past behavior, the passenger's activity on social networking accounts, the activity of the passenger's friends on social networking accounts, and other information about the passenger. The first directional audio system 605 may identify a sound subsystem that is configured to provide sound to the location or mobile device of the passenger. Using the identified sound subsystem, the first directional audio system 605 may provide the particular sounds system to the passenger based on the information about the passenger. In various embodiments, the first directional audio system 605 may be adapted to provide highly relevant audio sounds to passengers at critical times through their passage through the security checkpoint. For instance, in various embodiments, the first directional audio system 605 may provide inaudible or low volume (e.g., a volume lower than a person can consciously hear but higher than the volume required for the person to subconsciously process sound) sounds, such as children laughing, ocean sounds, river sounds, or other positive and relaxing sounds.

In some embodiments, the particular sound sequence may scan mobile devices of a group of passengers and derive from the scanning the most popular music among the group of passengers. In these embodiments, the group of passengers may be able to control the particular sound sequence to provide an interactive sound system for the group. As a result, various embodiments may provide passengers with numerous levels of interactivity with the sound and video systems herein. The first directional audio system 605 may also provide passengers with instructions based on the location of passengers in a security screening line (e.g., the position in line where the passenger should begin preparing to have identification ready, remove liquids, and the like), thereby reducing the need of security personnel to manually provide instructions to passengers.

Those skilled in the art will appreciate that the position in a checkpoint where audio is directed to one or more passengers may change between checkpoints and/or based on checkpoint conditions. For example, if the checkpoint is crowded (e.g., determined based on manual recognition that the checkpoint is crowded, GPS information, historical information, number of departing flights when the number of people at a checkpoint are above a threshold, motion detectors, and/or the like), calming music may be played while instructions may be provided at positions that are proximate to the identification station and/or scanner such that passengers may be comfortable with their preparation.

The second video system 610 may comprise one or more video monitors coupled to a digital device configured to provide information to the one or more video monitors. The second video system 610 may provide alerts, entertainment, advertisements, and other information as discussed herein. In various embodiments, the second video system 610 may direct video at particular passengers based on information predicted or known about the passengers. The second video system 610 may receive information from an indoor positioning system associated with particular passengers. In some embodiments, the second video system 610 is controllable using passengers' mobile devices. In a specific implementation, the second video system 610 may provide wait times. It is noted that wait times may also be provided to passenger's mobile devices.

The first video system 615 and the third video system 617 may comprise one or more video monitors coupled to a digital device configured to provide information to the one or more video monitors. The first video system 615 and the third video system 617 may be configured similarly to the second video system 610. The first video system 615 and the third video system 617 may be configured to direct videos at particular passengers, and may do so based on an indoor positioning system. The first video system 615 and the third video system 617 may or may not display the same content as the second video system 610. For example, the first video system 615 and the third video system 617 may display live wait times, entertain passengers, inform passengers, instruct passengers, and/or have a customized video presentation for passengers. In some embodiments, the first video system 615 and the third video system 617 are controllable using passengers' mobile devices. In a specific implementation, the first video system 615 and the third video system 617 may provide wait times. It is noted that wait times may also be provided to passenger's mobile devices.

The architecturally optimized system 620 may include a series of architectural features. The architecturally optimized system 620 may incorporate structures that provide sensory optimization, as discussed herein. In a specific implementation, the architecturally optimized system 620 may be adapted to make the security checkpoint 600 appear more spacious than the security checkpoint 600 actually is. The architecturally optimized system 620 may also be adapted to provide design, décor, and other visually appealing attributes to passengers through the security checkpoint.

The optimized lighting system 625 may include a lighting arrangement. The optimized lighting system 625 may be coupled to a digital device configured to provide information to the one or more video monitors. The optimized lighting system 625 may provide sensory optimization, as discussed herein. In a specific implementation, the optimized lighting system 625 may provide warm color tones to calm the environment.

The fourth video system 630 may comprise one or more video monitors coupled to a digital device configured to provide information to the one or more video monitors. The fourth video system 630 may be configured similarly to the second video system 610. In a specific implementation, the fourth video system 630 may be configured to display information content (e.g., TSA regulatory content), while the second video system 610 may be configured to display other content (e.g., entertainment). The fourth video system 630 may be configured to direct videos at particular passengers, and may do so based on an indoor positioning system. The fourth video system 630 may or may not display the same content as the second video system 610.

The fifth video system 635 may comprise one or more video monitors coupled to a digital device configured to provide information to the one or more video monitors. The fifth video system 635 may be configured similarly to the second video system 610. In a specific implementation, the fifth video system 635 may be configured to display information content (e.g., screening instructions and precheck information), while the second video system 610 may be configured to display other content (e.g., entertainment). The fifth video system 635 may be configured to direct videos at particular passengers, and may do so based on an indoor positioning system.

The second directional audio system 640 may comprise audio directed to passengers at particular areas in the security checkpoint 600. The first directional audio system 605 may comprise speakers coupled to a digital device configured to provide information to the speakers. The second directional audio system 640 may be configured similarly to the first directional audio system 605. In a specific implementation, the second directional audio system 640 may be configured to provide screening instructions, while the first directional audio system 604 may be configured to provide custom music for a passenger.

The optimized nature graphics system 645 may include graphics for the security checkpoint 600. The optimized nature graphics system 645 may include a still image. In various embodiments, the optimized nature graphics system 645 may be integrated onto a computer screen and provide a digital display of nature graphics to soothe and calm passengers or otherwise influence their behavior.

The optimized tray system 650 may comprise a set of trays, as discussed herein. The optimized tray system 650 may comprise trays custom designed for security through the security checkpoint 600. The trays on the optimized tray system 650 may comprise radio opaque tether identifiers for identification through the scanner of the security checkpoint 600. Such tethering may be performed pursuant to U.S. Pat. No. 6,888,460. The opaque tether identifiers may allow for view in the scanner, and may be unique for each unit for positive identification. The identifiers may comprise a larger size than conventional trays and provide a high resolution image of the tray identifier as the tray passes through the scanner. The optimized tray system 650 may further comprise ergonomically designed carts to transport the trays.

The optimized recomposure area 655 may comprise a recomposure area that is optimized with respect to one or more of the characteristics discussed herein. In some embodiments the optimized recomposure area 655 may comprise an area where customer's collect their personal items post screening and/or put their shoes back on. In some embodiments the optimized recomposure area 655 may comprise a décor and design that is integrated and similar to the design of other parts of the security checkpoint and may comprise benches, chairs, chairs integrated with tables, and couches or sofas. In some embodiments the optimized recomposure area 655 need not be similar to other parts of the security checkpoint. More specifically, the optimized recomposure area 655 may be configured to provide an upscale environment where passengers can recompose their belongings with sophistication. Décor, environmental optimization, and other factors may be chosen so that the recomposure area has a sophisticated look, feel, smell, and/or sound. In various embodiments, the optimized recomposure area 655 may be incorporated into indoor positioning systems and/or interactive systems disclosed herein.

In some embodiments the optimized recomposure area 655 may include signage as described with respect to other parts of the security checkpoint. In certain embodiments the optimized recomposure area 655 may include an element configured to permit one or more customers to place their foot upon the element to facilitate replacement and retying of the customer's shoes. In some embodiments the shoe element is from about 24" to about 48" tall. In some embodiments the optimized recomposure area 655 may include one or more tables or shelves configured such that customers may place personal items upon them without bending over. In some embodiments the tables or shelves are from 48" to 60" tall. The items in the optimized recomposure area 655 may comprise modular units. Such modular units may reduce the environmental footprint of the security checkpoint and may provide greater function at lesser cost.

In some embodiments, the optimized recomposure area 655 may provide advertising. Advertising may be provided through the indoor positioning system, through NFC technologies, through RFID technologies, and other ways. The recomposure area may further provide sponsorship, naming rights, digital displays, and other systems and methods disclosed herein.

In some embodiments, the security checkpoint 600 may include a path traversing from an entrance to an identification checkpoint, and further traversing to the optimized recomposure area 655. The path may correspond to the path a passenger would take through the security checkpoint 600. The first video system 615 may be configured to display an expected wait time for a passenger to pass through the entrance of the security checkpoint 600 to an exit of the security checkpoint 600. Expected wait times may be derived in many ways. For instance, in some embodiments, the expected wait time may comprise a crowdsourced wait time from a plurality of people who have passed through the security checkpoint 600. The expected wait time may be derived from historical wait times for the security checkpoint 600. The expected wait time may be derived from motion information from one or more motion sensors configured to monitor motion of people passing through the security checkpoint 600. In various embodiments, wait times may be derived using the techniques described in U.S. patent application Ser. No. 13/608,785 to Ambrefe, entitled "Systems and Methods for Security Checkpoint Condition Information and Sharing," filed Sep. 10, 2012, and hereby incorporated by reference herein.

In some embodiments, the first directional audio system 610 may provide a type of music to an area around which it can be heard. This may correspond to a second portion of the path. The type of music may be determined on how close the first directional audio system 610 is to a scanner of the security checkpoint 600. The type of music may comprise uptempo music, soothing music, or other types of music depending on the nature of auditory optimization being performed. The type of music may be selected by passengers waiting in the line to the security checkpoint. The second directional audio system 640 may provide instructions to another area around which it can be heard. The location of the second directional audio system 640 may be determined based on proximity of the area around which the second directional audio system 640 can be heard to an identification checking station of the security checkpoint.

Though the components in FIG. 4 are shown arranged in a sequence, it is noted that in various embodiments, the components herein may be arranged in different sequences or in no sequence at all.

Figure 5:
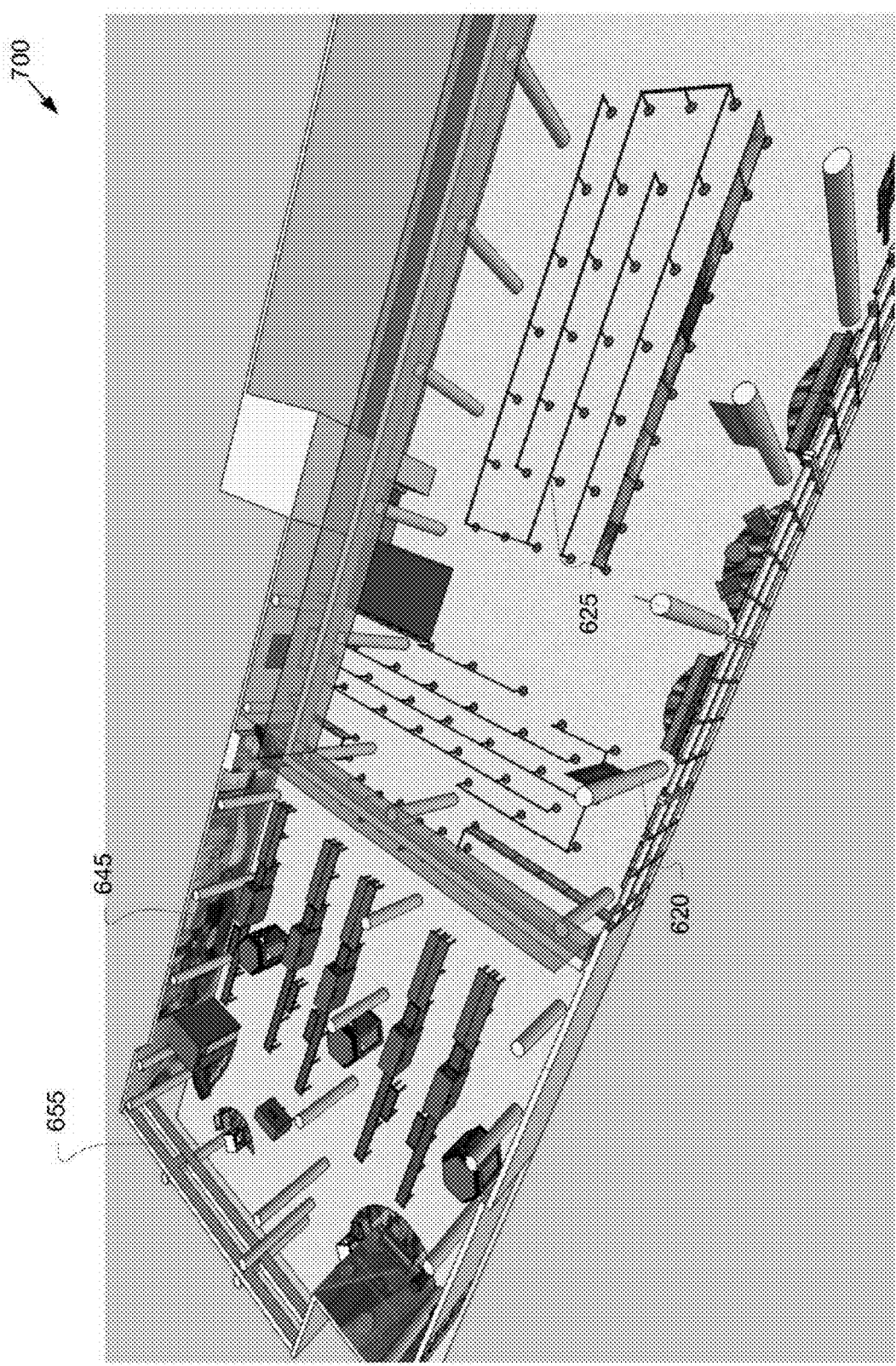
FIG. 5 is an illustration of a security checkpoint, according to some embodiments.

FIG. 5 is an illustration of a security checkpoint 700, according to some embodiments. The security checkpoint 700 may include the architecturally optimized system 620, the optimized lighting system 625, the optimized nature graphics system 645, and the optimized recomposure area 655, as discussed herein.

Figure 6:
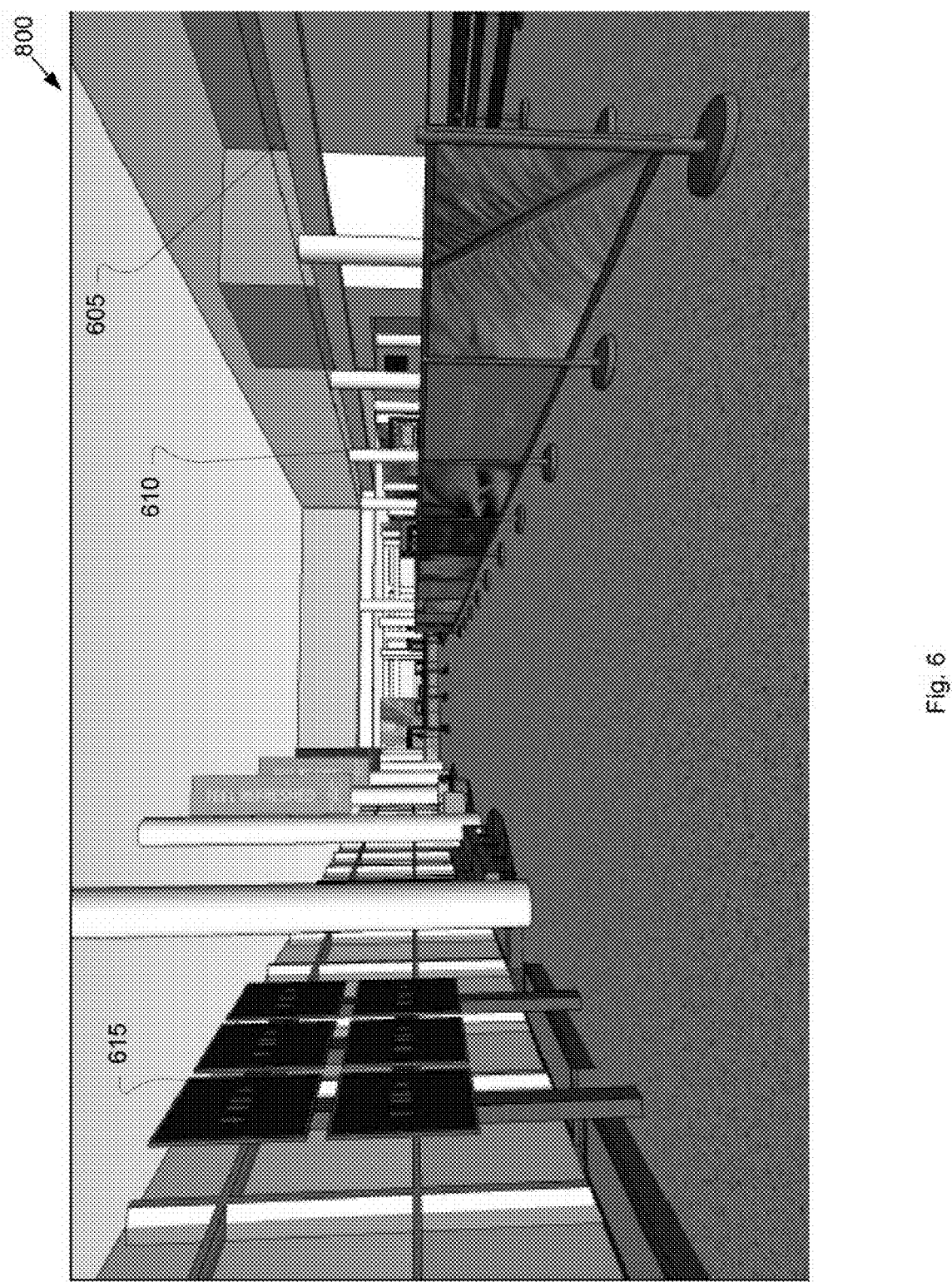
FIG. 6 is an illustration of a security checkpoint, according to some embodiments.

FIG. 6 is an illustration of a security checkpoint 800, according to some embodiments. The security checkpoint 800 may include the first directional audio system 605, the first video system 615, and the second video system 610. The first directional audio system 605 may be embedded into the ceiling of the security checkpoint 800.

Figure 7:
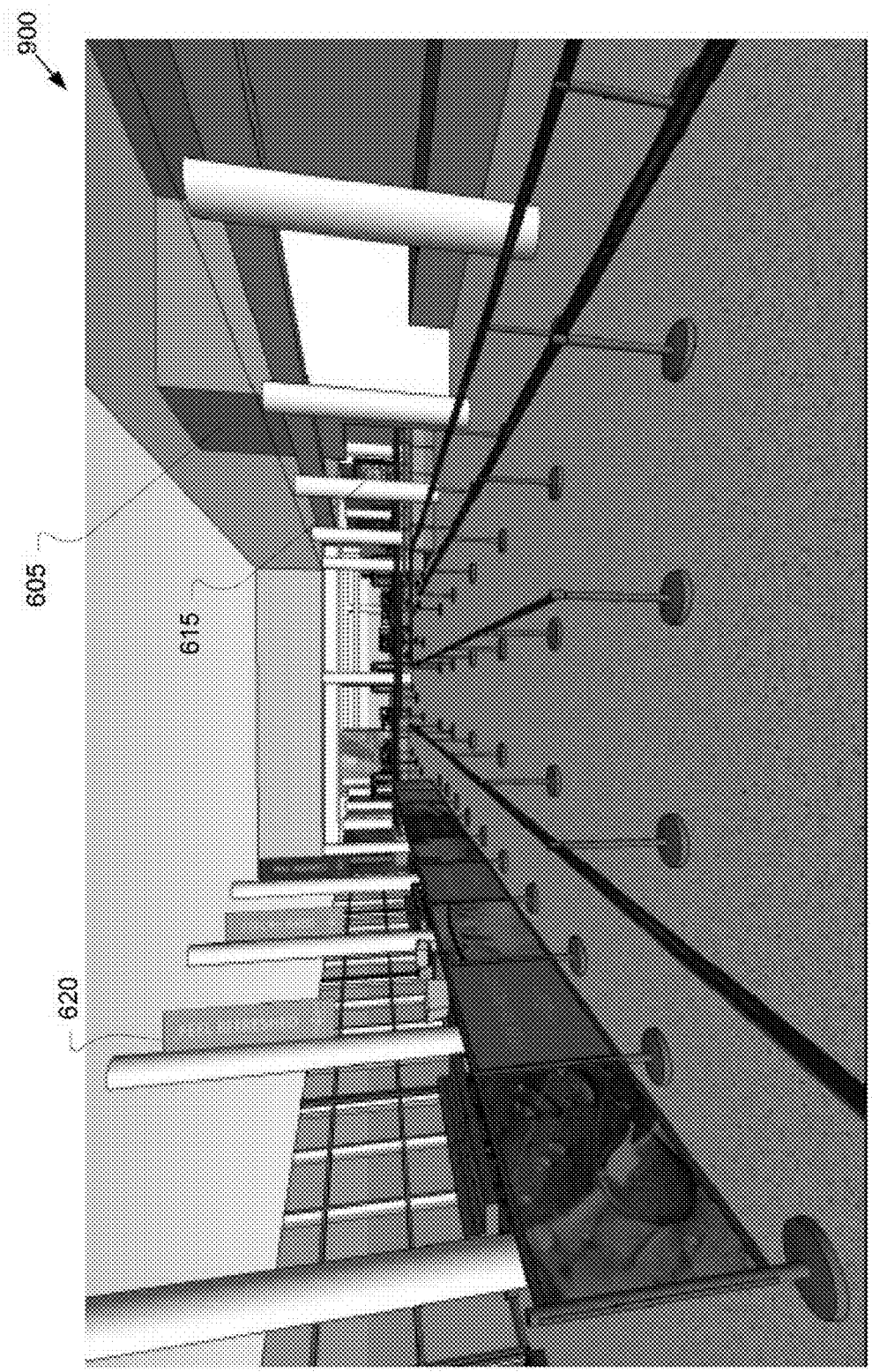
FIG. 7 is an illustration of a security checkpoint, according to some embodiments.

FIG. 7 is an illustration of a security checkpoint 900, according to some embodiments. The security checkpoint 900 may include the second directional audio system 640, the third video system 617, and the architecturally optimized system 620. The first directional audio system 605 may be embedded into the ceiling of the security checkpoint 800.

Figure 8:
FIG. 8 is an illustration of a security checkpoint, according to some embodiments.
Figure 9:
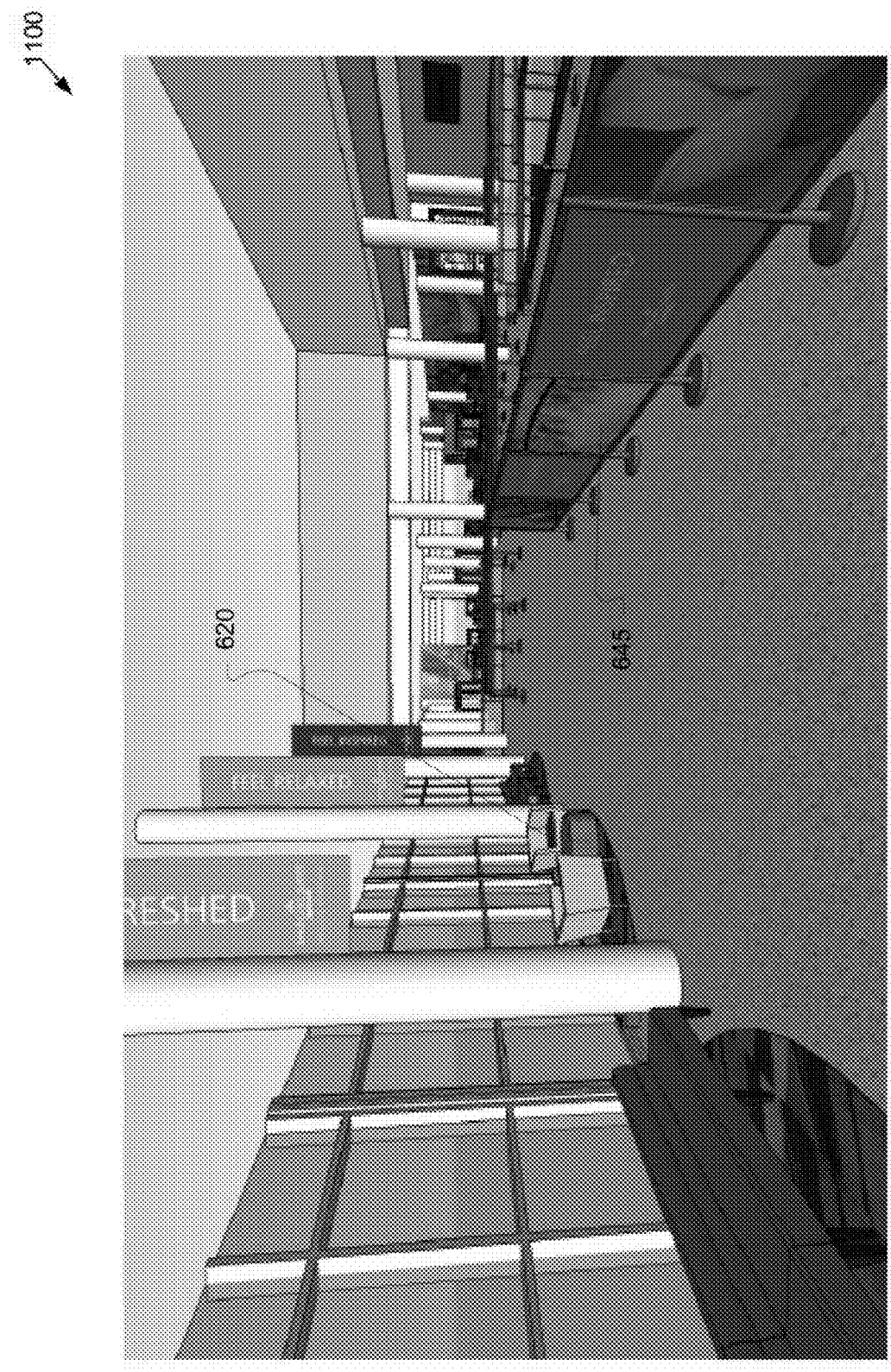
FIG. 9 is an illustration of a security checkpoint, according to some embodiments.
Figure 10:
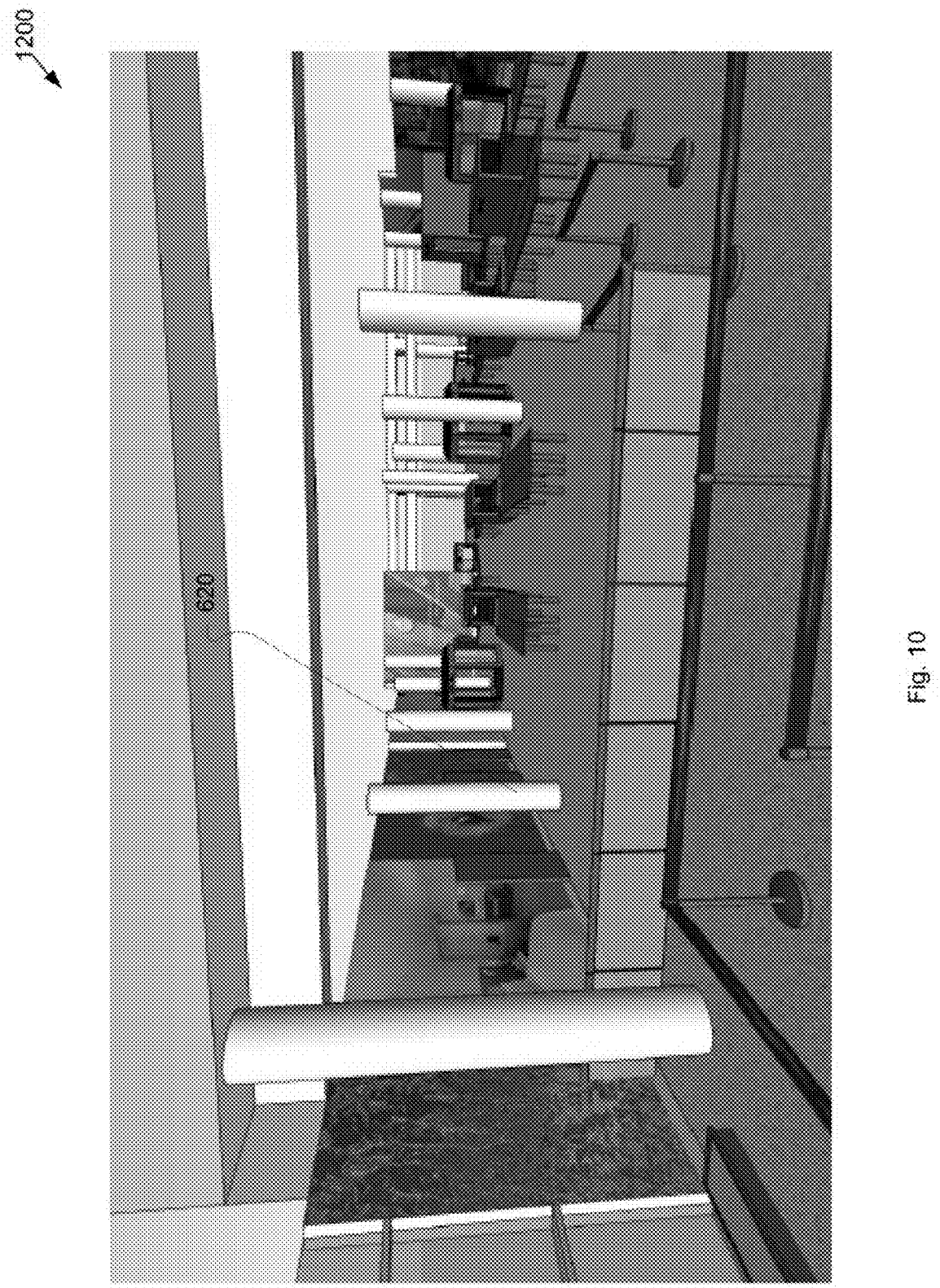
FIG. 10 is an illustration of a security checkpoint, according to some embodiments.

FIG. 8 is an illustration of a security checkpoint 1000, according to some embodiments. The security checkpoint 1000 may include the second video system 610, the architecturally optimized system 620, and the optimized tray system 650. FIG. 9 is an illustration of a security checkpoint 1100, according to some embodiments. The security checkpoint 1100 may include the architecturally optimized system 620 and the optimized nature graphics system 645. FIG. 10 is an illustration of a security checkpoint 1200, according to some embodiments. The security checkpoint 1200 may include the architecturally optimized system 620.

Figure 11:
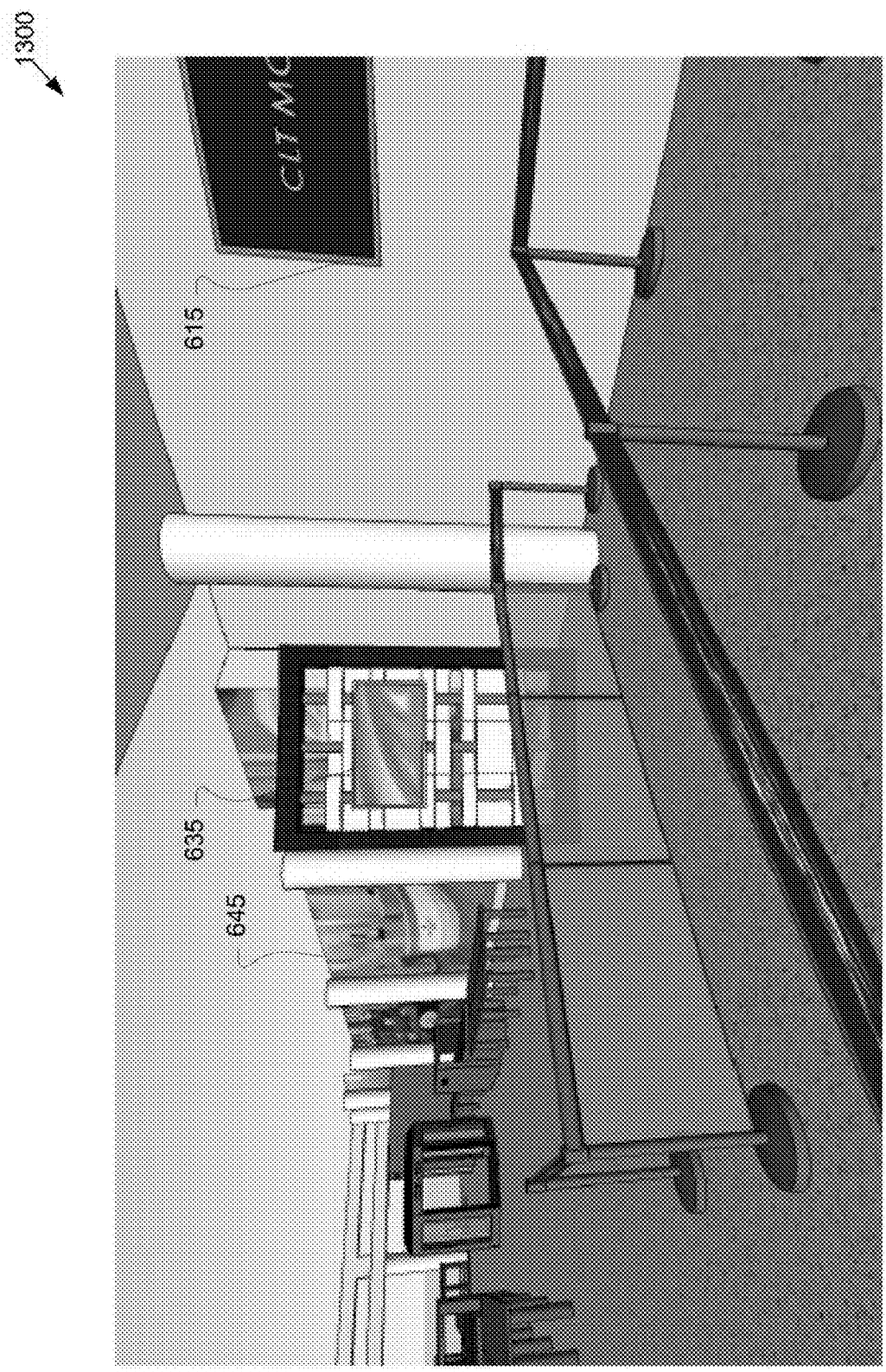
FIG. 11 is an illustration of a security checkpoint, according to some embodiments.

FIG. 11 is an illustration of a security checkpoint 1300, according to some embodiments. The security checkpoint 1300 may include the third video system 617, the fifth video system 635, and the optimized nature graphics system 645.

Figure 12:
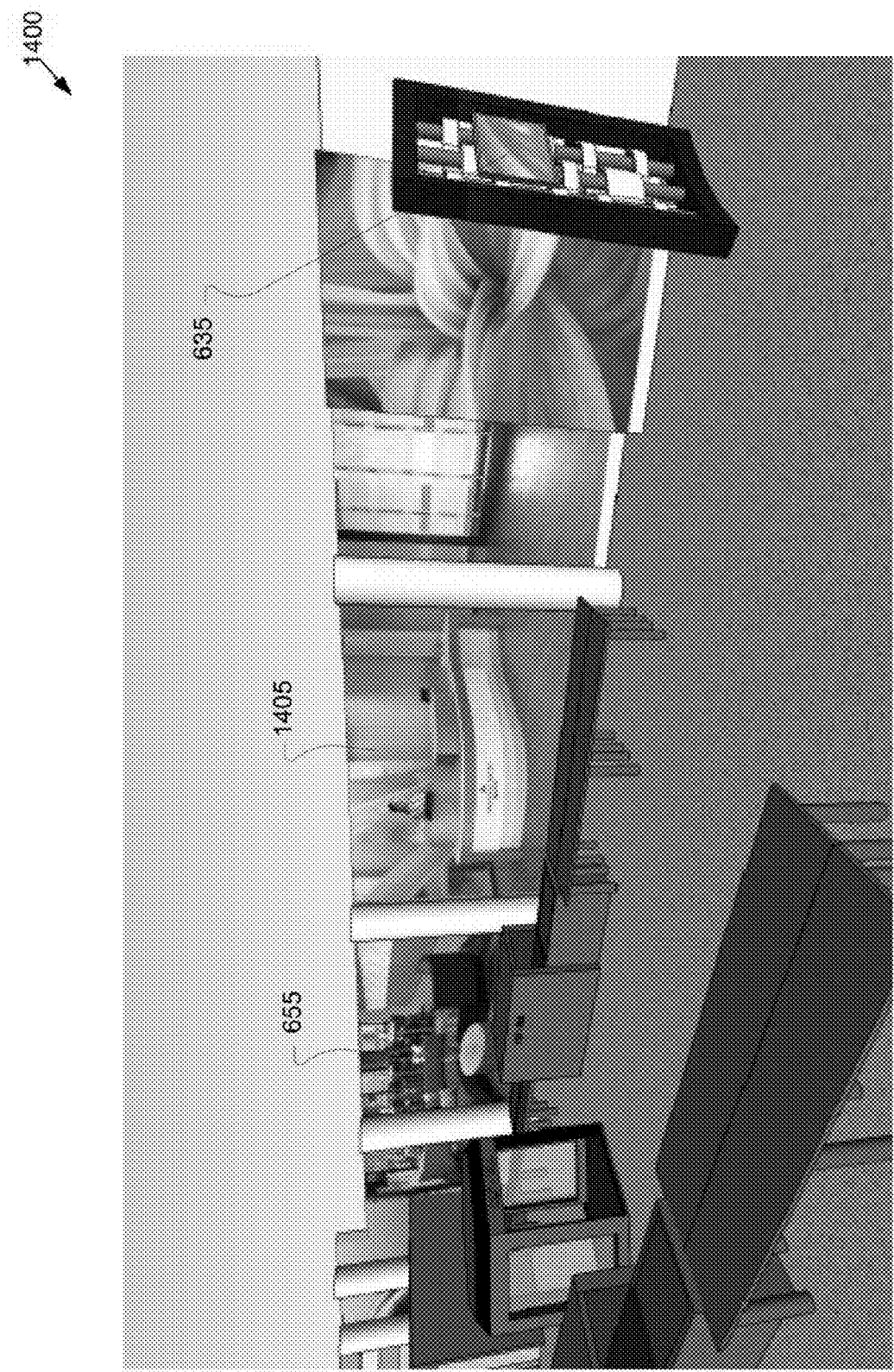
FIG. 12 is an illustration of a security checkpoint, according to some embodiments.
Figure 13:
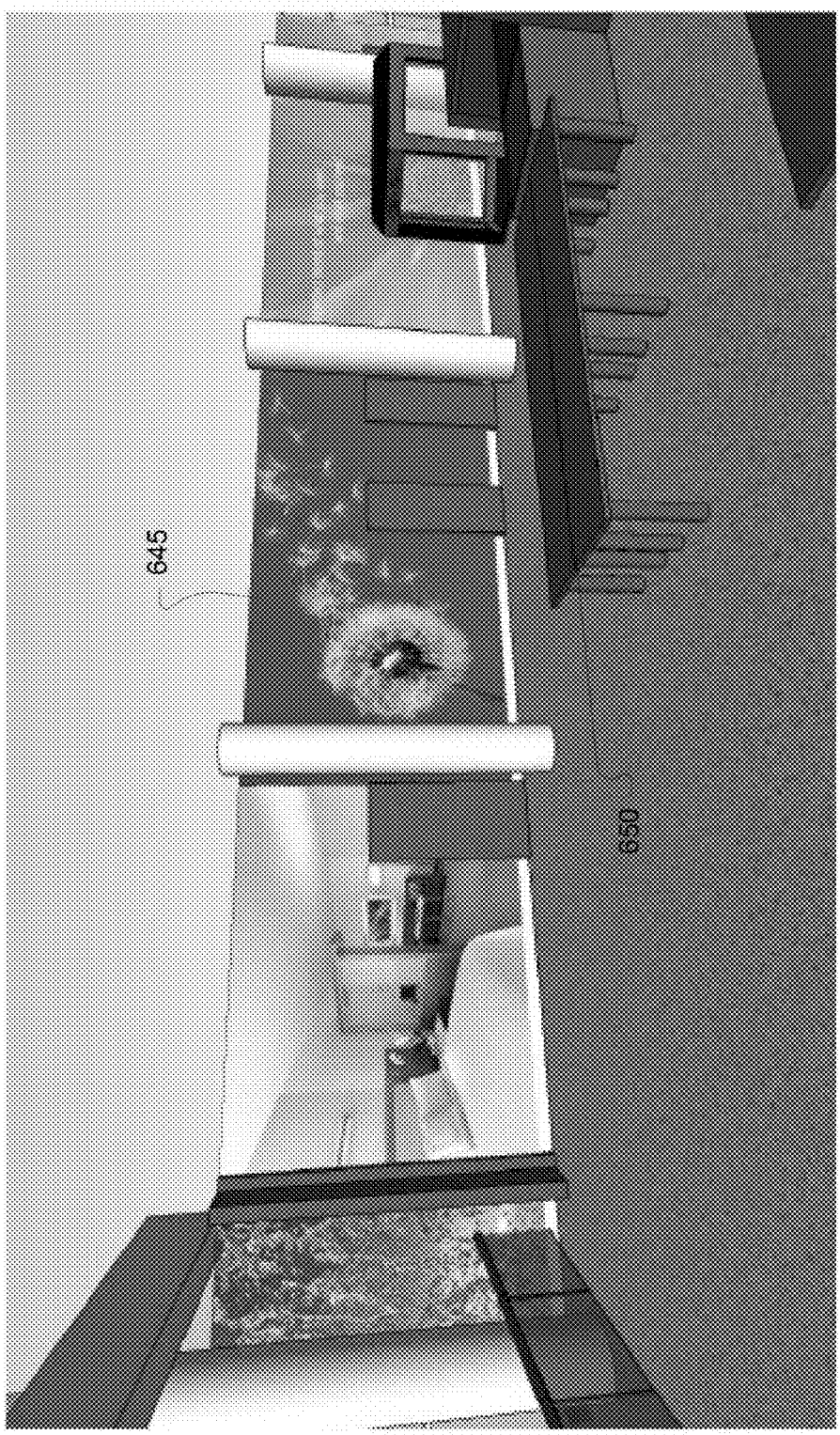
FIG. 13 is an illustration of a security checkpoint, according to some embodiments.

FIG. 12 is an illustration of a security checkpoint 1400, according to some embodiments. The security checkpoint 1400 may include the fifth video system 635, the optimized recomposure area 655, and a security concierge 1405. The security concierge 1405 may be staffed with customer service personnel. Such customer service personnel may be trained to provide friendly and responsive customer service to passengers. FIG. 13 is an illustration of a security checkpoint 1500, according to some embodiments. The security checkpoint 1500 may include the optimized nature graphics system 645 and the optimized tray system 650.

Figure 14:
FIG. 14 is an illustration of a security checkpoint, according to some embodiments.
Figure 15:
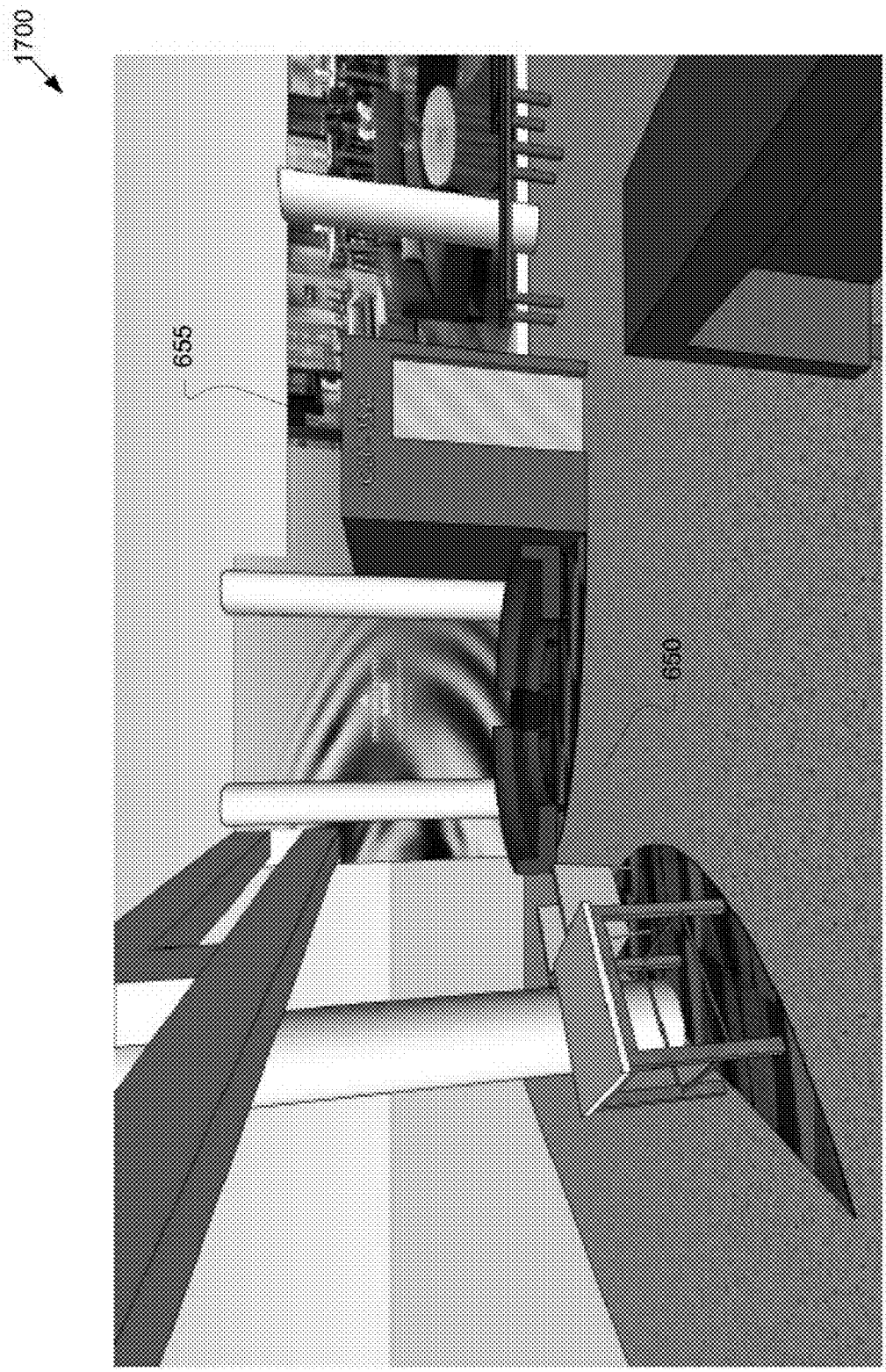
FIG. 15 is an illustration of a security checkpoint, according to some embodiments.

FIG. 14 is an illustration of a security checkpoint 1600, according to some embodiments. The security checkpoint 1600 may include the optimized tray system 650 and the optimized recomposure area 655. FIG. 15 is an illustration of a security checkpoint 1700, according to some embodiments. The security checkpoint 1700 may include the optimized tray system 650 and the optimized recomposure area 655.

Figure 16:
FIG. 16 is an illustration of a security checkpoint, according to some embodiments.
Figure 17:
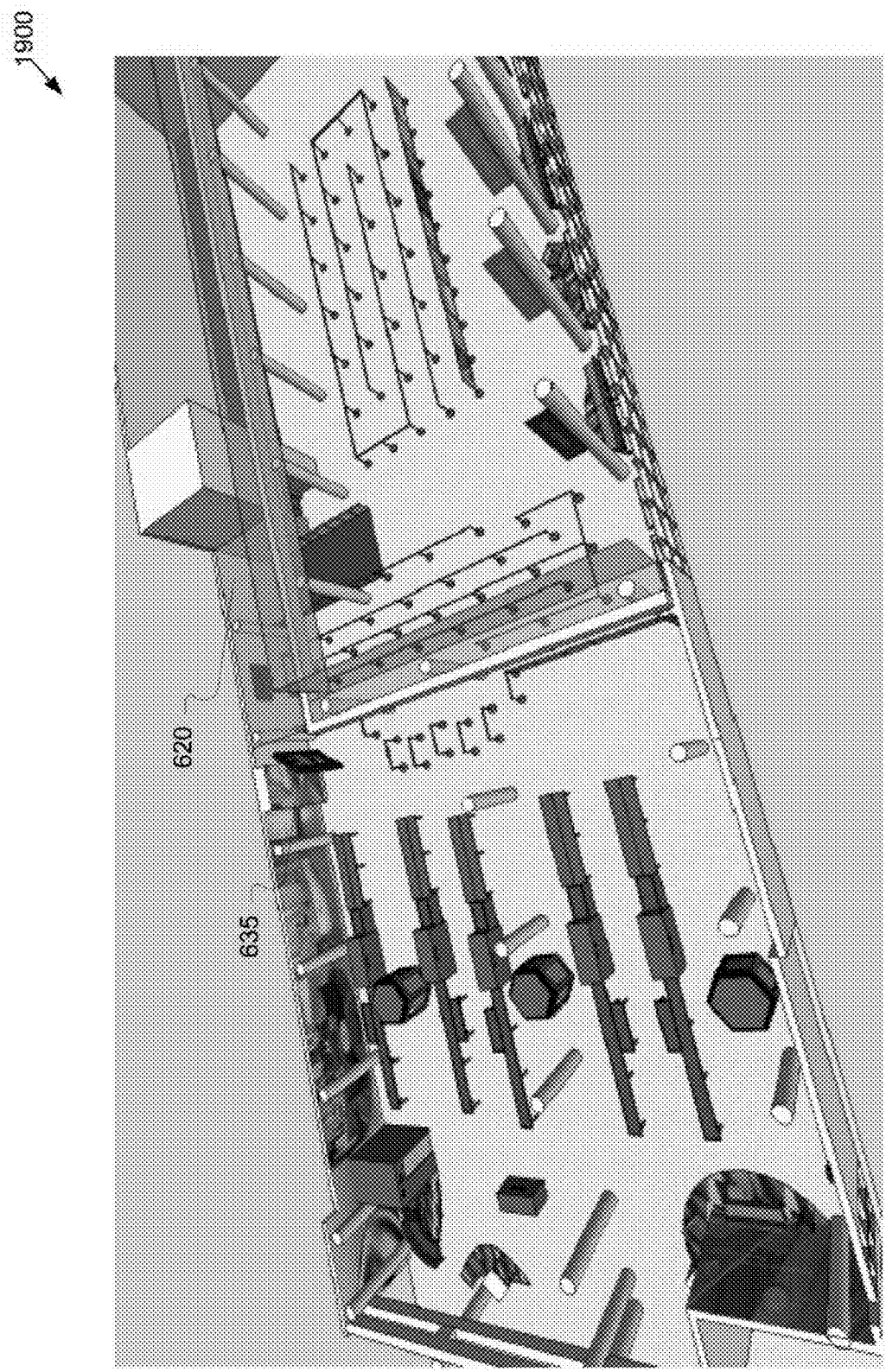
FIG. 17 is an illustration of a security checkpoint, according to some embodiments.
Figure 18:
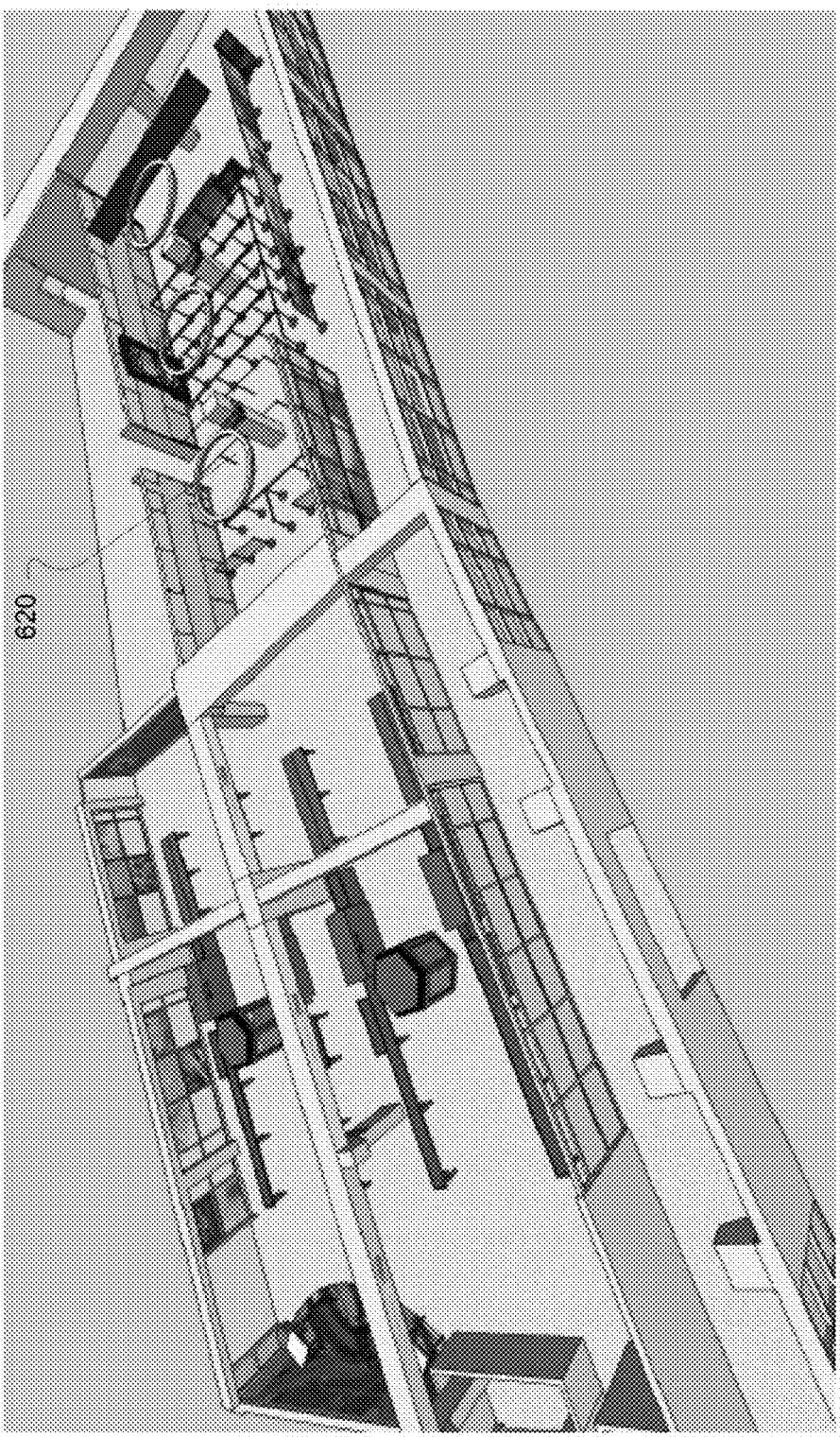
FIG. 18 is an illustration of a security checkpoint, according to some embodiments.

FIG. 16 is an illustration of a security checkpoint 1800, according to some embodiments. The security checkpoint 1800 may include the architecturally optimized system 620, the optimized lighting system 625, the fifth video system 635, the optimized nature graphics system 645, and the optimized recomposure area 655. FIG. 17 is an illustration of a security checkpoint 1900, according to some embodiments. The security checkpoint 1900 may include the architecturally optimized system 620 and the fifth video system 635. FIG. 18 is an illustration of a security checkpoint 2000, according to some embodiments. The security checkpoint 2000 may include the architecturally optimized system 620. As can be seen, the architecturally optimized system 620 can be varied in many ways to create a soothing atmosphere for passengers.

Figure 19:
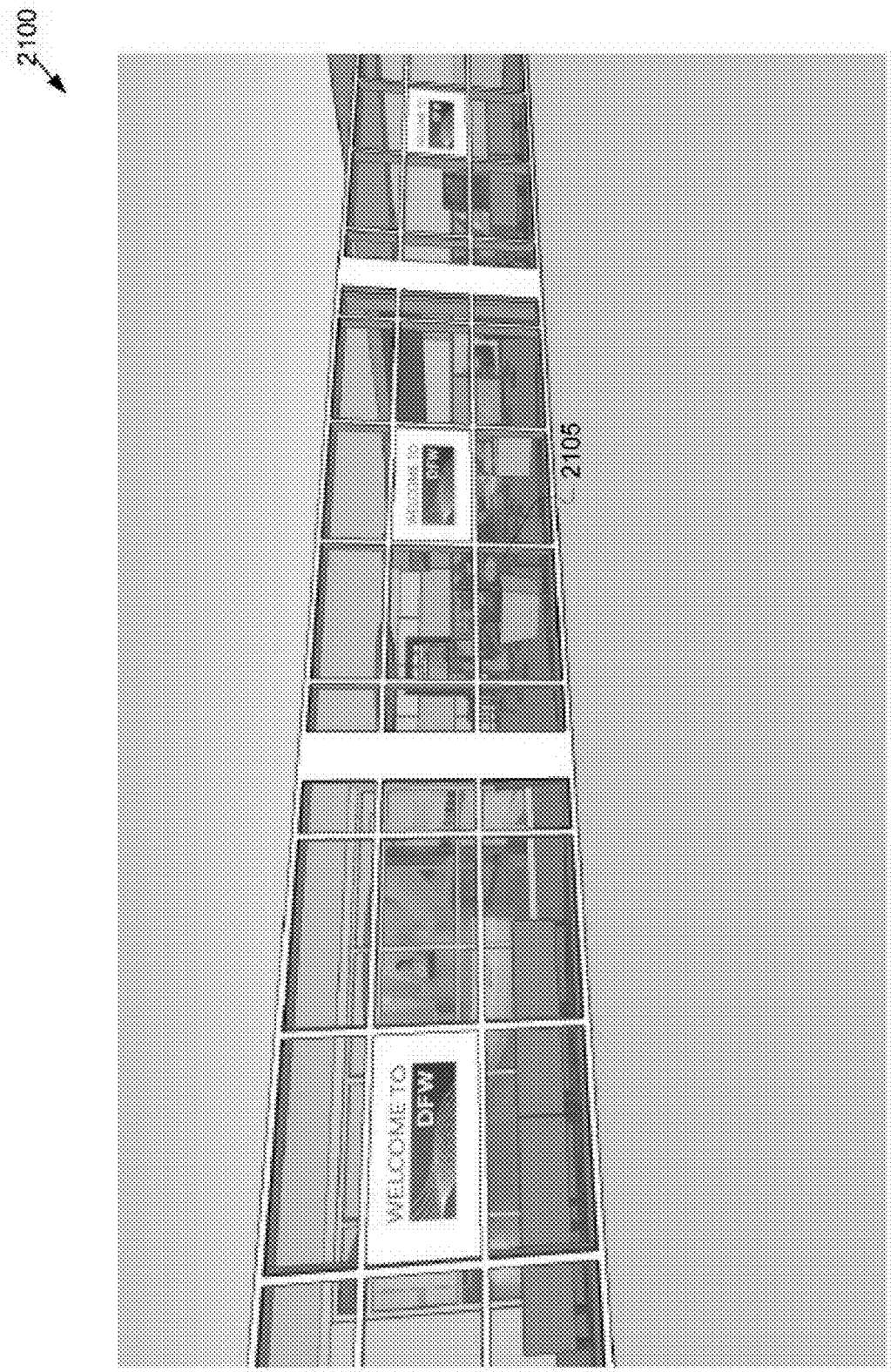
FIG. 19 is an illustration of a security checkpoint, according to some embodiments.

FIG. 19 is an illustration of a security checkpoint 2100, according to some embodiments. The security checkpoint 2100 may include transparent glass panels 2105. The transparent glass panels 2105 may be optimized to present information as discussed herein.

Figure 20:
FIG. 20 is an illustration of a security checkpoint, according to some embodiments.
Figure 21:
FIG. 21 is an illustration of a security checkpoint, according to some embodiments.

FIG. 20 is an illustration of a security checkpoint 2200, according to some embodiments. The security checkpoint 2200 may include an optimized recomposure area 655. FIG. 21 is an illustration of a security checkpoint 2300, according to some embodiments. The security checkpoint 2300 may include the third video system 617 and the architecturally optimized system 620.

Figure 22:
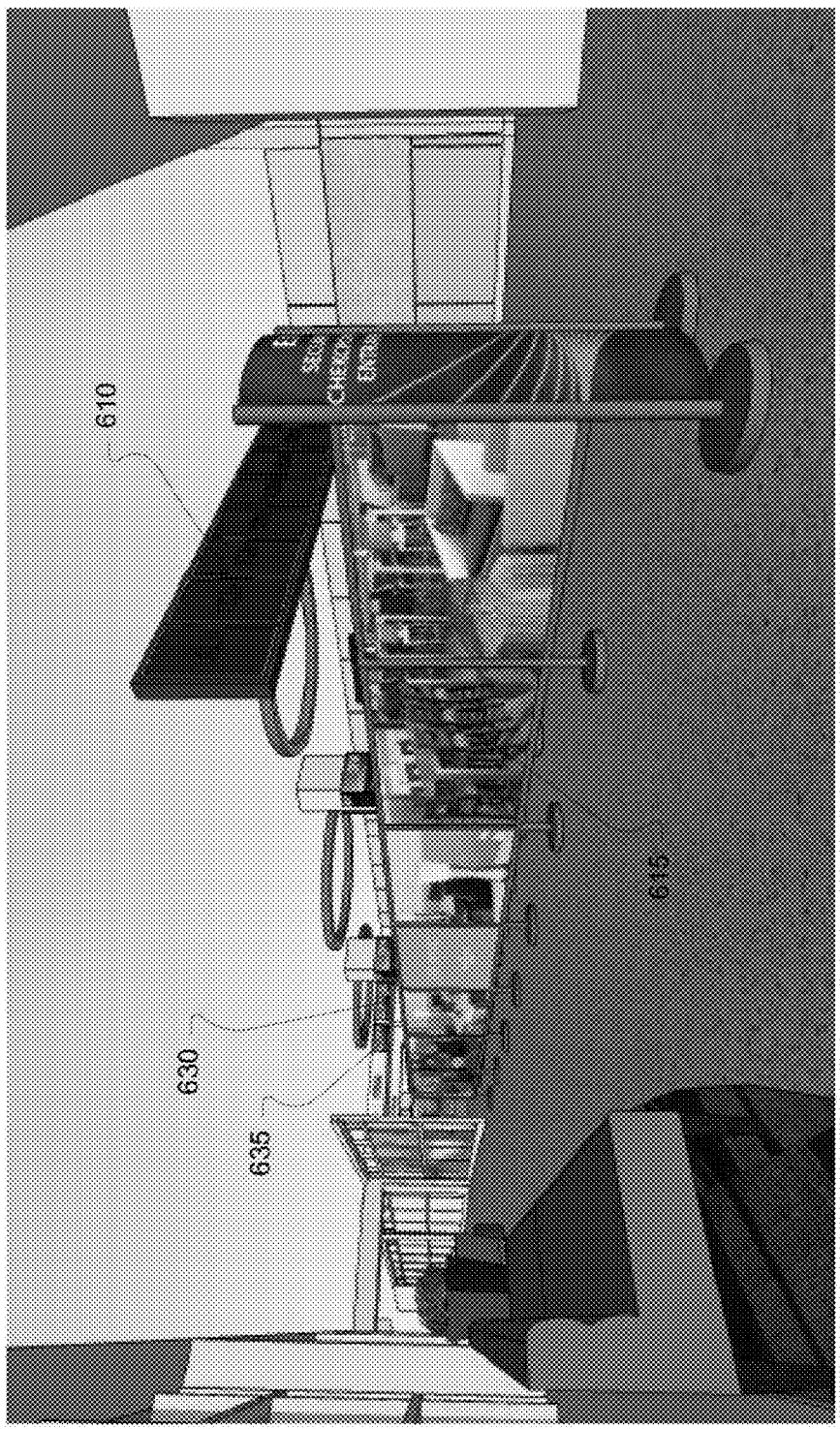
FIG. 22 is an illustration of a security checkpoint, according to some embodiments.
Figure 23:
FIG. 23 is an illustration of a security checkpoint, according to some embodiments.
Figure 24:
FIG. 24 is an illustration of a security checkpoint, according to some embodiments.

FIG. 22 is an illustration of a security checkpoint 2400, according to some embodiments. The security checkpoint 2400 may include the second video system 610, the third video system 617, the fourth video system 630, and the fifth video system 635. FIG. 23 is an illustration of a security checkpoint 2500, according to some embodiments. The security checkpoint 2500 may include the second video system 610 and the third video system 617. FIG. 24 is an illustration of a security checkpoint 2600, according to some embodiments. The security checkpoint 2600 may include transparent glass 2605 with promotional slogans and/or advertisements.

Figure 25:
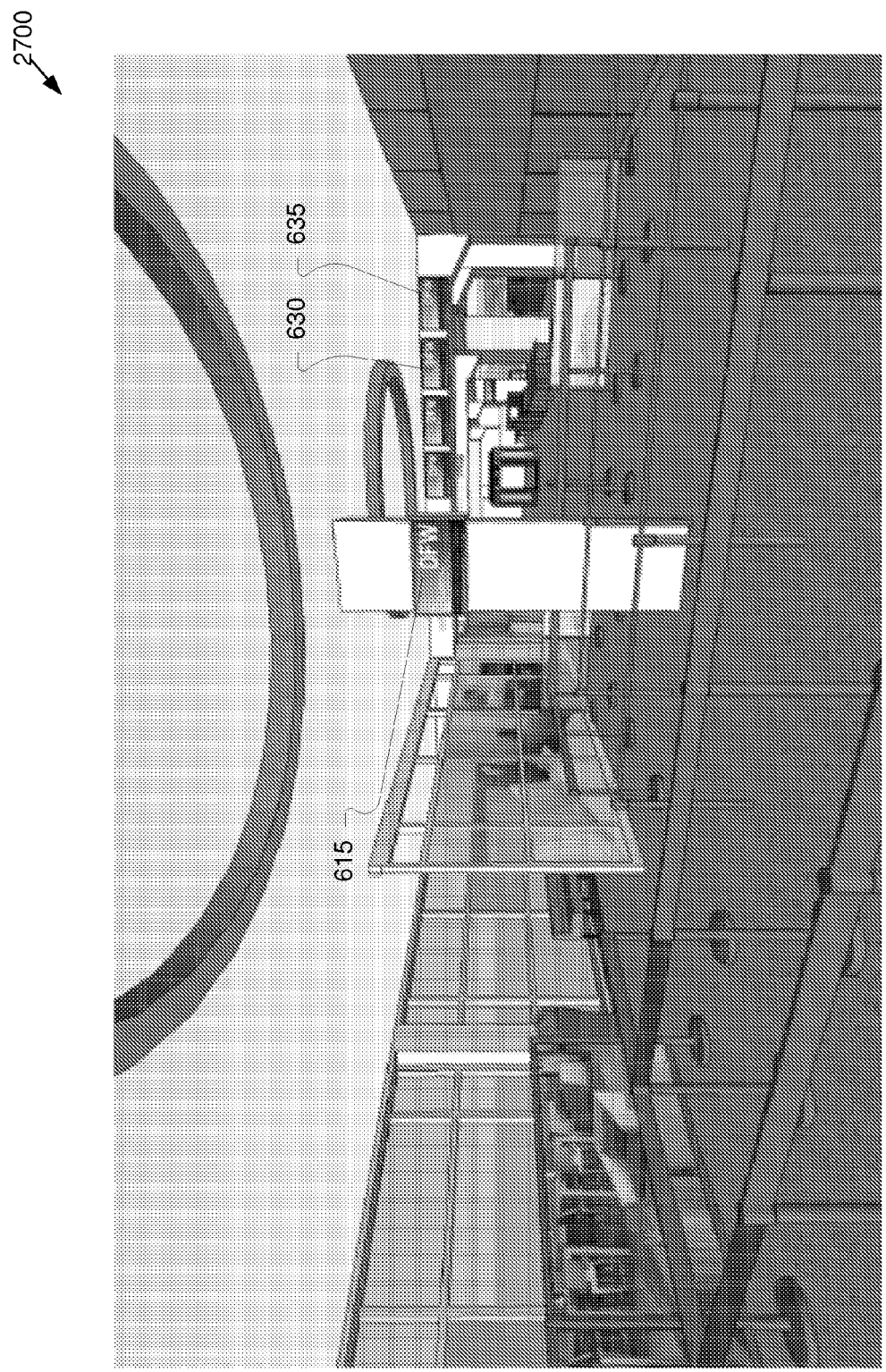
FIG. 25 is an illustration of a security checkpoint, according to some embodiments.
Figure 26:
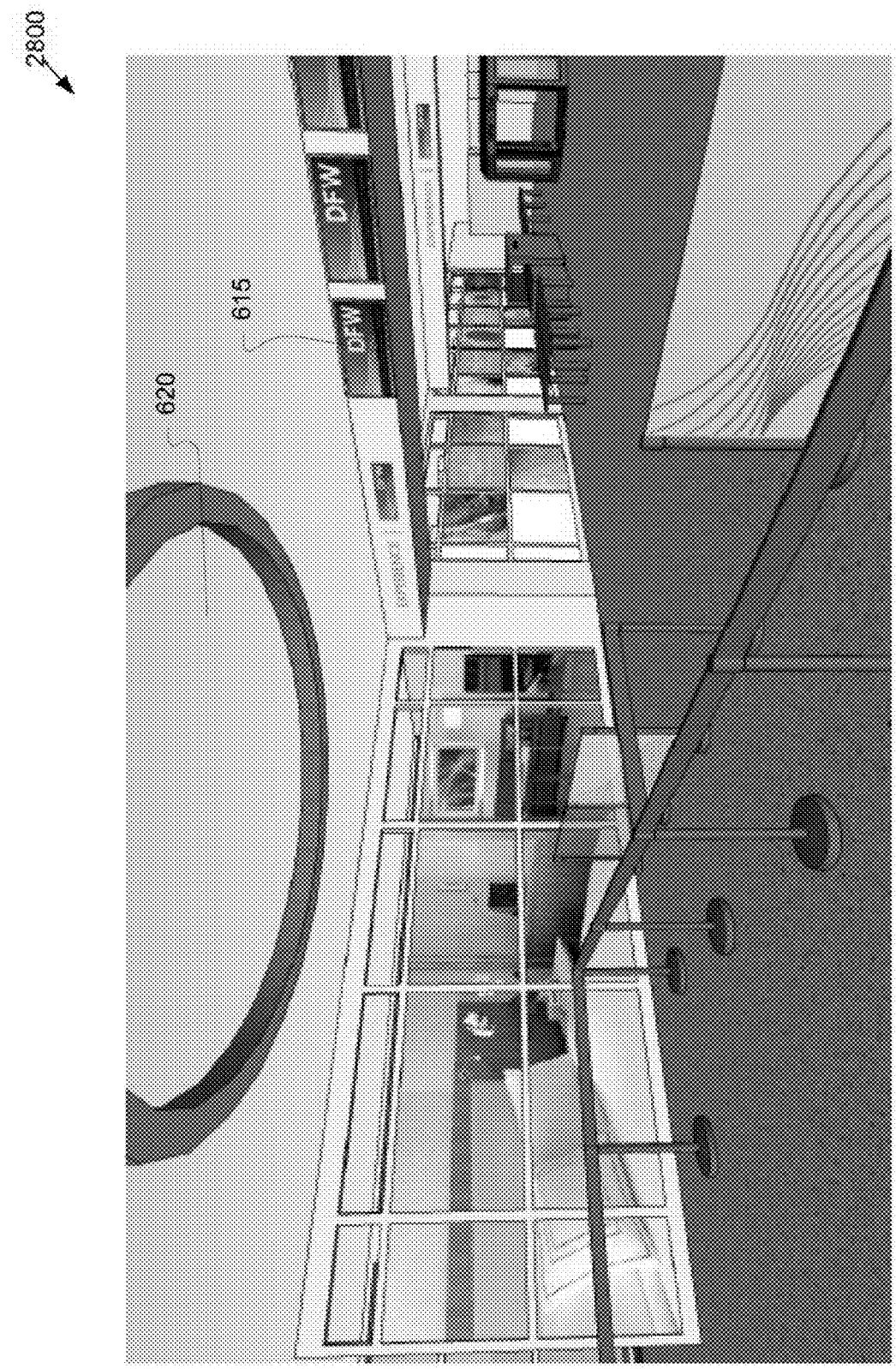
FIG. 26 is an illustration of a security checkpoint, according to some embodiments.
Figure 27:
FIG. 27 is an illustration of a security checkpoint, according to some embodiments.
Figure 28:
FIG. 28 is an illustration of a security checkpoint, according to some embodiments.
Figure 29:
FIG. 29 is an illustration of a security checkpoint, according to some embodiments.

FIG. 25 is an illustration of a security checkpoint 2700, according to some embodiments. The security checkpoint 2700 may include the third video system 617, the fourth video system 630, and the fifth video system 635. FIG. 26 is an illustration of a security checkpoint 2800, according to some embodiments. The security checkpoint 2800 may include the first video system 615 and the architecturally optimized system 620. FIG. 27 is an illustration of a security checkpoint 2900, according to some embodiments. The security checkpoint 2900 may be adapted to receive an optimized tray system 650. FIG. 28 is an illustration of a security checkpoint, according to some embodiments. The security checkpoint 3000 may be adapted to receive an optimized tray system 650. FIG. 29 is an illustration of a security checkpoint 3100, according to some embodiments. The security checkpoint 3100 may be adapted to receive an optimized tray system 650.

Figure 30:
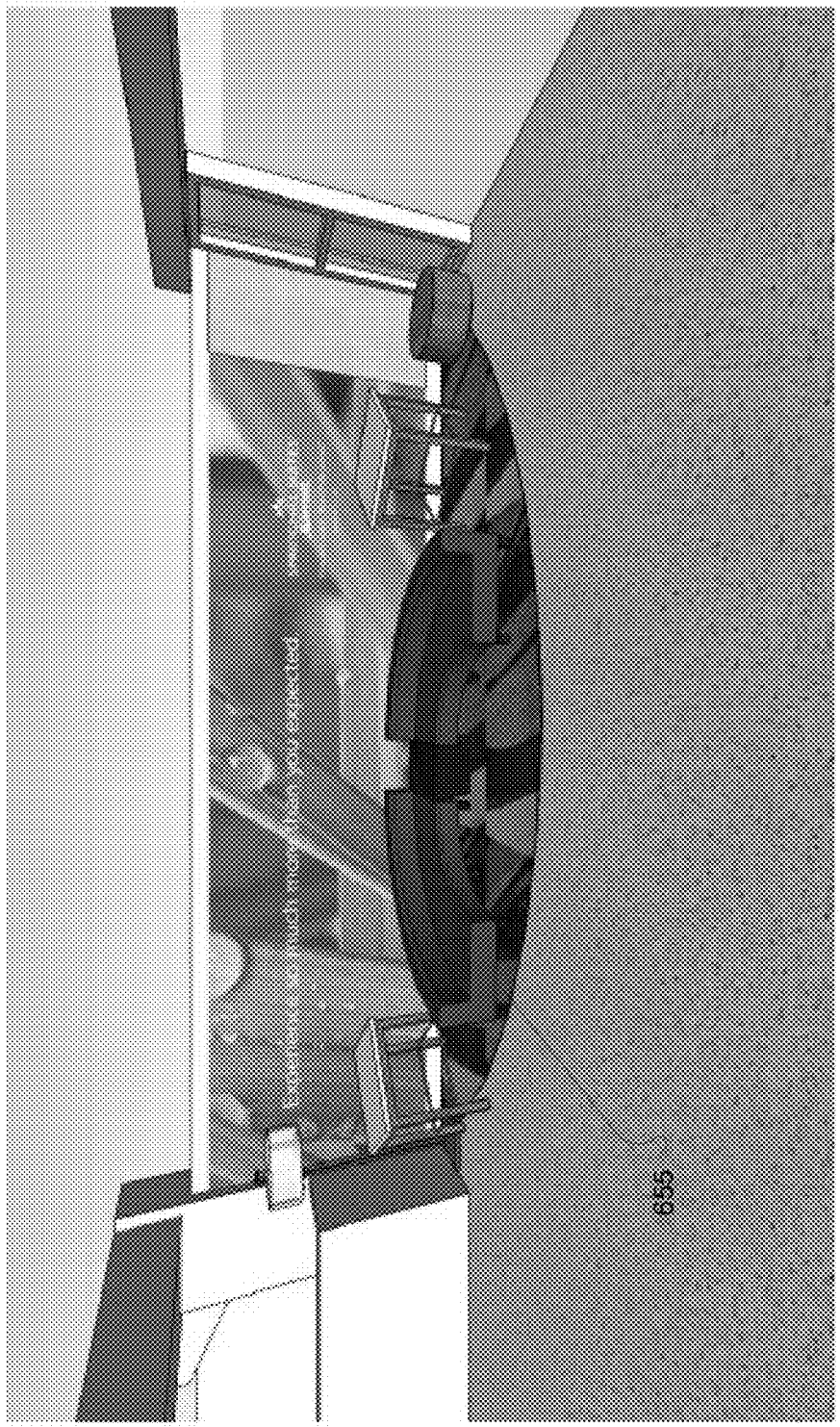
FIG. 30 is an illustration of a security checkpoint, according to some embodiments.
Figure 31:
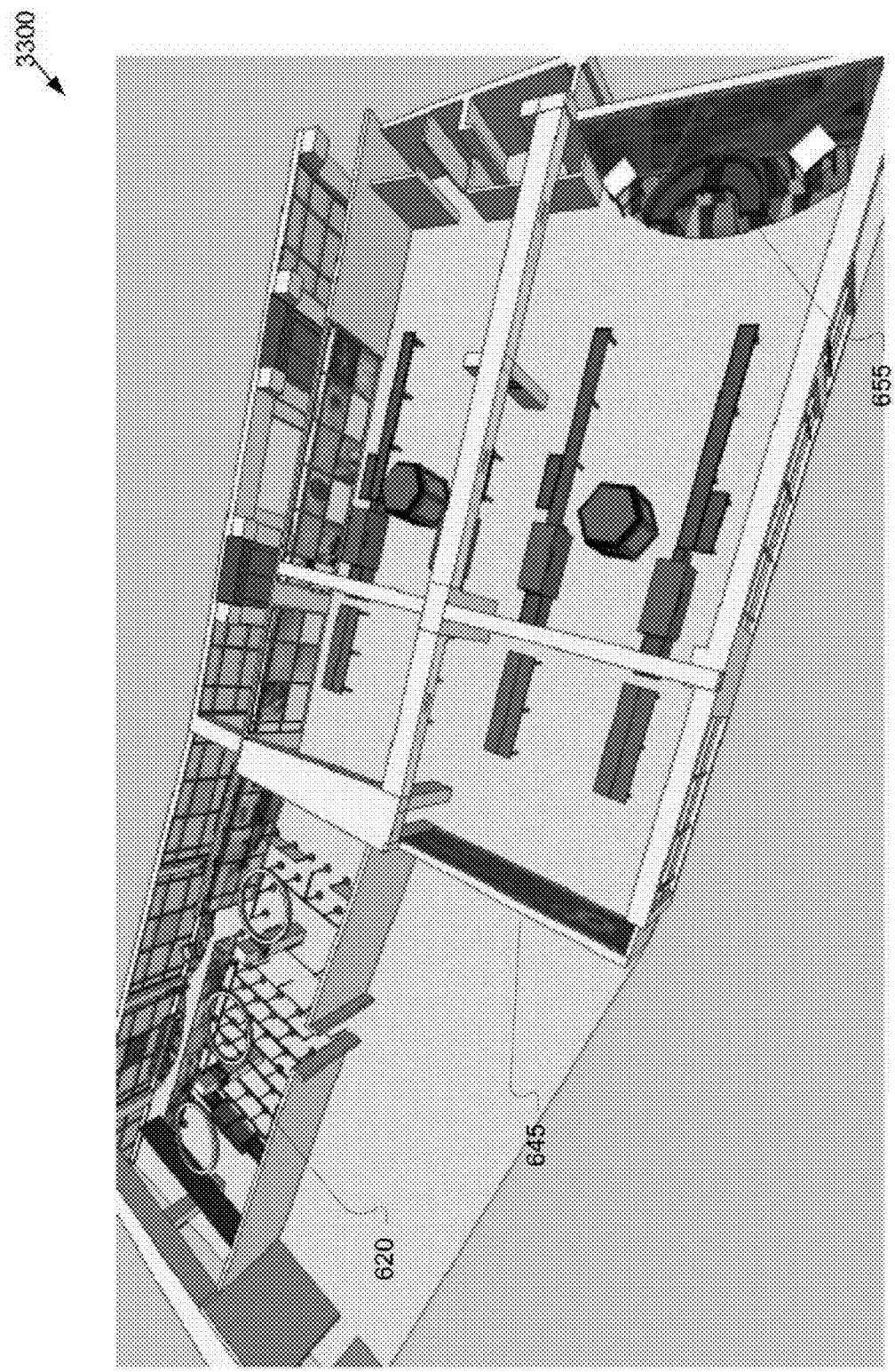
FIG. 31 is an illustration of a security checkpoint, according to some embodiments.
Figure 32:
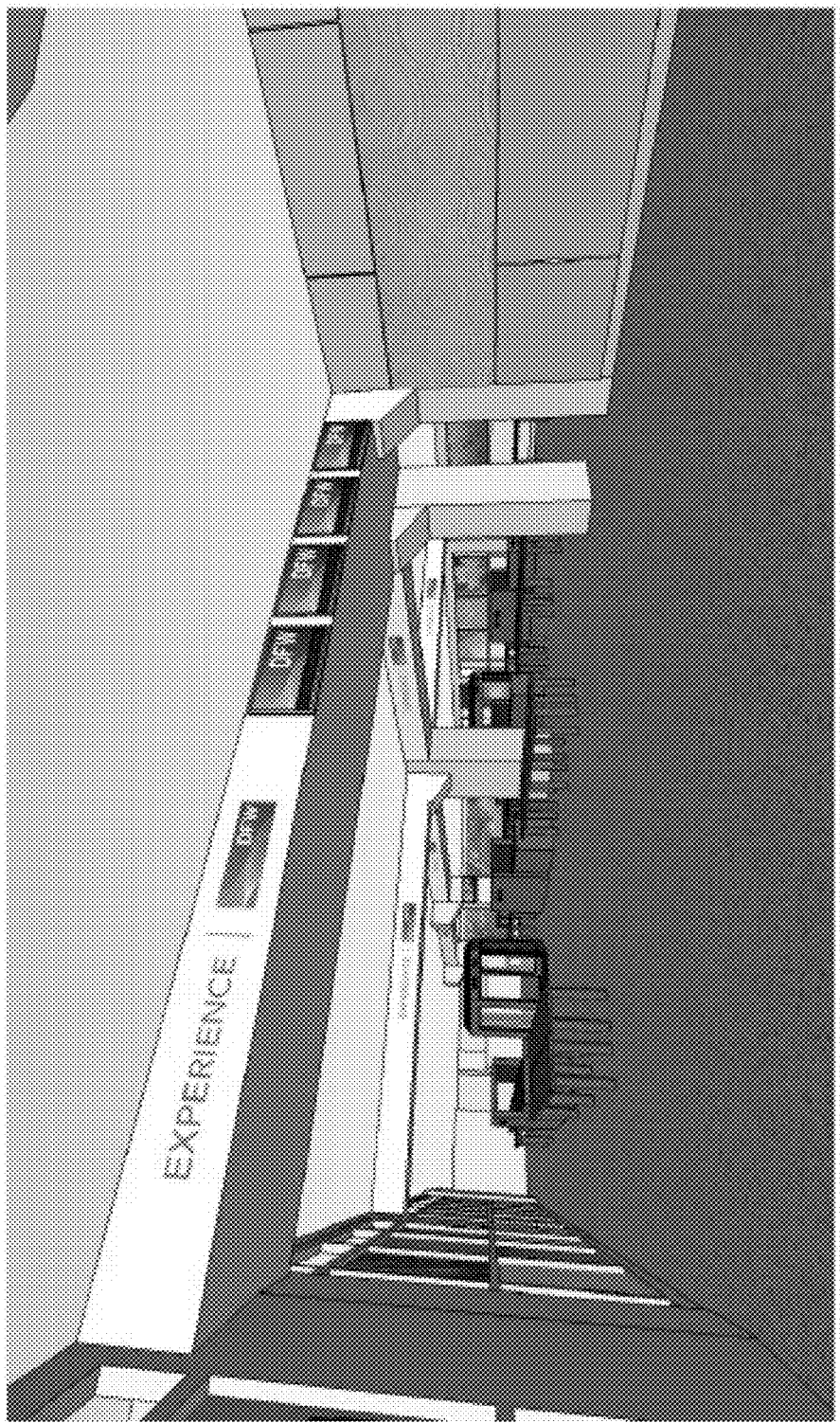
FIG. 32 is an illustration of a security checkpoint, according to some embodiments.

FIG. 30 is an illustration of a security checkpoint 3200, according to some embodiments. The security checkpoint 3200 may include the optimized recomposure area 655. FIG. 31 is an illustration of a security checkpoint 3300, according to some embodiments. The security checkpoint 3300 may include the architecturally optimized system 620, the optimized nature graphics system 645, and the optimized recomposure area 655. FIG. 32 is an illustration of a security checkpoint 3400, according to some embodiments. The security checkpoint 3400 may include the first video system 615.

What is claimed is:

1. A security checkpoint comprising:
a path leading from an entrance of the security checkpoint to at least one identification checkpoint, and leading from the at least one identification checkpoint to at least one recomposure station of the security checkpoint;
a display near or at the entrance of the security checkpoint and a first portion of the path, the display configured to configured to display an expected wait time for at least one person to pass from the entrance of the security checkpoint to an exit of the security checkpoint, the person using at least the first portion of the path; and a plurality of audio systems, a first audio system of the plurality of audio systems providing a type of music to a first area covering at least a second portion of the path, a location of the first area and the type of music determined based on proximity of the second portion of the path to the identification checking station, and a second audio system of the plurality of audio systems providing instructions to a second area covering at least a third portion of the path, a location of the second area determined based on proximity of the third portion to the identification checking station, wherein the type of music is selected by one or more of a plurality of people who have passed through the entrance of the security checkpoint.

2. The security checkpoint of claim 1, wherein the expected wait time comprises a crowdsourced wait time taken from a plurality of people who have passed through the entrance of the security checkpoint.

3. The security checkpoint of claim 1, wherein the expected time is based historical wait time data related to the security checkpoint.

4. The security checkpoint of claim 1, wherein the expected wait time is based on motion information from one or more motion sensors configured to monitor motion of people passing through the security checkpoint.

5. The security checkpoint of claim 1, wherein the first portion of the path substantially overlaps either the second portion of the path or the third portion of the path.

6. The security checkpoint of claim 1, further comprising an architecturally optimized system adapted to provide design, decor, and other visually appealing attributes to passengers through the security checkpoint.

7. The security checkpoint of claim 1, further comprising an optimized tray system having one or more trays, the one or more trays comprising one or more radio opaque tether identifiers for identification through a scanner of the security checkpoint.

8. The security checkpoint of claim 1, wherein one or more of the first audio system and the second audio system is configured to provide directional audio or auditory masking of ambient sounds within the security checkpoint.

9. The security checkpoint of claim 1, wherein the first type of music is further determined on proximity of the second portion of the path to a scanner of the security checkpoint.

10. The security checkpoint of claim 1, wherein the type of music comprises uptempo music or soothing audio.

11. A method comprising:
displaying an expected wait time for at least one person to pass from an entrance of a security checkpoint to exit of the security checkpoint, the person using at least a first portion of a path leading from an entrance of the security checkpoint to at least one identification checkpoint, and leading from the at least one identification checkpoint to at least one recomposure station of the security checkpoint;
providing a type of music to a first area covering at least a second portion of the path, a location of the first area and the type of music determined based on proximity of the second portion of the path to the identification checking station, and the type of music selected by one or more of a plurality of people who have passed through the entrance of the security checkpoint; and
providing instructions to a second area covering at least a third portion of the path, a location of the second area determined based on proximity of the third portion to the identification checking station.

12. The method of claim 11, wherein the expected wait time comprises a crowdsourced wait time taken from a plurality of people who have passed through the entrance of the security checkpoint.

13. The method of claim 11, wherein the expected time is based historical wait time data related to the security checkpoint.

14. The method of claim 11, wherein the expected wait time is based on motion information from one or more motion sensors configured to monitor motion of people passing through the security checkpoint.

15. The method of claim 11, wherein the first portion of the path substantially overlaps either the second portion of the path or the third portion of the path.

16. The method of claim 1, wherein the first type of music is further determined on proximity of the second portion of the path to a scanner of the security checkpoint.

17. The method of claim 1, wherein the type of music comprises uptempo music.

18. The method of claim 1, wherein the type of music comprises soothing music.

19. A security checkpoint comprising:
means for displaying an expected wait time for at least one person to pass from an entrance of a security checkpoint to exit of the security checkpoint, the person using at least a first portion of a path leading from an entrance of the security checkpoint to at least one identification checkpoint, and leading from the at least one identification checkpoint to at least one recomposure station of the security checkpoint;
means for providing a type of music to a first area covering at least a second portion of the path, a location of the first area and the type of music determined based on proximity of the second portion of the path to the identification checking station, and the type of music selected by one or more of a plurality of people who have passed through the entrance of the security checkpoint; and
means for providing instructions to a second area covering at least a third portion of the path, a location of the second area determined based on proximity of the third portion to the identification checking station.

20. The security checkpoint of claim 19, wherein the expected wait time comprises a crowdsourced wait time taken from a plurality of people who have passed through the entrance of the security checkpoint.

* * * * *